United States Patent
Yu et al.

(10) Patent No.: US 12,356,240 B2
(45) Date of Patent: Jul. 8, 2025

(54) COMMUNICATIONS METHOD AND APPARATUS

(71) Applicant: HUAWEI TECHNOLOGIES CO., LTD., Guangdong (CN)

(72) Inventors: Youyang Yu, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 744 days.

(21) Appl. No.: 17/404,297

(22) Filed: Aug. 17, 2021

(65) Prior Publication Data

US 2021/0377783 A1 Dec. 2, 2021

Related U.S. Application Data

(63) Continuation of application No. PCT/CN2020/075733, filed on Feb. 18, 2020.

(30) Foreign Application Priority Data

Feb. 19, 2019 (CN) .......................... 201910127993.1

(51) Int. Cl.
*H04W 28/02* (2009.01)
*H04L 12/14* (2024.01)
(Continued)

(52) U.S. Cl.
CPC ..... *H04W 28/0268* (2013.01); *H04L 12/1407* (2013.01); *H04L 45/38* (2013.01); *H04W 72/543* (2023.01)

(58) Field of Classification Search
CPC ............ H04W 28/0268; H04W 72/543; H04L 12/1407; H04L 45/38
See application file for complete search history.

(56) References Cited

U.S. PATENT DOCUMENTS

2016/0270097 A1* 9/2016 Wang ................... H04L 41/0893
2017/0289882 A1* 10/2017 Faccin ................ H04L 12/4633
(Continued)

FOREIGN PATENT DOCUMENTS

| CN | 101312561 A | 11/2008 |
|---|---|---|
| CN | 101572719 A | 11/2009 |

(Continued)

OTHER PUBLICATIONS

ETSI TS 123 502 V15.4.1 (Mar. 2019), 5G; Procedures for the 5G System (5GS)(3GPP TS 23.502 version 15.4.1 Release 15), Total 348 Pages.

(Continued)

*Primary Examiner* — Redentor Pasia
(74) *Attorney, Agent, or Firm* — WOMBLE BOND DICKINSON (US) LLP

(57) ABSTRACT

The communication method according to the embodiments of this application is used to determine quality of service and/or charging control of a service flow of a terminal in a network that provides a service for a residential gateway, so as to ensure transmission quality of the service flow. A first control plane network element in a first network obtains a quality of service parameter and/or a charging policy of a service flow in the first network, where the service flow is a service flow in which a second terminal communicates with a second network by using a first terminal and a user plane network element in the first network; and the first control plane network element sends the quality of service parameter and/or the charging policy of the service flow to the user plane network element and/or the first terminal.

20 Claims, 24 Drawing Sheets

(51) Int. Cl.
*H04L 45/00* (2022.01)
*H04W 72/543* (2023.01)

(56) References Cited

U.S. PATENT DOCUMENTS

| | | | |
|---|---|---|---|
| 2019/0357076 A1* | 11/2019 | Han | H04W 28/0268 |
| 2020/0077315 A1* | 3/2020 | Jin | H04W 36/1443 |
| 2020/0236727 A1* | 7/2020 | Salkintzis | H04W 76/16 |
| 2021/0360742 A1* | 11/2021 | Liao | H04W 60/00 |
| 2021/0410001 A1* | 12/2021 | Shi | H04W 28/0263 |
| 2022/0159501 A1* | 5/2022 | Chou | H04L 41/122 |
| 2023/0262593 A1* | 8/2023 | Salkintzis | H04W 48/18 |
| | | | 455/434 |
| 2024/0064514 A1* | 2/2024 | Salkintzis | H04W 12/06 |

FOREIGN PATENT DOCUMENTS

| | | |
|---|---|---|
| CN | 109314710 A | 2/2019 |
| WO | 2017173941 A1 | 10/2017 |
| WO | 2017196106 A1 | 11/2017 |

OTHER PUBLICATIONS

Huawei et al., "Architecture and reference points for Wireline AN", 3GPP TSG-SA WG2 Meeting #130 S2-1900876, Kechi, India, Jan. 24-Jan. 25, 2019, total 10 pages.

Vivo, "Introducing support for accessing to PLMN services via NPN and vice versa", SA WG2 Meeting #130 82-1900146, Jan. 21-25, 2019, Kechi, India, total 8 pages.

3GPP TS 23.502 V15.4.1 (Jan. 2019), 3rd Generation Partnership Project; Technical Specification Group Services and System Aspects; Procedures for the 5G System; Stage 2(Release 15), total 347 pages.

\* cited by examiner

COMMUNICATIONS METHOD AND APPARATUS

CROSS-REFERENCE TO RELATED APPLICATIONS

This application is a continuation of International Application No. PCT/CN2020/075733, filed on Feb. 18, 2020, which claims priority to Chinese Patent Application No. 201910127993.1, filed on Feb. 19, 2019. The disclosures of the aforementioned applications are hereby incorporated by reference in their entireties.

TECHNICAL FIELD

Embodiments of this application relate to the field of communications technologies, and in particular, to a communication method and a communications apparatus.

BACKGROUND

To address a challenge of a wireless broadband technology, and maintain a leading advantage of a 3rd generation partnership project (3GPP) network, the 3GPP standards group formulates a next generation system architecture. It may also be referred to as a 5-generation (5G) network architecture. The 5G network architecture supports a terminal in accessing a 5G core network (CN) side by using a wireless technology (for example, long term evolution (LTE) or a 5G radio access network (RAN)) defined by the 3GPP standards group, and supports access to the core network side by using a non-3GPP interworking function (N3IWF) or a next generation access gateway (ngPDG) in a non-3GPP access technology.

In addition to supporting access that is performed by using the RAN, a 5GC may further support access that is performed by using a fixed network/wired network, for example, the 5GC supports access of a residential gateway (RG) that is performed by using a wired network. In this scenario, a terminal that supports the 5GC (referred to as a 5GC terminal for short below) may access the 5GC by using the residential gateway. However, in this scenario, the residential gateway is registered with a first network that provides a service for the residential gateway, and the terminal is registered with a second network (for example, the 5GC) that provides a service for a 5GC terminal. The current technology does not provide a solution about how to perform quality of service (QoS) control on the terminal.

SUMMARY

Embodiments of this application provide a communication method and apparatus, to determine quality of service and/or charging control of a service flow of a terminal in a network that provides a service for a residential gateway, and ensure transmission quality of the service flow.

To resolve the foregoing technical problem, the embodiments of this application provide the following technical solutions:

According to a first aspect, an embodiment of this application provides a policy control method. The method includes: A first control plane network element in a first network obtains a quality of service parameter and/or a charging policy of a service flow in the first network (for example, the quality of service parameter of the service flow in the first network may be referred to as a first quality of service parameter, and the charging policy of the service flow in the first network is referred to as a first charging policy). The service flow is a service flow in which a second terminal communicates with a second network by using a first terminal and a user plane network element in the first network. The first control plane network element sends the quality of service parameter and/or the charging policy of the service flow to the user plane network element. The first control plane network element sends the quality of service parameter of the service flow to the first terminal.

This embodiment of this application provides a communication method. In the current technology, when the first network forwards a service flow of the second terminal during communication between the second terminal and the second network, the first control plane network element does not determine a quality of service parameter that is of a service flow of the second terminal and that is transmitted in the first network. In addition, the first network does not clearly know a charging policy of the service flow of the second terminal in the first network. Therefore, in this embodiment of this application, the first control plane network element in the first network obtains the first quality of service parameter and/or the first charging policy of the service flow in the first network, and sends the first quality of service parameter and/or the first charging policy of the service flow to the first terminal and/or a first user plane network element. In this way, the first terminal and the first user plane network element may adjust a network resource in the first network based on the first quality of service parameter, so that transmission quality of the service flow in the first network meets a QoS requirement. In addition, the first network may further implement charging control on the service flow in the first network according to the first charging policy.

In one embodiment, in this embodiment of this application, that the first control plane network element in the first network obtains the quality of service parameter and/or the charging policy of the service flow in the first network includes: The first control plane network element obtains a quality of service parameter and/or a charging policy of the service flow in the second network from a second control plane network element in the second network (for example, the quality of service parameter of the service flow in the second network may be referred to as a second quality of service parameter, and the charging policy of the service flow in the second network may be referred to as a second charging policy). The first control plane network element determines the first quality of service parameter of the service flow in the first network based on the second quality of service parameter of the service flow in the second network and/or the first control plane network element determines the first charging policy of the service flow in the first network according to the second charging policy of the service flow in the second network. In this way, collaboration between the first network and the second network can be implemented.

In one embodiment, that the first control plane network element determines the first quality of service parameter of the service flow in the first network based on the second quality of service parameter of the service flow in the second network includes: The first control plane network element determines the first quality of service parameter as the second quality of service parameter. That the first control plane network element determines the first charging policy of the service flow in the first network according to the second charging policy of the service flow in the second network includes: The first control plane network element determines the first charging policy as the second charging policy.

In one embodiment, the method provided in this embodiment of this application further includes: The first control plane network element obtains description information of the service flow from the second control plane network element. The first control plane network element determines the service flow based on the description information.

In one embodiment, the description information includes any one or more pieces of the following information: address information of the first terminal, port number information of the second terminal, an identifier of the second terminal, quintuple information of the service flow, or differentiated services code point DSCP information of the service flow. The quintuple information or the DSCP information of the service flow may implement quality of service and charging control of a service flow granularity. The address information of the first terminal is an address obtained after the first terminal replaces a source address of the service flow when the service flow is transmitted in the first network. The port number information of the second terminal is a port number allocated by the first terminal to the second terminal when the second terminal accesses the first terminal.

In one embodiment, the description information includes any one or more pieces of the following information: a quality of service flow identifier QFI, a security parameter index SPI, and the DSCP information. In this way, service quality and charging control can be implemented of the SPI, a QFI granularity, or a DSCP granularity.

In one embodiment, the method provided in this embodiment of this application further includes: The first control plane network element sends first indication information to the user plane network element. The first indication information is used to indicate the user plane network element to set a QFI in an outer data header of the service flow based on a QFI, an SPI or a DSCP carried in an inner data header of the service flow.

For example, the inner data header may be an inner GRE packet header of the service flow. The outer data header may be a GTP-U packet header of the service flow.

In one embodiment, the method provided in this embodiment of this application further includes: The first control plane network element sends the description information to the user plane network element and/or the first terminal in the first network, where the description information is used to determine the service flow. In this way, it is convenient for the user plane network element and the first terminal to determine to use the foregoing quality of service control and charging control on the service flow determined by using the description information.

In one embodiment, that the first control plane network element obtains the quality of service parameter and/or the charging policy of the service flow in the first network includes: The first control plane network element obtains a quality of service parameter and/or a charging policy of the second terminal in the first network from a user data management network element in the first network. In this way, it is convenient for the first control plane network element to obtain by itself, from the user data management network element, the quality of service parameter and/or the charging policy of the second terminal in the first network, at a granularity of a terminal.

In one embodiment, the method provided in this embodiment of this application further includes: The first control plane network element obtains information about the first terminal and the information about the second terminal from a second control plane network element. The information about the first terminal is used to determine the first terminal. The information about the second terminal is used to determine the second terminal.

In one embodiment, that the first control plane network element obtains the quality of service parameter and/or the charging policy of the second terminal in the first network from the user data management network element in the first network includes: The first control plane network element queries subscription information of the first terminal from the user data management network element based on the information about the first terminal. The first control plane network element obtains the quality of service parameter and/or the charging policy of the second terminal in the first network from the subscription information based on the information about the second terminal.

In one embodiment, the method provided in this embodiment of this application further includes: The first control plane network element obtains second indication information from the second control plane network element. The second indication information is used to indicate the second terminal to access the second network by using the first terminal.

For example, the second indication information may be at least one of the address information of the first terminal, the port number information of the second terminal, or an indirect access indication. For example, the indirect access indication may be an indication (indication), the information about the first terminal, a line ID, or a service set identifier.

In one embodiment, the first control plane network element is a policy control network element, a mobile management network element, or a session management network element.

According to a second aspect, an embodiment of this application provides a communication method. The method includes: A second control plane network element in a second network obtains a second quality of service parameter and/or a second charging policy of a service flow in the second network. The service flow is a service flow in which a second terminal communicates with the second network by using a first terminal and a user plane network element in a first network. The second control plane network element sends the second quality of service parameter and/or the second charging policy of the service flow to a first control plane network element in the first network.

In one embodiment, the method provided in this embodiment of this application further includes: The second control plane network element obtains information about the first control plane network element from a binding support function BSF network element or a diameter routing agent (Diameter Routing Agent, DRA) node based on information about the first terminal. In this way, it is convenient for the second control plane network element to determine the first control plane network element that provides a service for the first terminal and that is in the first network, so as to send the second quality of service parameter and/or the second charging policy to the first control plane network element accurately.

In one embodiment, that the second control plane network element in the second network obtains the second quality of service parameter and/or the second charging policy of the service flow in the second network includes: The second control plane network element obtains a second quality of service parameter and/or a second charging policy of the second terminal in the second network from a user data management network element in the second network.

In one embodiment, that the second control plane network element obtains the second quality of service parameter and/or the second charging policy of the second terminal in the second network from the user data management network element in the second network includes: The second control plane network element queries subscription information of the second terminal from the user data management network element based on information about the second terminal. The second control plane network element obtains a quality of service parameter and/or a charging policy of the second terminal in the first network from the subscription information of the second terminal. It should be understood that the subscription information of the second terminal includes at least the quality of service parameter and/or the charging policy of the second terminal in the first network.

In one embodiment, the method provided in this embodiment of this application further includes: The second control plane network element sends description information of the service flow to the first control plane network element. The description information is used to determine the service flow.

For specific content of the description information in the second aspect, refer to the specific content of the description information in the first aspect. Details are not described herein again.

In one embodiment, that the second control plane network element in the second network obtains the second quality of service parameter and/or the second charging policy of the service flow in the second network includes: The second control plane network element obtains the second quality of service parameter and/or the second charging policy of the service flow in the second network based on the description information.

In one embodiment, the method provided in this embodiment of this application further includes: The second control plane network element sends second indication information to the first control plane network element, where the second indication information is used to indicate the second terminal to access the second network by using the first terminal.

For specific content of the second indication information in the second aspect, refer to the description in the first aspect. Details are not described herein again.

In one embodiment, the second control plane network element is a policy control network element, a mobile management network element, or a session management network element.

In one embodiment, the second control plane network element obtains third indication information from the session management network element or the mobile management network element, where the third indication information is used to indicate the second terminal to access the second network by using the first terminal.

In one embodiment, the second indication information and/or the third indication information is a local IP address of the second terminal. The foregoing local IP address is an address of the first terminal.

According to a third aspect, an embodiment of this application provides a communication method. The method includes: A first terminal receives a quality of service parameter of a service flow from a control plane network element in a first network. The service flow is a service flow in which a second terminal communicates with a second network by using a first terminal and a user plane network element in the first network. The first terminal transmits the service flow based on the quality of service parameter.

In one embodiment, the method provided in this embodiment of this application further includes: The first terminal obtains description information of the service flow. The first terminal replaces, with an address of the first terminal, a source address of the service flow that is determined based on the description information, and the service flow is a service flow whose source address is replaced. Specifically, the first terminal may obtain the description information of the service flow by using a first control plane network element in the first network.

In one embodiment, the method provided in this embodiment of this application further includes: The service flow further includes port number information of the second terminal. For example, the port number information of the second terminal is used to be identified as a port number of the second terminal. The port number of the second terminal is a port number allocated by the first terminal to the second terminal.

In one embodiment, the method provided in this embodiment of this application further includes: The first terminal allocates address information to the second terminal. The first terminal sends the address information to the second terminal. The source address of the service flow is an address allocated by the first terminal to the second terminal.

In one embodiment, the method provided in this embodiment of this application further includes: The first terminal receives a route selection policy from the first control plane network element, where the route selection policy includes fourth indication information. The fourth indication information is used to indicate service identifier information corresponding to the route selection policy. In addition, the route selection policy further includes a session type or a data network name (Data Network Name, DNN). For example, the data network name may be an internet or an access gateway.

In one embodiment, the fourth indication information includes any one or more pieces of the following information: a 5G terminal service indication, a non-5G terminal service indication, an interactive personality television IPTV service indication, a service indication of a service set identifier, or a VLAN tag.

In one embodiment, that the first terminal transmits the service flow based on the quality of service parameter includes: The first terminal controls air interface quality of service between the second terminal and the first terminal based on the quality of service parameter. In other words, the first terminal transmits the service flow to the second terminal based on the quality of service parameter.

In any one of the first aspect to the third aspect and any embodiment, the first terminal may be a terminal registered with the first network. The second terminal may be a terminal registered with the second network. The second terminal may transmit the service flow to the second network through the first terminal, a data transmission channel between the first terminal and the first network, and a data transmission channel between the first network and the second network. The second network may also send a service flow for the second terminal to the first network through a data transmission channel between the second network and the first network, so that the first network transmits the service flow for the second terminal to the second terminal through a data transmission channel of the first network. The first network is a network with which the first terminal registers. The first network may include a core network element that provides a service for the first terminal in a network with which the first terminal registers. The second network is a network with which the second terminal registers. The second network may include a core network element that provides a service for the second terminal in a network with which the second terminal registers.

According to a fourth aspect, an embodiment of this application provides a communications apparatus. The communications apparatus may be a first control plane network element, or may be a chip or a chip system in the first control plane network element. The communications apparatus may include a processing unit and a communications unit. When the communications apparatus is the first control plane network element, the processing unit may be a processor, and the communications unit may be a communications interface or an interface circuit. The communications apparatus may further include a storage unit, and the storage unit may be a memory. The storage unit is configured to store instructions, and the processing unit executes the instructions stored in the storage unit, so that the first control plane network element implements the communication method according to any one of the first aspect or the possible implementations of the first aspect. When the communications apparatus is the chip or the chip system in first control plane network element, the processing unit may be a processor, and the communications unit may be a communications interface. For example, the communications interface may be an input/output interface, a pin, a circuit, or the like. The processing unit executes the instructions stored in the storage unit, so that the first control plane network element implements the communication method according to any one of the first aspect or the possible implementations of the first aspect. The storage unit may be a storage unit (for example, a register or a cache) in the chip, or may be a storage unit (for example, a read-only memory or a random access memory) that is in the first control plane network element and that is outside the chip.

According to a fifth aspect, an embodiment of this application provides a communications apparatus. The communications apparatus may be a second control plane network element, or may be a chip or a chip system in the second control plane network element. The communications apparatus may include a processing unit and a communications unit. When the communications apparatus is the second control plane network element, the processing unit may be a processor, and the communications unit may be a communications interface or an interface circuit. The communications apparatus may further include a storage unit, and the storage unit may be a memory. The storage unit is configured to store instructions, and the processing unit executes the instructions stored in the storage unit, so that the second control plane network element implements the communication method according to any one of the second aspect or the possible implementations of the second aspect.

For example, the processing unit is configured to obtain a second quality of service parameter and/or a second charging policy of a service flow in a second network. The service flow is a service flow in which a second terminal communicates with the second network by using a first terminal and a user plane network element in a first network. The communications unit is configured to send the second quality of service parameter and/or the second charging policy of the service flow to a first control plane network element in the first network.

In one embodiment, the communications unit is specifically configured to obtain information about the first control plane network element from a binding support function BSF network element or a diameter routing agent node based on information about the first terminal.

In one embodiment, the processing unit is specifically configured to obtain a second quality of service parameter and/or a second charging policy of the second terminal in the second network from a user data management network element in the second network.

In one embodiment, the processing unit is specifically configured to query subscription information of the second terminal from the user data management network element based on information about the second terminal, and is configured to obtain a quality of service parameter and/or a charging policy of the second terminal in the first network from the subscription information of the second terminal.

In one embodiment, the communications unit is further configured to send description information of the service flow to the first control plane network element. The description information is used to determine the service flow.

For specific content of the description information in the fifth aspect, refer to the specific content of the description information in the first aspect. Details are not described herein again.

In one embodiment, the processing unit is specifically configured to obtain the second quality of service parameter and/or the second charging policy of the service flow in the second network based on the description information.

In one embodiment, the communications unit is further configured to send second indication information to the first control plane network element, where the second indication information is used to indicate the second terminal to access the second network by using the first terminal.

For specific content of the second indication information in the fifth aspect, refer to the description in the first aspect. Details are not described herein again.

In one embodiment, the second control plane network element is a policy control network element, a mobile management network element, or a session management network element.

In one embodiment, the second control plane network element obtains third indication information from the session management network element or the mobile management network element, where the third indication information is used to indicate the second terminal to access the second network by using the first terminal.

In one embodiment, the second indication information and/or the third indication information is a local IP address of the second terminal. The foregoing local IP address is an address of the first terminal.

When the communications apparatus is the chip or the chip system in the second control plane network element, the processing unit may be a processor, and the communications unit may be a communications interface, for example, an input/output interface, a pin, or a circuit. The processing unit executes the instructions stored in the storage unit, so that the second control plane network element implements the communication method according to any one of the second aspect or the possible implementations of the second aspect. The storage unit may be a storage unit (for example, a register or a cache) in the chip, or may be a storage unit (for example, a read-only memory or a random access memory) that is in the second control plane network element and that is located outside the chip.

According to a sixth aspect, an embodiment of this application provides a communications apparatus. The communications apparatus may be a first terminal, or may be a chip or a chip system in the first terminal. The communications apparatus may include a processing unit and a communications unit. When the communications apparatus is the first terminal, the processing unit may be a processor, and the communications unit may be a communications interface, an interface circuit, or a transceiver. The communications apparatus may further include a storage unit, and the storage unit may be a memory. The storage unit is configured to store instructions, and the processing unit executes the instructions stored in the storage unit, so that the first terminal implements the communication method according to any one of the third aspect or the possible implementations of the third aspect.

For example, the communications apparatus is the first terminal. The communications unit is configured to receive a quality of service parameter of a service flow from a control plane network element in a first network. The service flow is a service flow in which a second terminal communicates with a second network by using the first terminal and a user plane network element in the first network. The processing unit is configured to transmit the service flow based on the quality of service parameter.

In one embodiment, the communications unit is configured to obtain description information of the service flow. The processing unit is specifically configured to replace, with an address of the first terminal, a source address that is of the service flow and that is determined based on the description information, and the service flow is a service flow whose source address is replaced.

In one embodiment, the method provided in this embodiment of this application further includes: The service flow further includes port number information of the second terminal. For example, the port number information of the second terminal is used to be identified as a port number of the second terminal. The port number of the second terminal is a port number allocated by the first terminal to the second terminal.

In one embodiment, the first processing unit is further configured to allocate address information to the second terminal. The first terminal sends the address information to the second terminal. The source address of the service flow is an address allocated by the first terminal to the second terminal.

In one embodiment, the communications unit is further configured to receive a route selection policy from the first control plane network element, where the route selection policy includes fourth indication information. The fourth indication information is used to indicate service identifier information corresponding to the route selection policy. In addition, the route selection policy further includes a session type or a data network name (Data Network Name, DNN). For example, the data network name may be an internet or an access gateway.

In one embodiment, the fourth indication information includes any one or more pieces of the following information: a 5G terminal service indication, a non-5G terminal service indication, an interactive internet protocol television IPTV service indication, a service indication of a service set identifier, or a VLAN tag.

In one embodiment, the processing unit is specifically configured to control air interface quality of service between the second terminal and the first terminal based on the quality of service parameter. In other words, the first terminal transmits the service flow to the second terminal based on a quality of service parameter.

When the communications apparatus is the chip in the first terminal, the processing unit may be a processor, and the communications unit may be a communications interface, for example, an input/output interface, a pin, or a circuit. The processing unit executes the instructions stored in the storage unit, so that the first terminal implements the communication method according to any one of the third aspect or the possible implementations of the third aspect.

The storage unit may be a storage unit (for example, a register or a cache) inside the chip, or may be a storage unit (for example, a read-only memory or a random access memory) that is inside the first terminal and that is located outside the chip.

According to a seventh aspect, an embodiment of this application provides a computer-readable storage medium. The computer-readable storage medium stores a computer program or instructions. When the computer program or the instructions is or are run on a computer, the computer is enabled to perform the communication method described in any one of the first aspect or the possible implementations of the first aspect.

According to an eighth aspect, an embodiment of this application provides a computer-readable storage medium. The computer-readable storage medium stores a computer program or instructions. When the computer program or the instructions is or are run on a computer, the computer is enabled to perform the communication method described in any one of the second aspect or the possible implementations of the second aspect.

According to a ninth aspect, an embodiment of this application provides a computer-readable storage medium. The computer-readable storage medium stores a computer program or instructions. When the computer program or the instructions is or are run on a computer, the computer is enabled to perform the communication method described in any one of the third aspect or the possible implementations of the third aspect.

According to a tenth aspect, an embodiment of this application provides a computer program product including instructions. When the instructions are run on a computer, the computer is enabled to perform the communication method described in any one of the first aspect or the possible implementations of the first aspect.

According to an eleventh aspect, an embodiment of this application provides a computer program product including instructions. When the instructions are run on a computer, the computer is enabled to perform the communication method described in any one of the second aspect or the possible implementations of the second aspect.

According to a twelfth aspect, an embodiment of this application provides a computer program product including instructions. When the instructions are run on a computer, the computer is enabled to perform the communication method described in any one of the third aspect or the possible implementations of the third aspect.

According to a thirteenth aspect, an embodiment of this application provides a communications system. The communications system includes any one or more of the following: the first control plane network element described in the fourth aspect and the possible implementations of the fourth aspect, and the second control plane network element described in the fifth aspect and the possible implementations of the fifth aspect.

In one embodiment, the communications system may further include the first terminal described in the sixth aspect and the possible implementations of the sixth aspect.

According to a fourteenth aspect, an embodiment of this application provides a communications apparatus. The communications apparatus includes a processor and a storage medium. The storage medium stores instructions. When the instructions are run by the processor, the processor implements the communication method described in any one of the first aspect or the possible implementations of the first aspect.

According to a fifteenth aspect, an embodiment of this application provides a communications apparatus. The communications apparatus includes a processor and a storage medium. The storage medium stores instructions. When the instructions are run by the processor, the processor implements the communication method described in any one of the second aspect or the possible implementations of the second aspect.

According to a sixteenth aspect, an embodiment of this application provides a communications apparatus. The communications apparatus includes a processor and a storage medium. The storage medium stores instructions. When the instructions are run by the processor, the processor implements the communication method described in any one of the third aspect or the possible implementations of the third aspect.

According to a seventeenth aspect, this application provides a chip or a chip system. The chip or the chip system includes at least one processor and a communications interface. The communications interface and the at least one processor are interconnected through a line. The at least one processor is configured to run a computer program or instructions, to perform the communication method described in any one of the first aspect or the possible implementations of the first aspect.

According to an eighteenth aspect, this application provides a chip or a chip system. The chip or the chip system includes at least one processor and a communications interface. The communications interface and the at least one processor are interconnected through a line. The at least one processor is configured to run a computer program or instructions, to perform the communication method described in any one of the second aspect or the possible implementations of the second aspect.

According to a nineteenth aspect, this application provides a chip or a chip system. The chip or the chip system includes at least one processor and a communications interface. The communications interface and the at least one processor are interconnected through a line. The at least one processor is configured to run a computer program or instructions, to perform the communication method described in any one of the third aspect or the possible implementations of the third aspect.

The communications interface on the chip may be an input/output interface, a pin, a circuit, or the like.

In one embodiment, the chip or the chip system described in this application further includes at least one memory, and the at least one memory stores the instructions. The memory may be a storage unit inside the chip, for example, a register, or a cache, or may be a storage unit (for example, a read-only memory or a random access memory) of the chip.

According to a twentieth aspect, an embodiment of this application provides a communications apparatus. The communications apparatus includes a processor. The processor is coupled with a memory, and the memory stores instructions. The processor is configured to run the instructions to implement the communication method described in any one of the first aspect or the possible implementations of the first aspect.

According to a twenty-first aspect, an embodiment of this application provides a communications apparatus. The communications apparatus includes a processor. The processor is coupled with a memory, and the memory stores instructions. The processor is configured to run the instructions to implement the communication method described in any one of the second aspect or the possible implementations of the second aspect.

According to a twenty-second aspect, an embodiment of this application provides a communications apparatus. The communications apparatus includes a processor. The processor is coupled with a memory, and the memory stores instructions. The processor is configured to run the instructions to implement the communication method described in any one of the third aspect or the possible implementations of the third aspect.

It may be understood that the memories described in the twentieth aspect to the twenty-second aspect in the embodiments of this application may be located inside the communications apparatus, or may be located outside the communications apparatus. This is not limited in the embodiments of this application.

For beneficial effects of the second aspect to the twenty-second aspect and the implementations thereof in this application, refer to the analysis of the beneficial effects of the first aspect and the implementations of the first aspect. Details are not described herein again.

DESCRIPTION OF EMBODIMENTS

To clearly describe technical solutions in embodiments of this application, terms such as "first" and "second" are used in the embodiments of this application to distinguish between same items or similar items that have basically same functions and purposes. For example, a first network and a second network are merely intended to distinguish between different networks, and are not intended to limit a sequence thereof. A person skilled in the art may understand that the terms such as "first" and "second" do not limit a quantity and an execution sequence, and the terms such as "first" and "second" do not indicate a definite difference.

It should be noted that, in this application, the word "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the word "exemplary", "for example" or the like is intended to present a relative concept in a specific manner.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. The term "at least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

Figure 1:
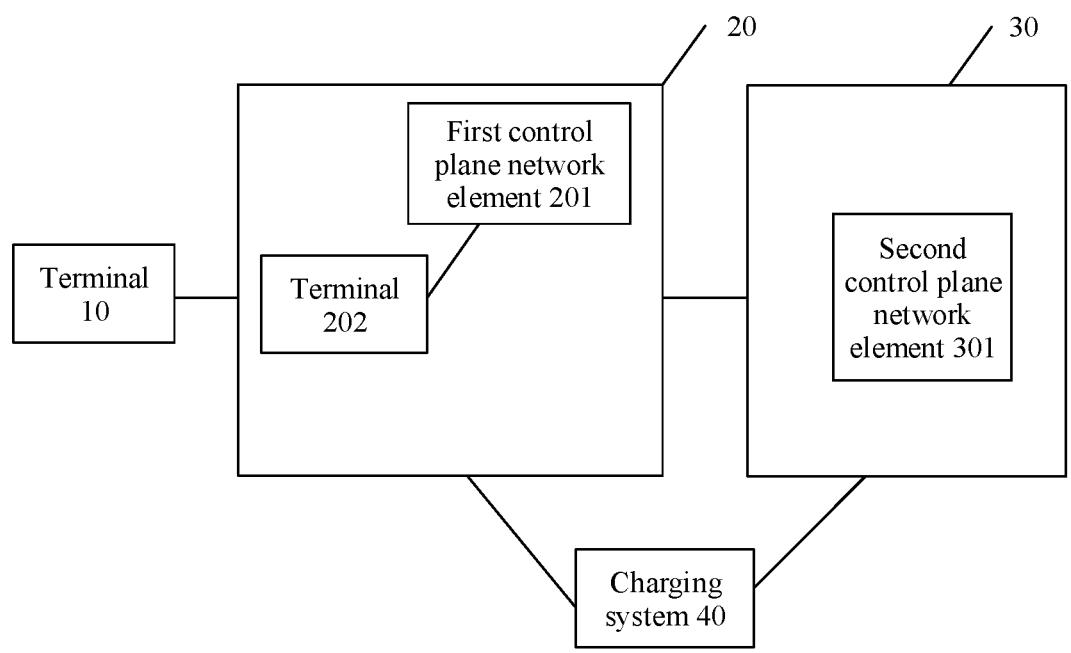
FIGS. 1-3 are schematic structural diagrams of a respective communications system according to embodiments of this application.

FIG. 1 is a schematic diagram of a communications system according to an embodiment of this application. The communications system includes a terminal 10, a first network 20, and a second network 30.

The first network 20 includes a first control plane (Control plane, CP) network element 201 and a terminal 202. The second network 30 includes a second control plane network element 301.

In one embodiment, the communications system may further include a charging system 40 connected to the first network 20 and the second network 30. The terminal 10 accesses the second network 30 by using the first network 20.

For example, the charging system 40 includes an online charging system (OCS) function and an offline charging system (OFCS) function. The OCS is used for real-time credit control and quota management for a user data session. The OFCS is used to receive charging data after a user (for example, a terminal) uses a network resource.

It should be understood that the charging system 40 may include a first charging system and a second charging system. The first charging system is connected to the first network 20. The second charging system is connected to the second network 30. The first charging system is used to perform charging control on a service flow according to a charging policy of the service flow in the first network. The second charging system is used to perform charging control on the service flow according to a charging policy of the service flow in the second network.

For example, the first network 20 includes a network element that provides a service for the terminal 202 in a core network with which the terminal 202 registers. The second network 30 includes a network element that provides a service for the terminal 10 in a core network with which the terminal 10 registers through the first network. In other words, the first network includes a core network element that provides a service for the terminal 202 in the core network. In other words, the second network includes a core network element that provides a service for the terminal 10 in the core network.

It should be understood that in this embodiment of this application, the terminal 10 and the terminal 202 may register with a same core network or different core networks. The core network element included in the first network 20 may be the same as or different from the core network element included in the second network 30. This is not limited in this embodiment of this application.

For example, the first network and the second network each may include same network elements or different network elements on a same public land mobile network (PLMN), or may include different network elements on different PLMNs.

In an example, an example in which the core network with which the terminal 202 registers is a 4G core network (for example, an evolved packet core (EPC)) is used. The first network 20 includes a core network element that provides a service for the terminal 202 in the 4G core network. For example, the core network element with which the terminal 10 registers is a 5G core network (5GC). The second network 30 includes a core network element that provides a service for the terminal 10 in the 5G core network.

In another example, an example in which core networks with which the terminal 202 and the terminal 10 register are both 5GC is used. The first network 20 includes a core network element that provides a service for the terminal 202 in the 5G core network. The second network 30 includes a core network element that provides a service for the terminal 10 in the 5G core network.

In another example, an example in which core networks with which the terminal 202 and the terminal 10 register are both 4G core networks is used. The first network 20 includes a core network element that provides a service for the terminal 202 in the 4G core network. The second network 30 includes a core network element that provides a service for the terminal 10 in the 4G core network.

For example, a first control plane network element 201 and the second control plane network element 301 in this embodiment of this application are mainly responsible for user registration authentication, mobility management, and delivering a data packet forwarding policy, a QoS control policy, and the like to a user plane (UPF).

For example, network elements corresponding to the first control plane network element 201 and the second control plane network element 301 may be one or more of a mobile management network element, a policy control network element, or a session management network element.

The 4G core network is used as an example. The mobility management network element may be a mobility management entity (MME). The policy control network element may be a policy and charging rules function (PCRF) unit. In addition, in the 4G core network, the session management network element may be a control plane PDN gateway (PDN GateWay-C). The PCRF is responsible for generating a transmission policy of establishing a data bearer by a terminal. It should be understood that a concept of a QoS flow is introduced in 5G to replace an evolved packet system (EPS) bearer in 4G. For example, a user function network element in the 4G core network may be a PGW-U.

Figure 2:
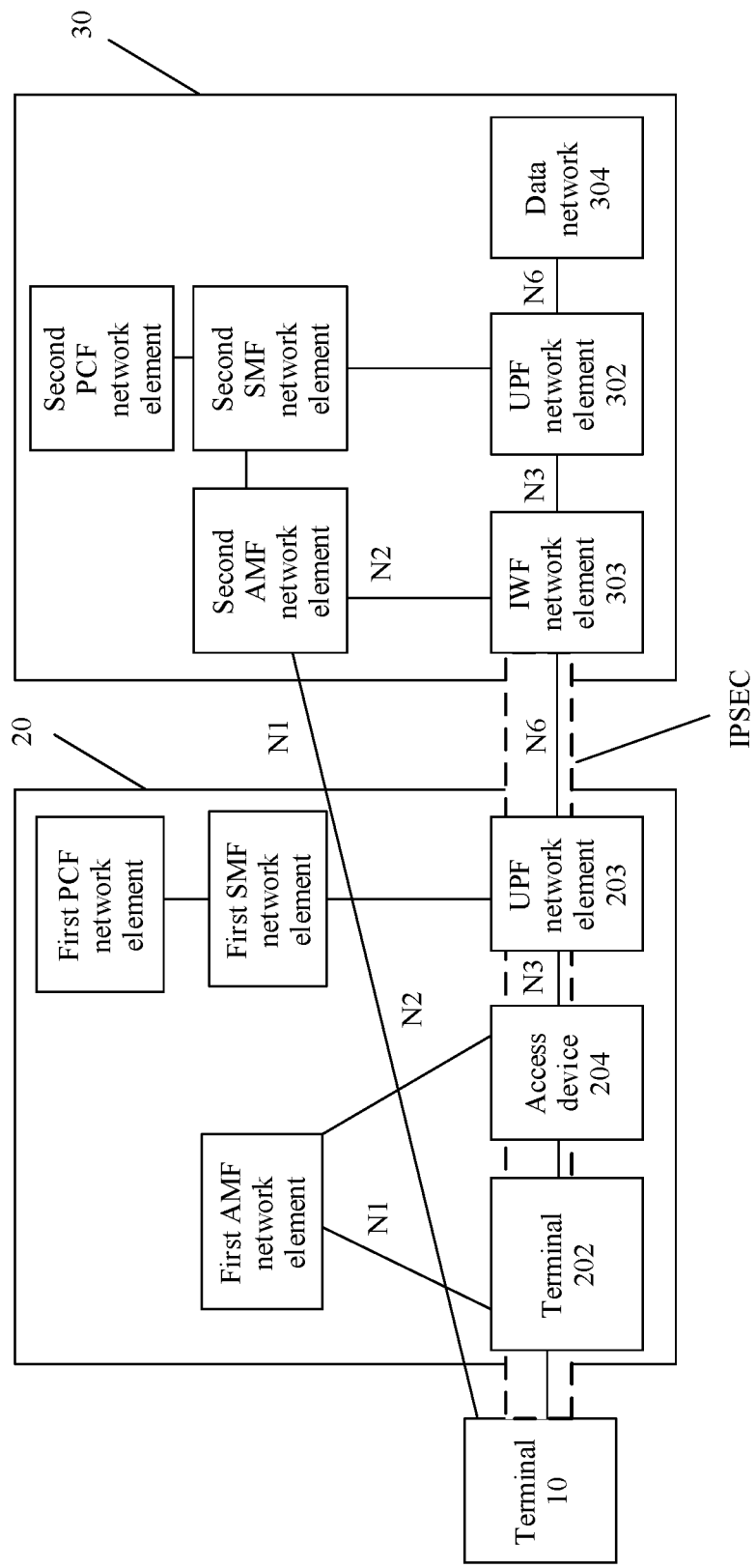

As shown in FIG. 2, that the communications system shown in FIG. 1 is applied to a 5G network architecture is used as an example. The network structure shown in FIG. 2 may be referred to as a fixed-mobile convergence network architecture. In the network architecture shown in FIG. 2, the mobility management network element may be an access and mobility management function (AMF) network element. The policy control network element may be a policy control function (PCF) network element. The session management network element may be a session management function (SMF) network element. In other words, the first control plane network element 201 may be any one of a first SMF network element, a first AMF network element, or a first PCF network element. The second control plane network element 301 may be any one of a second SMF network element, a second AMF network element, or a second PCF network element.

Specifically, an AMF network element is responsible for a registration procedure when a terminal accesses and location management during terminal movement, for example, functions related to access and mobility of connection management, mobility management, registration management, access authentication and authorization, reachability management, and security context management.

The SMF network element is responsible for establishing a corresponding session connection and session management (for example, session establishment, modification, and release) on a network side when the terminal initiates a service, to provide a specific service for the terminal. Especially, a data packet forwarding policy, a quality of service (QoS) parameter, and the like are delivered, based on an NG4 interface between the SMF network element and a user plane function (UPF) network element, to the UPF network element. The PCF network element is used to send a transmission policy related to the service flow to the AMF network element or the SMF network element. For example, the PCF network element is used to send a QoS parameter a transmission service flow to the AMF network element or the SMF network element.

In addition, as shown in FIG. 2, the 5G network architecture may further include a UPF network element 203, a UPF network element 302, an interworking function (IWF) network element 303, and a data network (DN) 304. The user plane function network element 203 belongs to the first network 20. The UPF network element 302 and the IWF network element 303 belong to the second network 30. The UPF network element 203 is used to transmit user plane data of the terminal 202.

It should be understood that one or more pieces of user plane data of any terminal in the embodiments of this application may constitute a service flow.

A UPF network element is a user plane gateway, and is mainly responsible for packet data packet forwarding, QoS control, charging information statistics, and the like. For example, user plane data is transmitted to the DN 304 via the UPF network element 302. The DN 304 is configured to serve the terminal 10, for example, provide a mobile operator service, an internet service, or a third-party service.

For example, an access device 204 is an access network device, and may be a radio access network (for example, a next generation radio access network (NG RAN)) or a wireline access network/fixed access network (W-5GAN) such as an access gateway function (AGF) or a network gateway control device (BNG).

In the system architecture shown in FIG. 1 or FIG. 2, the terminal 10 accesses the second network 30 by using the terminal 202. The terminal 10 transmits a service flow to the second network 30 through the terminal 202 and a data transmission channel between the first network 20 and the second network 30.

Specifically, user plane data of the terminal 10 is transmitted to the user plane function network element 203 via a user plane of the terminal 202. Then, the UPF network element 203 transmits a service flow of the terminal 10 to the IWF network element 303 in the second network 30. A specific implementation is as follows: The terminal 10 establishes an internet connection agreement (IPSEC) tunnel with the IWF network element 303 to transmit the service flow of the terminal 10, where the service flow of the terminal 10 may be transmitted on the first network 20 as a service flow of the terminal 202. Then, the UPF network element 203 in the first network 10 transmits the service flow of the terminal 10 to the IWF network element 303. The IWF network element 303 transmits the received service flow of the terminal 10 to the UPF network element 302. The UPF network element 302 transmits the service flow of the terminal 10 to the DN 304.

In a possible example, in a 5G architecture, in addition to the first control plane network element 201 and the UPF network element 203 on the first network 20, and in addition to the second control plane network element 201 and the UPF network element 302 on the second network 30, there may be another network element on the first network 20 and the second network 30. Another network element on the first network 20 in the 5G architecture is used as an example. For another network element on the second network 30 in the 5G architecture, refer to a description about the first network 20 in the 5G architecture.

Figure 3:
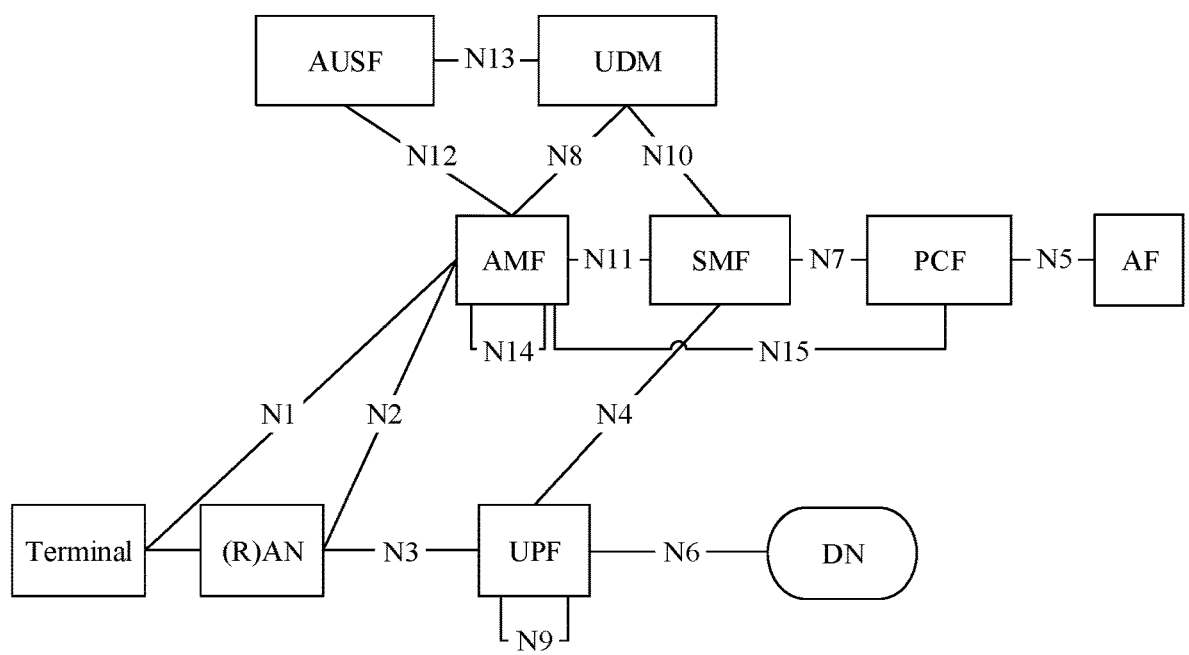

As shown in FIG. 3, the 5G network architecture shown in FIG. 3 may further include: a unified data management (UDM) network element, an authentication server function (AUSF) network element, a unified data repository (UDR), or a binding support function (BSF), a network exposure function (NEF) network element, a network repository function (NRF) network element, an application function (AF), and the like. This is not specifically limited in this embodiment of this application.

The user data management network element in this embodiment of this application may be any one of the unified data management (UDM) network element, the user data repository (UDR) network element, and a home subscriber server (HSS) network element.

It should be noted that in the 5G network architecture, a function of the IWF network element 303 is equivalent to a function of an access device.

The terminal communicates with the AMF network element through a next generation network (N1) interface (N1 for short). The access device communicates with the AMF network element through an N2 interface (N2 for short). The access device communicates with the UPF network element through an N3 interface (N3 for short). The UPF network element communicates with the DN through an N6 interface (N6 for short). Any two UPF network elements communicate with each other through an N9 interface (N9 for short). The UPF network element communicates with the SMF network element through an N4 interface (N4 for short). The AMF network element communicates with the SMF network element through an N11 interface (N11 for short). The AMF network element communicates with the UDM network element through an N8 interface (N8 for short). The SMF network element communicates with the PCF network element through an N7 interface (N7 for short). The SMF network element communicates with the UDM network element through an N10 interface (N10 for short). The AMF network element communicates with the AUSF network element through an N12 interface (N12 for short). The AMF network element communicates with an NSSF network element through an N22 interface (N22 for short). The AUSF network element communicates with the UDM network element through an N13 interface (N13 for short). The UDM network element communicates with the UDR network element. The PCF network element communicates with the UDR network element. The BSF network element communicates with the PCF network element and the SMF network element.

It should be understood that, in the network architecture shown in FIG. 3, control plane network elements may also exchange with each other through a service-oriented interface. For example, the AMF network element, the AUSF network element, the SMF network element, the UDM network element, the UDR network element, the NRF network element, the NEF network element, the NSSF network element, or the PCF network element performs interaction through a service-oriented interface. For example, an external service-oriented interface provided by the AMF network element may be Namf. An external service-oriented interface provided by the SMF network element may be Nsmf. An external service-oriented interface provided by the UDM network element may be Nudm. An external service-oriented interface provided by the UDR network element may be Nudr. An external service-oriented interface provided by the PCF network element may be Npcf. An external service-oriented interface provided by a BSF network element may be Nbsf. An external service-oriented interface provided by the NEF network element may be Nnrf. An external service-oriented interface provided by the NRF network element may be Nnrf. An external service-oriented interface provided by the NSSF network element may be Nnssf. An external service-oriented interface provided by an NWDAF network element may be Nnwdaf. It should be understood that, for related descriptions of names of various service-oriented interfaces in FIG. 3, refer to a 5G system architecture diagram in the 23501 standard. Details are not described herein.

It should be noted that FIG. 3 merely shows one UPF network element and one SMF network element for example. Certainly, a plurality of UPF network elements and SMF network elements may be included. For example, an SMF network element 1 and an SMF network element 2 are included. This is not specifically limited in this embodiment of this application. For a manner in which network elements are connected to each other, refer to the network architecture shown in FIG. 3. Details are not described one by one herein again. Names of interfaces between the network elements in FIG. 3 are merely an example, and the interfaces may have other names during specific implementation. This is not specifically limited in this embodiment of this application.

It should be noted that the access device, the AF network element, the AMF network element, the SMF network element, the AUSF network element, the UDM network element, the UPF network element, the PCF network element, and the like in FIG. 3 are merely names, and the names do not constitute any limitation on the devices. In a 5G network and another future network, network elements corresponding to the access device, the AF network element, the AMF network element, the SMF network element, the AUSF network element, the UDM network element, the UPF network element, and the PCF network element may have other names. This is not specifically limited in the embodiments of this application. For example, the UDM network element may alternatively be replaced with a home subscriber server (HSS), a user subscription database (USD), a database entity, or the like. A general description is provided herein, and details are not described again subsequently.

It should be noted that a network architecture in the embodiments of this application is not limited to the 5G fixed-mobile convergence network architecture, and any architecture in which a terminal accesses the second network by using the first network is applicable to the embodiments of this application. The first network or the second network may be a private network, a long time evolution (LTE) network, a MulteFire network, a home base station network, a mobile network accessed through non-3GPP such as Wi-Fi, a future 6G network, or the like. An access network (AN) in the first network may be an NG RAN, or may be an access gateway function (AGF) for fixed network access, a network gateway control device (BNG), a wireline access network/fixed access network (Wireline AN), a private network access network, a multifire network access, an untrusted access gateway (Non-3GPP Interworking Function, N3IWF), or a trusted access gateway.

The first terminal or the second terminal in the embodiments of this application may include various devices that have a wireless communication function and that can be connected to a mobile network, for example, a handheld device, a vehicle-mounted device, a wearable device, a computing device, or another processing device connected to a wireless modem, or may include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, user equipment (UE), a mobile station (MS), a terminal device, or relay user equipment. In the following embodiments of this application, the first terminal is used as 5GC capability user equipment. For example, the 5GC capability user equipment may be a smartphone, and the second terminal is relay user equipment. For example, the relay user equipment may be a 5G residential gateway (RG).

Functions of the network elements in FIG. 2 and FIG. 3 are as follows:

A main function of the NSSF network element includes selecting a group of network slice instances for the terminal, or determining allowed network slice selection assistance information (NSSAI) and determining an AMF network element set that can serve the terminal, and the like.

A main function of the NRF network element includes a service discovery function, maintaining NF text of an available network function (NF) instance, and a service supported by the NF instance.

The AF network element interacts with a 3GPP core network to provide a service, including interacting with the NEF, interacting with a policy architecture, or the like. For example, the AF network element is used to send an application-related requirement to the PCF network element, so that the PCF network element generates a corresponding policy.

Main functions of the NEF network element include: securely exposing a service and a capability provided by a 3GPP network function, including internally exposing, exposing to a third party, or the like, and converting or translating information exchanged with the AF network element and information exchanged between internal network functions, for example, an AF service identifier, internal 5G core information such as a DNN, and a single network slice selection assistance information (S-NSSAI) identifier.

The UDM supports processing of a letter of credence for authentication, user identity processing, access authorization, registration and mobility management, subscription management, short message management, or the like in a 3GPP authentication and a key agreement mechanism.

The AUSF network element functions as an authentication server, and is mainly responsible for authenticating user equipment and determining validity of the user equipment. The AUSF network element is used to interact with the UDM to obtain user information, and performs an authentication-related function, for example, generating an intermediate key.

The UDR is configured to store subscription data, policy information (Policy Data), application data, and the like of the terminal. The subscription data in this embodiment of this application may also be referred to as subscription information. The following embodiment uses the subscription information as an example.

The DN is used to provide a service for the terminal. For example, a mobile carrier service, an internet service, or a third-party service is provided.

The following describes in detail a communication method provided in embodiments of this application with reference to FIG. 1 to FIG. 3.

It should be noted that in the following embodiments of this application, names of messages between network elements, names of parameters in messages, or the like are merely examples, and may be other names in a specific implementation. This is not specifically limited in the embodiments of this application.

An execution owner of a transmit end in the communication method according to an embodiment of this application may be the first control plane network element, or may be an apparatus applied to the first control plane network element, for example, a chip or a chip system applied to the first control plane network element. An execution owner of a receive end of the communication method may be the user plane network element and/or the first terminal, or may be an apparatus applied to the user plane network element and/or the first terminal, for example, a chip or a chip system applied to the user plane network element and/or the first terminal. The following embodiments are separately described by using the first control plane network element, the user plane network element and/or the first terminal as examples.

Figure 4:
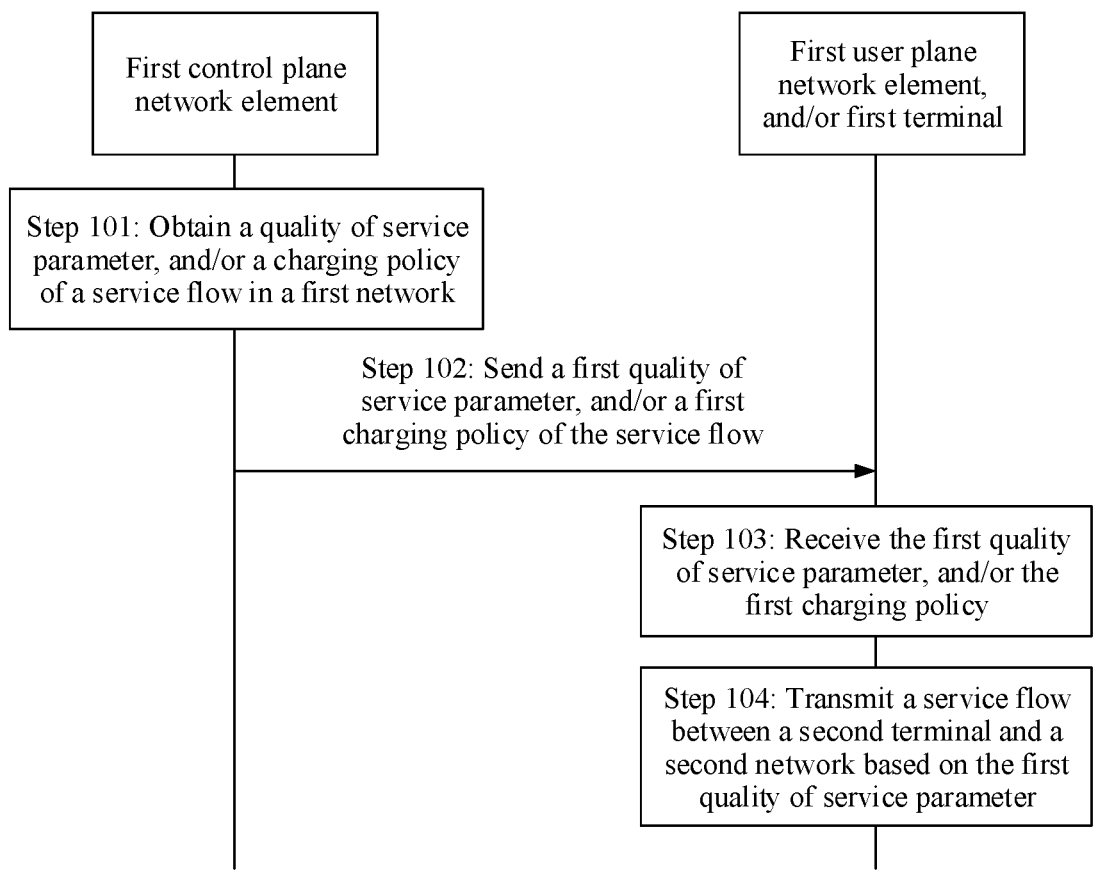
FIGS. 4-13C are schematic flowcharts of a respective communication method according to embodiments of this application.

As shown in FIG. 4, FIG. 4 shows a communication method according to an embodiment of this application. The method may be applied to the communications system shown in FIG. 1. It should be noted that the communications system shown in FIG. 1 is intended to describe the technical solutions in the embodiments of this application more clearly, and do not constitute a limitation on the technical solutions provided in the embodiments of this application. The method includes the following operations.

Operation 101: A first control plane network element in a first network obtains a quality of service (Quality of Service, QoS) parameter and/or a charging policy of a service flow in the first network.

The service flow is a service flow in which a second terminal communicates with a second network by using a first terminal and a user plane network element in the first network. The following embodiments are separately described by using the user plane network element in the first network as a first user plane network element as an example.

For example, the first network may be the first network 20 shown in FIG. 1. The first control plane network element may be the first control plane network element 201 shown in FIG. 1. The first user plane network element may be the UPF network element 203 shown in FIG. 2. The first terminal may be the first terminal 202 shown in FIG. 1.

It should be understood that, for ease of description, the quality of service parameter of the service flow in the first network is briefly referred to as a first quality of service parameter in the following. The charging policy of the service flow in the first network is briefly referred to as a first charging policy.

For example, the service flow may be a voice service flow or a video service flow. The service flow may also be a service flow of another type. The service flow may be a downlink service flow sent by the second network to the second terminal by using the first network. The service flow may alternatively be an uplink service flow sent by the second terminal to the first network by using the first network.

The service flow may refer to a set of all service flows between the second terminal and the second network. Different service flows in the set of service flows may have different first quality of service parameters and/or first charging policies in the first network, and may have same first quality of service parameters and/or first charging policies. This is not limited in this embodiment of this application. For example, a terminal has a service flow 1 and a service flow 2. The service flow 1 corresponds to a QoS parameter 1. The service flow 2 corresponds to a QoS parameter 2.

It should be understood that operation 101 in this embodiment of this application may have the following meaning: The first control plane network element may obtain the first quality of service parameter of the service flow. Alternatively, the first control plane network element may obtain the first charging policy of the service flow. Alternatively, the first control plane network element may obtain the first quality of service parameter and the first charging policy of the service flow.

Content of a quality of service parameter in this embodiment of this application may include any one or more of a priority, a delay, a bandwidth, a packet loss rate, and a guaranteed flow bit rate (GFBR). Different service flows have different requirements for quality of service parameters. For example, a bandwidth-guaranteed service flow requires sufficient bandwidth, and a delay-guaranteed service flow is sensitive to a delay, and requires a relatively short delay. In this embodiment of this application, the quality of service parameter is used to determine a network resource that needs to be provided for the service flow and that meets a transmission quality requirement, to ensure reliable transmission of the service flow.

A charging policy in this embodiment of this application may be: charging by time, charging by traffic, or charging by both time and traffic.

The network resource is a resource that can be used by the first terminal and/or the first user plane network element to meet a QoS parameter of the service flow when the service flow is transmitted in the first network. For example, the first quality of service parameter is bandwidth. In this case, the first terminal and the first user plane network element may reserve sufficient bandwidth resources for the service flow, so that transmission of the service flow reaches a bandwidth value indicated by the first quality of service parameter.

Operation 102: The first control plane network element sends the first quality of service parameter and/or the first charging policy of the service flow to the first user plane network element and/or the first terminal.

In one embodiment, operation 102 may be implemented by using the following operations: The first control plane network element sends the first quality of service parameter and/or the first charging policy of the service flow to the first user plane network element. The first control plane network element sends the first quality of service parameter of the service flow to the first terminal.

In addition, in another possible implementation, the first control plane network element may further send the first charging policy to the charging system 40. Then the charging system 40 performs charging control on the service flow according to the first charging policy.

Operation 103: The first user plane network element and/or the first terminal receive/receives the first quality of service parameter and/or the first charging policy from the first control plane network element in the first network.

Operation 104: The first terminal and/or the first user plane network element transmit/transmits a service flow between the second terminal and the second network based on the first quality of service parameter.

For example, for uplink transmission, the first terminal receives an uplink service flow from the second terminal. The first terminal transmits the uplink service flow to the first network by using the first quality of service parameter.

Then the first user plane network element transmits the received uplink service flow to the second network by using the first quality of service parameter. For downlink transmission, the first user plane network element receives a downlink service flow from the second network for the second terminal. The first user plane network element transmits the downlink service flow to the first terminal by using the first quality of service parameter. Then the first terminal transmits the received downlink service flow to the second terminal by using the first quality of service parameter.

It should be understood that the first quality of service parameter may meet a QoS requirement for transmitting the service flow in the first network.

This embodiment of this application provides a communication method. In the current technology, when the first network forwards a service flow of the second terminal during communication between the second terminal and the second network, the first control plane network element does not learn a quality of service parameter that is of a service flow of the second terminal and that is transmitted in the first network. In addition, the first network does not clearly know a charging policy of the service flow of the second terminal in the first network. Therefore, in this embodiment of this application, the first control plane network element in the first network obtains the first quality of service parameter and/or the first charging policy of the service flow in the first network, and sends the first quality of service parameter and/or the first charging policy of the service flow to the first terminal and/or the first user plane network element. In this way, the first terminal and the first user plane network element may adjust a network resource in the first network based on the first quality of service parameter, so that transmission quality of the service flow in the first network meets a QoS requirement. In addition, the first network may further implement charging control on the service flow in the first network according to the first charging policy.

The second terminal accesses the second network by using the first network, so that the first control plane network element may obtain the first quality of service parameter and/or the first charging policy based on a second quality of service parameter and/or a second charging policy of a transmission service flow in the second network. It should be understood that the second quality of service parameter in this embodiment of this application is a quality of service parameter of the service flow in the second network. The second charging policy is a charging policy of the service flow in the second network. The following uses the second quality of service parameter and the second charging policy as an example for description. The following describes several possible implementations of operation 101 by using examples.

Figure 5:
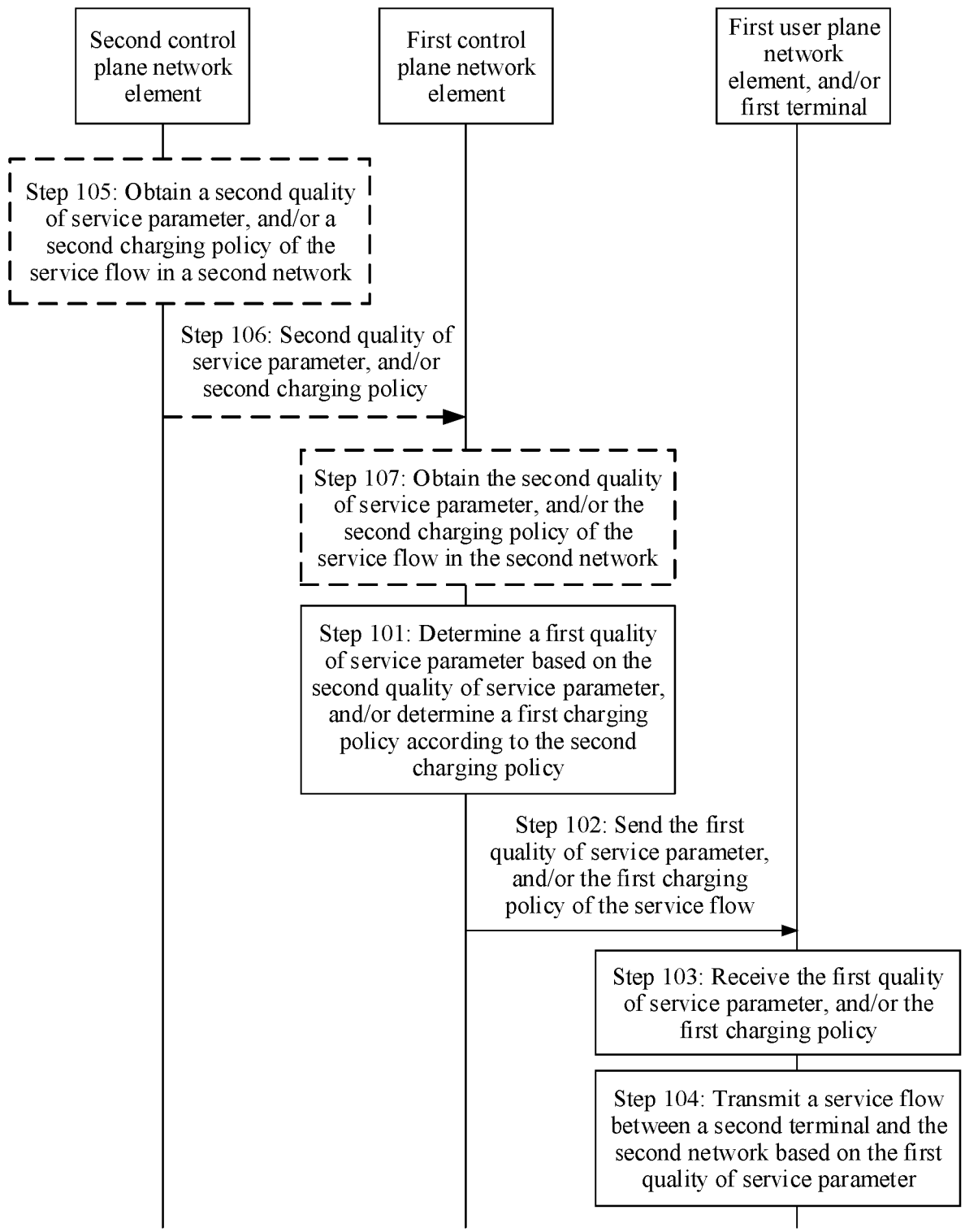

In a possible embodiment, as shown in FIG. 5, before operation 101, the method provided in this embodiment of this application may further include the following operations.

Operation 105: A second control plane network element in the second network obtains the second quality of service parameter and/or the second charging policy of the service flow in the second network.

For example, the second network may be the second network 30 shown in FIG. 1. The second control plane network element may be the second control plane network element 301 shown in FIG. 1. The second terminal may be the terminal 10 shown in FIG. 1.

Operation 106: The second control plane network element sends the second quality of service parameter and/or the second charging policy of the service flow to the first control plane network element.

In one embodiment, operation 106 in this embodiment of this application may be implemented by the following manner: The second control plane network element sends a first request message to the first control plane network element in the first network. The first request message carries the second quality of service parameter and/or the second charging policy of the service flow. For example, the first request message may be a policy request message.

For example, the second control plane network element may send, to the first control plane network element, an identifier of the service flow and a second quality of service parameter associated with the identifier of the service flow and/or a second charging policy associated with the identifier of the service flow. The identifier of the service flow may be used to identify the service flow.

For example, the identifier of the service flow may be quintuple information of the service flow, or differentiated services code point (DSCP) information of the service flow. A specific value of the DSCP information may indicate a specific priority. When the second terminal is an important terminal, or the second terminal that requests the service flow is an important user (for example, a paying user), the DSCP information of the service flow is used to indicate a DSCP with a relatively high priority, and the DSCP is allocated to the service flow.

For example, the quintuple information of the service flow may be inner quintuple information of the service flow. For example, the DSCP information may be outer DSCP information of the service flow. For example, the inner quintuple information of the service flow includes at least one of an inner source IP address, a destination IP address, a source port number, a destination port number, and an inner protocol type.

Operation 107: The first control plane network element obtains the second quality of service parameter and/or the second charging policy of the service flow in the second network from the second control plane network element.

Correspondingly, as shown in FIG. 5, as a possible implementation, operation 101 in this embodiment of this application may be implemented in the following manner: The first control plane network element determines the first quality of service parameter based on the second quality of service parameter of the service flow in the second network and/or determines the first charging policy according to the second charging policy of the service flow in the second network.

For example, the first control plane network element determines that the first quality of service parameter is the second quality of service parameter and/or the first control plane network element determines that the first charging policy is the second charging policy. In this way, quality of service parameters of the service flow that is transmitted in the first network and the second network are consistent with each other. In this way, a service flow transmission error caused by inconsistency of the quality of service parameters of the service flow that is transmitted in the first network and the second network is avoided.

For example, the second quality of service parameter of the service flow in the second network is a QoS parameter 2, and the second charging policy is a charging policy 2. The QoS parameter 2 includes a bandwidth of 10 M and a delay of 5 ms. In this case, the first control plane network element may determine that a bandwidth of the service flow is 10 M, and a delay of the service flow is 5 ms when the service flow is transmitted in the first network. The first control plane network element may determine that the charging policy 2 is used for charging control for the service flow in the first network. For example, the charging policy 2 is charging at a granularity of 5 milliseconds.

Example (I): Service Flow as a Granularity

In a first possible implementation, operation 105 in this embodiment of this application may be implemented in the following manner: The second control plane network element obtains the identifier of the service flow. The second control plane network element obtains the second quality of service parameter and/or the second charging policy of the service flow based on the identifier of the service flow.

For example, the second control plane network element may obtain the identifier of the service flow from the second terminal. Alternatively, the second network may obtain the identifier of the service flow from a packet header of the service flow.

The second control plane network element stores a mapping relationship between the identifier of the service flow and the second quality of service parameter and/or a mapping relationship between the identifier of the service flow and the second charging policy.

In addition, the second control plane network element may obtain, from a second user data management network element in the second network, the second quality of service parameter and/or the second charging policy of the service flow in the second network based on the identifier of the service flow. For example, in a 5G network, the second user data management network element may be a UDM network element. In a 4G network, the second user data management network element may be an HSS.

For example, in Example (I), the second control plane network element may be a second policy control network element, and the first control plane network element may be a first policy control network element or a first session management network element. For example, as shown in FIG. 2, the second control plane network element is a second PCF network element. The first control plane network element is a first PCF network element, or a first SMF network element. For example, if the second control plane network element determines that the second terminal manages a second session that serves the second terminal in the second network, operation 105 and operation 106 may be performed. Alternatively, the first control plane network element sends a second request message to the second control plane network element. The second request message is used to request the second quality of service parameter and/or the second charging policy of the service flow in the second network. Then the second control plane network element determines, based on the second request message, that operation 105 and operation 106 may be performed. It should be understood that the second session is at least used to transmit the service flow. In other words, the service flow may be mapped to the second session when being transmitted in the second network. A session in this embodiment of this application may be a packet data unit (PDU) in the 5G network, or public data network (PDN) connection in the 4G network.

Figure 6:
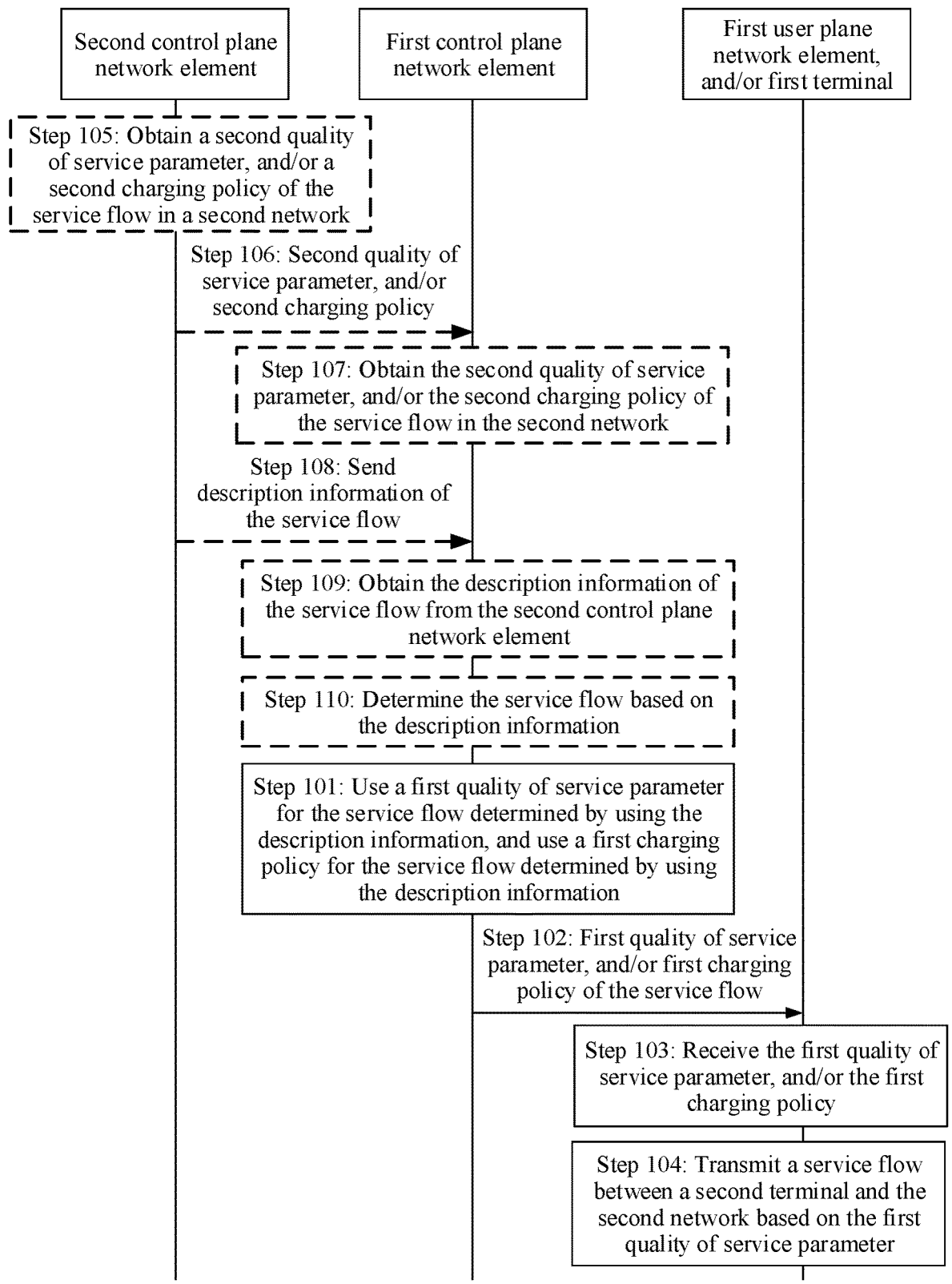

In one embodiment, as shown in FIG. 6, the method provided in this embodiment of this application further includes:

Operation 108: The second control plane network element sends description information of the service flow to the first control plane network element.

It should be noted that the description information of the service flow that the second control plane network element sends to the first control plane network element may be carried in the first request message. Certainly, the description information of the service flow sent by the second control plane network element to the first control plane network element may alternatively be carried in a third request message. The third request message and the first request message are different messages. Certainly, the third request message and the first request message may be information elements in a same message.

Operation 109: The first control plane network element obtains the description information of the service flow from the second control plane network element.

In other words, the first control plane network element may receive the description information, the second quality of service parameter and/or the second charging policy of the service flow by using the first request message. Alternatively, the first control plane network element may receive the description information of the service flow by using the second request message.

Operation 110: The first control plane network element determines the service flow based on the description information.

For example, the description information includes any one or more pieces of the following information: address information of the first terminal, port number information of the second terminal, information about the second terminal, the quintuple information of the service flow, or the DSCP information of the service flow.

It should be understood that the first control plane network element in Example (I) may determine the first quality of service parameter and/or the first charging policy of the service flow by using the service flow or the DSCP as a granularity. In other words, the first quality of service parameter and the first charging policy are used for a service flow determined by using the description information.

Correspondingly, as shown in FIG. 6, as another possible implementation of this application, operation 101 may be implemented in the following manner: The first control plane network element determines to use the first quality of service parameter for the service flow determined by using the description information, and use the first charging policy for the service flow determined by using the description information.

Example (II): Security Parameter Index (SPI) Granularity, Quality of Service Flow Identifier (QFI) Granularity, or DSCP Granularity It should be understood that service flows may be aggregated into Qos flows, and each Qos flow corresponds to one QFI. Therefore, quality of service parameter or charging policy control may be implemented on the service flow by using the QFI as a granularity. In addition, a plurality of QFIs may be aggregated into an SPI, therefore the quality of service parameter or charging policy control may be implemented on the service flow by using the SPI as a granularity.

In a second possible implementation, the description information of the service flow in operation 108, operation 109, and operation 110 may be the QFI, the SPI, or the DSCP information.

In other words, operation 106 in this embodiment of this application may be implemented by using the following operations: The second control plane network element sends the description information and any one or more pieces of the following information: a target quality of service parameter, or a target charging policy to the first control plane network element. In other words, the first control plane network element may receive the description information and any one or more pieces of the following information: the target quality of service parameter, or the target charging policy from the second control plane network element.

Specifically, the first control plane network element may receive the description information and the target quality of service parameter associated with the description information from the second control plane network element, and/or the first control plane network element may receive the description information and the target quality of service parameter associated with the description information from the second control plane network element. The description information is used to determine a service flow that is in service flows of the second terminal and that meets a preset requirement. In other words, the second terminal may have a plurality of service flows. In this case, the second control plane network element may indicate the first control plane network element to transmit, by using the target quality of service parameter, and/or perform charging, according to the target charging policy, the service flow determined based on the description information in the first network.

For example, the description information is a QFI. If the QFI is equal to 1, the target quality of service parameter and the target charging policy are associated. QFIs of both a service flow 1 and a service flow 2 of the second terminal are 1, and quality of service parameters of the service flow 1 and the service flow 2 in the first network are target quality of service parameters. If the service flows of the second terminal include a service flow 3 and a service flow 4, a QFI of the service flow 3 is equal to 1, and a QFI of the service flow 4 is equal to 2, the first control plane network element may determine to use the target quality of service parameter for the service flow 3 and use the target charging policy for the service flow 3.

In this embodiment of this application, the description information and a target charging policy associated with the description information may be the description information and target charging policy information associated with the description information. The target charging policy information may be used to identify the target charging policy. For example, the target charging policy information may be an identifier or an index of the target charging policy. Alternatively, the target charging policy information is the target charging policy.

In this embodiment of this application, the description information and the target quality of service parameter associated with the description information may be the description information and target quality of service parameter information associated with the description information. The target quality of service parameter information may be used to determine the target quality of service parameter. For example, the target quality of service parameter information may be an identifier or an index of the target quality of service parameter. Alternatively, the target quality of service parameter information is the target quality of service parameter. In this case, operation 101 may be implemented in the following manner: The first control plane network element may determine that the first quality of service parameter is the target quality of service parameter. The first control plane network element may determine that the first charging policy is the target charging policy.

For example, the target quality of service parameter may be the second quality of service parameter. The target charging policy is the second charging policy. The target quality of service parameter may be a quality of service parameter pre-stored in the first control plane network element. The target charging policy may be a charging policy pre-stored in the first control plane network element. In an example, if the second control plane network element determines that there are a quality of service parameter that meets a transmission requirement of the service flow and a charging policy that meets a charging requirement in the first network, the second control plane network element may send a mapping relationship between the description information and the target quality of service parameter information, and/or send a mapping relationship between the description information and the target charging policy information to the first control plane network element. So that the first control plane network element determines the target quality of service parameter from the first network based on the target quality of service parameter information, and determines the target charging policy from the first network based on the target charging policy information.

It should be understood that, if the first quality of service parameter and the first charging policy of the service flow are determined by using an SPI granularity, a QFI granularity, or a DSCP granularity, the first quality of service parameter meets a sum of QoS requirements of a plurality of service flows with a same SPI, a same QFI, or a same DSCP. The plurality of service flows with a same SPI, a same QFI, or a same DSCP are charged according to the first charging policy. Specifically, network resources determined by using the first quality of service parameter may be allocated to the plurality of service flows with a same SPI, a same QFI, or a same DSCP according to a preset requirement.

For example, the QFIs of the service flow 1 and the service flow 2 are the same. If a bandwidth in the first quality of service parameter corresponding to the QFI is 100 M, total transmission bandwidths of the service flow 1 and the service flow 2 in the first network should meet 100 M. For example, if a priority of the service flow 1 is higher than a priority of the service flow 2, a bandwidth allocated to the service flow 1 during transmission in the first network may be greater than a bandwidth allocated to the service flow 2, but it needs to be ensured that the total transmission bandwidth of the service flow 1 and the service flow 2 in the first network should meet 100 M.

It should be understood that, if the target quality of service parameter is a delay 1, when the plurality of service flows with a same SPI, a same QFI, or a same DSCP are transmitted in the first network, a delay of at least one service flow needs to meet the delay 1.

For example, in this embodiment of this application, in the second possible implementation, the second control plane network element is the second policy control network element, and the first control plane network element is the first policy control network element. Alternatively, the second control plane network element is a second session management network element, and the first control plane network element is the first policy control network element or the first session management network element.

If the second control plane network element is the second policy control network element, the second control plane network element may obtain the foregoing mapping relationship from the second session management network element. If the second control plane network element is the second session management network element, the second control plane network element may obtain the foregoing mapping relationship from a second mobility management network element.

In one embodiment, for the second possible implementation, before operation 105, the method provided in this embodiment of this application may further include: The second session management network element determines that the second terminal initiates a session management procedure for the second session in the second network. The second session management network element sends a QoS profile to an access gateway. The access gateway determines a child security association (Child SA) corresponding to a QFI based on the QoS profile. Each Child SA has a unique identifier SPI. The access gateway sends a mapping relationship between the QFI and the SPI to the second mobility management network element by using an N2 message, so that the second mobility management network element transmits the mapping relationship to the second session management network element.

It should be understood that the QFI is a QFI carried in an inner GRE packet header of the service flow. The SPI is a Child SA identifier, and DSCP information is DSCP information in outer IP packet header information of the service flow.

The QoS profile in this embodiment of this application is generated by the second session management network element for a first session or the QoS flow according to a policy and charging control (PCC) rule (PCC rules).

(A) That the second control plane network element is the second policy control network element, and the first control plane network element is the first policy control network element is used as an example.

For example, In one embodiment, operation 105 may be implemented in the following manner:

The second session management network element receives the mapping relationship between the QFI and the SPI from the access gateway through the second mobility management network element. The second session management network element sends a first parameter to the second policy control network element. The second policy control network element sends the first parameter to the first policy control network element.

The first parameter includes: a mapping relationship between the QFI and the target quality of service parameter, a mapping relationship between the SPI and the target quality of service parameter, or a mapping relationship between the DSCP and the target quality of service parameter.

In one embodiment, the first parameter may further include at least one of the address information of the first terminal, the port number information of the second terminal, the identifier of the second terminal, or an indirect access indication.

It should be noted that at least one of the address information of the first terminal, the port number information of the second terminal, the identifier of the second terminal, or the indirect access indication is sent by the second mobility management network element to the second session management network element.

That the second policy control network element sends the first parameter to the first policy control network element may be implemented in the following manners.

Manner 1: The second policy control network element determines the first policy control network element, and sends the first parameter to the first policy control network element.

For a manner in which the second policy control network element determines the first policy control network element, refer to the following manner in which the second control plane network element determines the first control plane network element. Details are not described herein in this embodiment of this application.

Manner 2: The second policy control network element sends the first parameter to a DRA or a BSF, and the DRA or the BSF sends the first parameter to the first policy control network element. Alternatively, the second policy control network element directly sends the first parameter to the first policy control network element.

Possibly, that the second session management network element sends the first parameter to the second policy control network element may be replaced with the following solution: The second session management network element places the first parameter in a container (container), and sends the container to the second policy control network element. Then the second policy control network element sends the container to the first policy control network element. It should be understood that the second policy control network element does not parse the parameter in the container.

(B) That the second control plane network element is the second session management network element, and the first control plane network element is the first policy control network element is used as an example.

For example, in another possible implementation, operation 105 may be implemented in the following manner:

The second session management network element receives a first parameter from the second mobility management network element. Then the second session management network element sends the first parameter to the first policy control network element.

For example, the second session management network element in this embodiment of this application may determine an identifier of the first policy control network element from the DRA or the BSF based on a first address.

(C) The second session management network element receives the first parameter from the second mobility management network element. Then the second session management network element sends the first parameter to the first session management network element.

It should be noted that the second possible implementation in this embodiment of this application mainly describes a case in which the first quality of service parameter and the first charging policy of the service flow in the first network is determined by using the DSCP granularity, the QFI granularity, and the SPI granularity. In this way, if a QFI included in a target service flow is consistent with a QFI indicated by the description information, an SPI is consistent with an SPI indicated by the description information, or a DSCP is consistent with a DSCP indicated by the description information, the first quality of service parameter and the first charging policy may be used for the target service flow. In other words, when the target service flow is transmitted in the first network, the target service flow should meet the first quality of service parameter.

For example, the QFI indicated by the description information is equal to 1. It is assumed that the QFI is equal to 1 corresponds to the first quality of service parameter and the first charging policy. In this case, if the QFIs of the service flow 1 and the service flow 2 are also 1, the first control plane network element may determine that the service flow 1 and the service flow 2 should meet the first quality of service parameter. For example, a maximum bandwidth in the first quality of service parameter is 100 M, so that a sum of maximum bandwidths of the service flow 1 and the service flow 2 during transmission in the first network is less than or equal to 100 M.

It should be understood that in Example (I) and Example (II), if the first control plane network element obtains the description information, the first control plane network element further needs to send the description information to the first terminal and the first user plane network element.

Example (III)

In a third possible implementation, operation 105 in this embodiment of this application may be replaced with the following manner: The second control plane network element sends a quality of service requirement and/or a charging policy requirement for transmitting the service flow in the first network to the first control plane network element. The first control plane network element obtains the quality of service requirement and/or the charging policy requirement for transmitting the service flow in the first network.

Correspondingly, operation 101 in this embodiment of this application may be implemented in the following manner: The first control plane network element determines the first quality of service parameter of the service flow based on the quality of service requirement and/or determines the first charging policy of the service flow based on the charging policy requirement.

It should be understood that in Example (III), the second control plane network element proposes, to the first control plane network element, the quality of service parameter requirement and/or the charging policy requirement for transmitting the service flow. In this way, the first control plane network element independently formulates, based on the quality of service requirement, the first quality of service parameter that meets the quality of service requirement, and/or the first control plane network element independently formulates, based on the charging policy requirement, the first charging policy that meets the charging policy requirement.

For example, the quality of service requirement may be a requirement proposed by the second control plane network element for any one or more of a bandwidth, a delay, a packet loss rate, and a GBR of service flow transmission.

For example, a bandwidth of a quality of service requirement proposed by the second control plane network element is 1 megabyte (M), so that the first control plane network element may independently select a quality of service parameter that can meet a bandwidth of 1 M.

Example (IV): Terminal Granularity

In a fourth possible implementation, operation 105 in this embodiment of this application may be specifically implemented in the following manner: The second control plane network element obtains a quality of service parameter and/or a charging policy of the second terminal in the second network from a user data management network element in the second network.

For example, that the second control plane network element obtains a quality of service parameter and/or a charging policy of the second terminal in the second network from a user data management network element in the second network includes: The second control plane network element queries subscription information of the second terminal from the user data management network element based on the information about the second terminal. The second control plane network element obtains a quality of service parameter and/or a charging policy of the second terminal in the first network from the subscription information of the second terminal.

The information about the second terminal may be the identifier of the second terminal. For the identifier of the second terminal, refer to an identifier of the first terminal.

After the second control plane network element determines the quality of service parameter and/or the charging policy of the second terminal in the second network, the second control plane network element may send the quality of service parameter and/or the charging policy of the second terminal in the second network to the first control plane network element. In other words, operation 101 in this embodiment of this application may be implemented in the following manner: The first control plane network element determines the first quality of service parameter of the service flow and/or the first charging policy based on the quality of service parameter and/or the charging policy of the second terminal in the second network.

For example, in the fourth possible implementation, the second control plane network element may be the second session management network element or the second mobility management network element. The first control plane network element may be the first session management network element.

Example (VI): Terminal Granularity

In a fifth possible implementation, operation 101 in this embodiment of this application may be implemented in the following manner: The first control plane network element obtains a first quality of service parameter and/or a first charging policy of the second terminal in the first network from a user data management network element in the first network.

Figure 7:
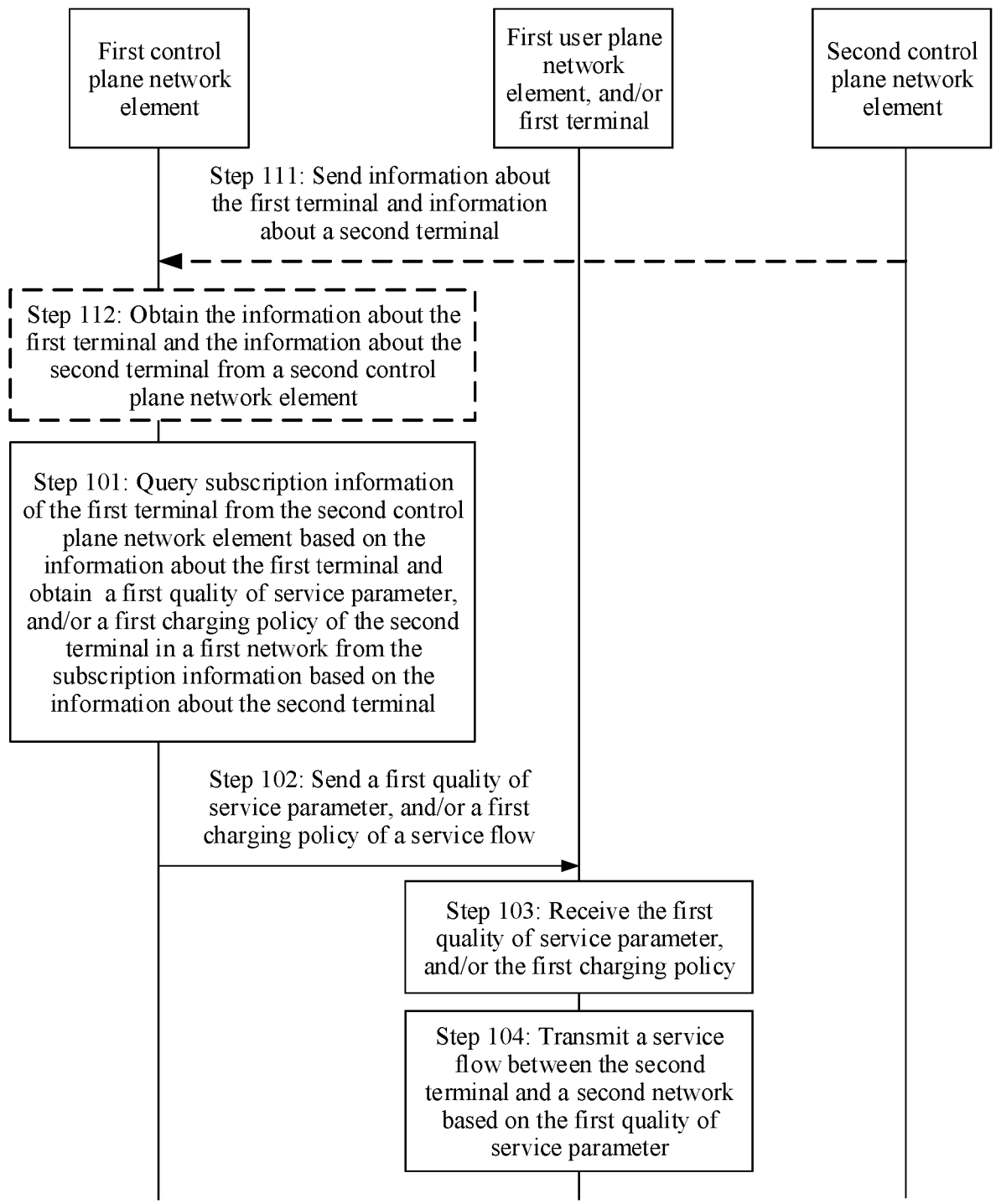

Correspondingly, in the fifth possible implementation, as shown in FIG. 7, before operation 101, the method further includes:

Operation 111: The second control plane network element sends information about the first terminal and the information about the second terminal to the first control plane network element.

The information about the second terminal is used to identify the second terminal. For example, the information about the second terminal may be a subscriber permanent identifier (SUPI), a subscriber concealed identifier (SUCI), or a phone number.

The information about the first terminal may be the identifier of the first terminal, port number information that is of the second terminal and that is allocated by the first terminal to the second terminal, or the address information of the first terminal. The address information of the first terminal is a source address used when the service flow of the second terminal is transmitted in the first network.

Operation 112: The first control plane network element obtains the information about the first terminal and the information about the second terminal from the second control plane network element.

Correspondingly, as another possible implementation in this embodiment of this application, as the fifth possible implementation of operation 101, that the first control plane network element obtains a first quality of service parameter and/or a first charging policy of the second terminal in the first network from the user data management network element in the first network includes: The first control plane network element queries subscription information of the first terminal from the second control plane network element based on the information about the first terminal. The first control plane network element obtains the first quality of service parameter and/or the first charging policy of the second terminal in the first network from the subscription information based on the information about the second terminal.

For example, the user data management network element in the first network has the subscription information of the first terminal. The subscription information of the first terminal includes at least the first quality of service parameter and/or the first charging policy of the second terminal.

For example, the user data management network element in the first network may be a first UDM network element or a first HSS. It should be understood that in the fifth possible implementation, the second control plane network element may be the second session management network element or the second mobility management network element. The first control plane network element may be the first mobility management network element or the first session management network element.

It should be noted that the fourth possible implementation and the fifth possible implementation mainly describe a case in which the first quality of service parameter and the first charging policy of the service flow is determined by the first control plane network element by using a terminal as the granularity.

For the terminal granularity, for example, the first quality of service parameter includes at least one of a total maximum bit rate (TMBR) of the second terminal, an aggregate maximum bit rate (AMBR) of the second terminal, a 5G QoS identifier (5QI), and an allocation/retention priority (ARP). In this case, transmission quality of all service flows of the second terminal in the first network should meet at least one of the TMBR of the second terminal, the ARP, the AMBR of the second terminal, or the 5QI. For example, a sum of TMBRs of the service flow 1 and the service flow 2 of the second terminal should be less than or equal to the maximum TMBR of the second terminal.

In a possible embodiment, the second control plane network element obtains the first quality of service parameter and/or the first charging policy to trigger the first control plane network element. The second control plane network element first needs to determine the first control plane network element in the first network.

Figure 8A:
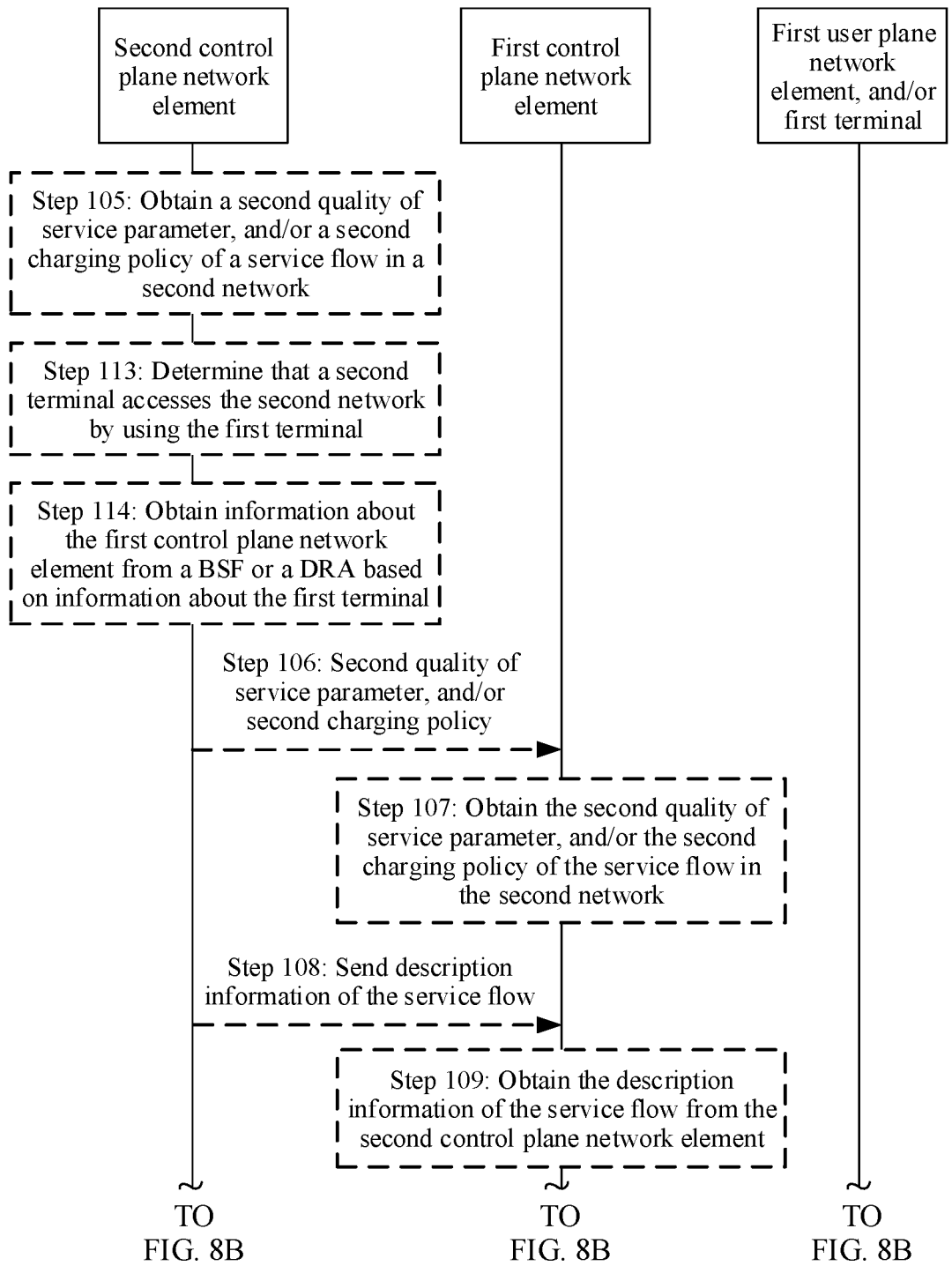
Figure 8B:
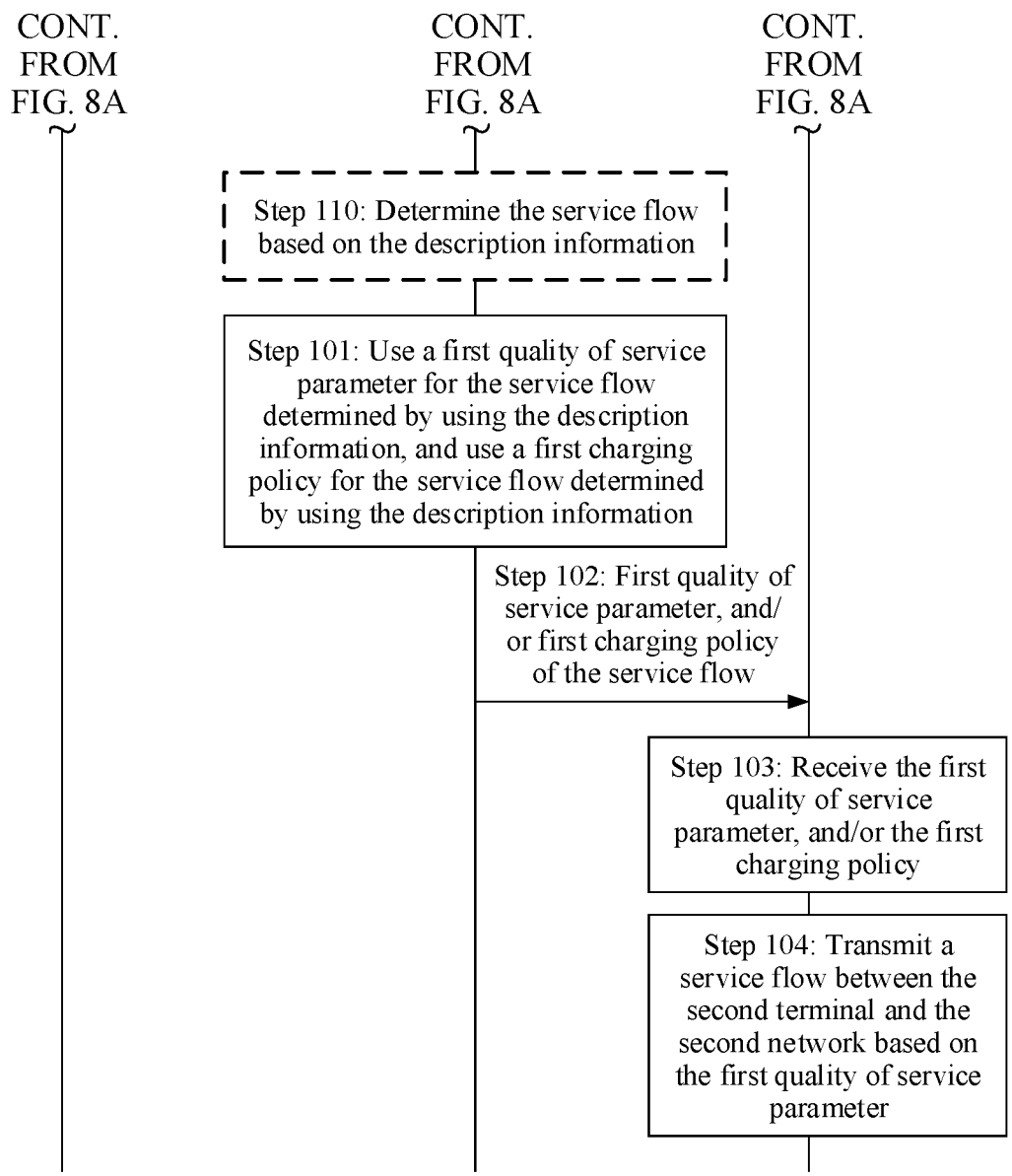

In one embodiment, as shown in FIG. 8A and FIG. 8B, before operation 106 or operation 111, the method provided in this embodiment of this application may further include:

Operation 113: The second control plane network element determines that the second terminal accesses the second network by using the first terminal. The first terminal is a terminal served by the first network.

For example, operation 113 in this embodiment of this application may be implemented in the following manner: The second control plane network element obtains indication information from the second session management network element or the second mobility management network element in the second network, and the second control plane network element determines, based on the indication information, that the second terminal accesses the second network by using the first terminal.

For example, the indication information may be at least one of the address information of the first terminal, the port number information of the second terminal, or the indirect access indication. The indirect access indication is used to indicate that the second terminal accesses the second network by using the first terminal, or is used to indicate that an address of the first terminal is a local address of the second terminal, and the foregoing address of the first terminal is a session IP address obtained by the first terminal in the first network. The address information of the first terminal is the local address of the second terminal, or the address information of the first terminal is carried in a local address parameter of the second terminal.

The address information of the first terminal is used to determine the address of the first terminal. The address of the first terminal is a source address used when the service flow is transmitted in the first network. In other words, when the service flow is transmitted in the first network, the first terminal may replace the source address of the service flow with the address of the first terminal. For example, the address of the first terminal may be an IP address of the first terminal. It should be noted that the address of the first terminal is an IP address in outer IP packet header information of the service flow.

It should be understood that, after a service flow from the second terminal passes through the first terminal, the source address of the service flow is changed by the first terminal from a first local IP address to the address of the first terminal. A destination IP address of the service flow from the second terminal is still an address of an internet or an IP address of the access gateway. The access gateway in this embodiment of this application may be a trusted access gateway or an untrusted access gateway. The IP address of the access gateway may be an IP address of the trusted access gateway or an IP address of the untrusted access gateway.

The port number information of the second terminal is a port number allocated by the first terminal to the second terminal. In other words, the port number information of the second terminal is a port number allocated by the first terminal to the second terminal when the second terminal accesses the first terminal. In this way, a plurality of second terminals that access to a same first terminal can be distinguished. For example, both a terminal 1 and a terminal 2 access the first terminal, so that the first terminal may allocate a first port number 1 to the terminal 1. The first terminal may allocate a first port number 2 to the terminal 2. It should be noted that a first port number is a port number in the outer IP packet header information of the service flow.

For example, the indirect access indication in this embodiment of this application may be an indication, or the indirect access indication may be the identifier of the first terminal. Alternatively, the indirect access indication may be a line identifier (line ID) of a fixed network access network or a service set identifier (SSID) of a wireless local area network (WLAN).

The port number information of the second terminal may be the port number or a port number segment allocated by the first terminal to the second terminal when the second terminal accesses the first terminal.

Operation 114: The second control plane network element obtains information about the first control plane network element from the BSF or the DRA based on the information about the first terminal.

The information about the first control plane network element is used to determine the first control plane network element. In this way, the second control plane network element may determine the first control plane network element based on the information about the first control plane network element. For example, the information about the first control plane network element may be an address of the first control plane network element or an identifier of the first control plane network element.

In one embodiment, operation 114 in this embodiment of this application may be implemented by the following manner: The second control plane network element sends a first query message to the BSF or the DRA in the second network. The first query message is used to request the first control plane network element that provides a service for the first terminal. The first query message includes any one or more of the address information of the first terminal, the port number information of the second terminal, the indirect access indication, or the identifier of the first terminal. The BSF or the DRA, based on the first query message, determines the first control plane network element that provides a service for the first terminal from a preset mapping relationship. The second control plane network element receives information about the first control plane network element from the BSF or the DRA, and determines the first control plane network element based on the information about the first control plane network element.

It should be understood that the preset mapping relationship includes a mapping relationship between the address information of the first terminal and the first control plane network element, or a mapping relationship between the port number information of the second terminal and the first control plane network element, and a mapping relationship between the identifier of the first terminal and the first control plane network element.

It should be understood that, in this embodiment of this application, when the second control plane network element determines that the second terminal initiates a service request for the second network by using the first network, the second control plane network element performs operation 105 or operation 110.

A session management procedure in this embodiment of this application may be a procedure of creating, modifying, or deleting a first session. The first session may be a session that transmits the foregoing service flow.

For example, that the second control plane network element determines that the second terminal initiates a service request for the second network by using the first network may be implemented in the following manner: The second terminal sends a session management request message to the second mobility management network element or the second session management network element in the second network. The second mobility management network element sends the foregoing session request message to the second session management network element by using a transmission message. The foregoing transmission message includes at least one of the address information of the first terminal, the port number information of the second terminal, or the indirect access indication. After receiving the session management request message, the second mobility management network element or the second session management network element may send, to the second control plane network element, at least one of the address information of the first terminal, the port number information of the second terminal, or the indirect access indication. In this way, the second control plane network element may determine that the second terminal initiates a session management procedure for the first session.

For example, the second terminal in this embodiment of this application may send the session management request message to the second mobility management network element or the second session management network element by using the access gateway.

It should be understood that, if the session management request message of the second terminal is sent to the second session management network element, the second mobility management network element sends the session management request message to the second session management network element.

In the foregoing session management procedure, the second mobility management network element has a context of the second terminal. The context of the second terminal already has any one or more of the first address, the first port number, and the indirect access indication. Therefore, the context of the second terminal may be sent to a session management network element by using the transmission message. The second mobility management network element may generate the context of the second terminal in a process in which the second terminal requests to register with the second mobility management network element, or in a process in which the service flow of the second terminal is transmitted to the second network through the first network.

Figure 9A:
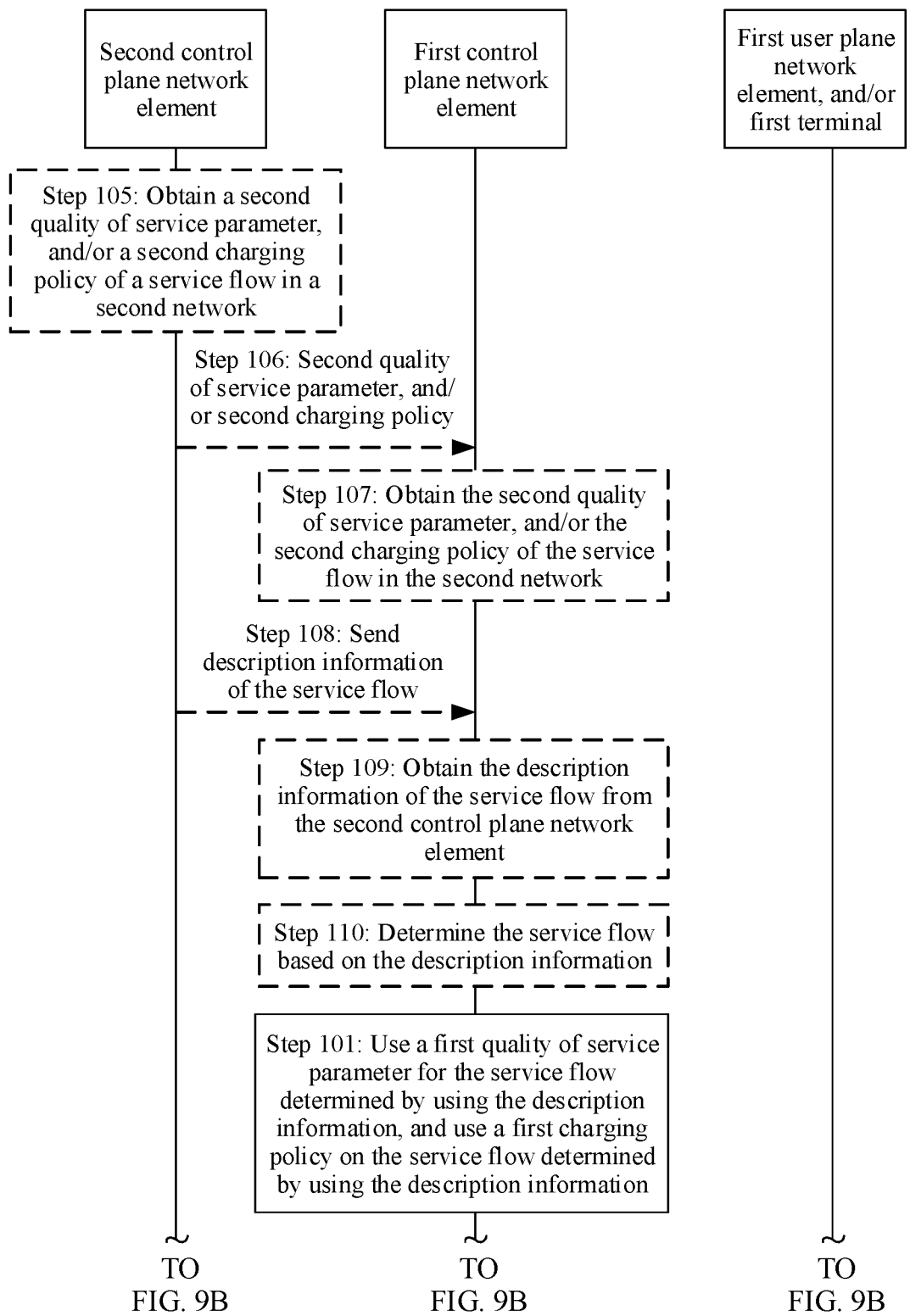
Figure 9B:
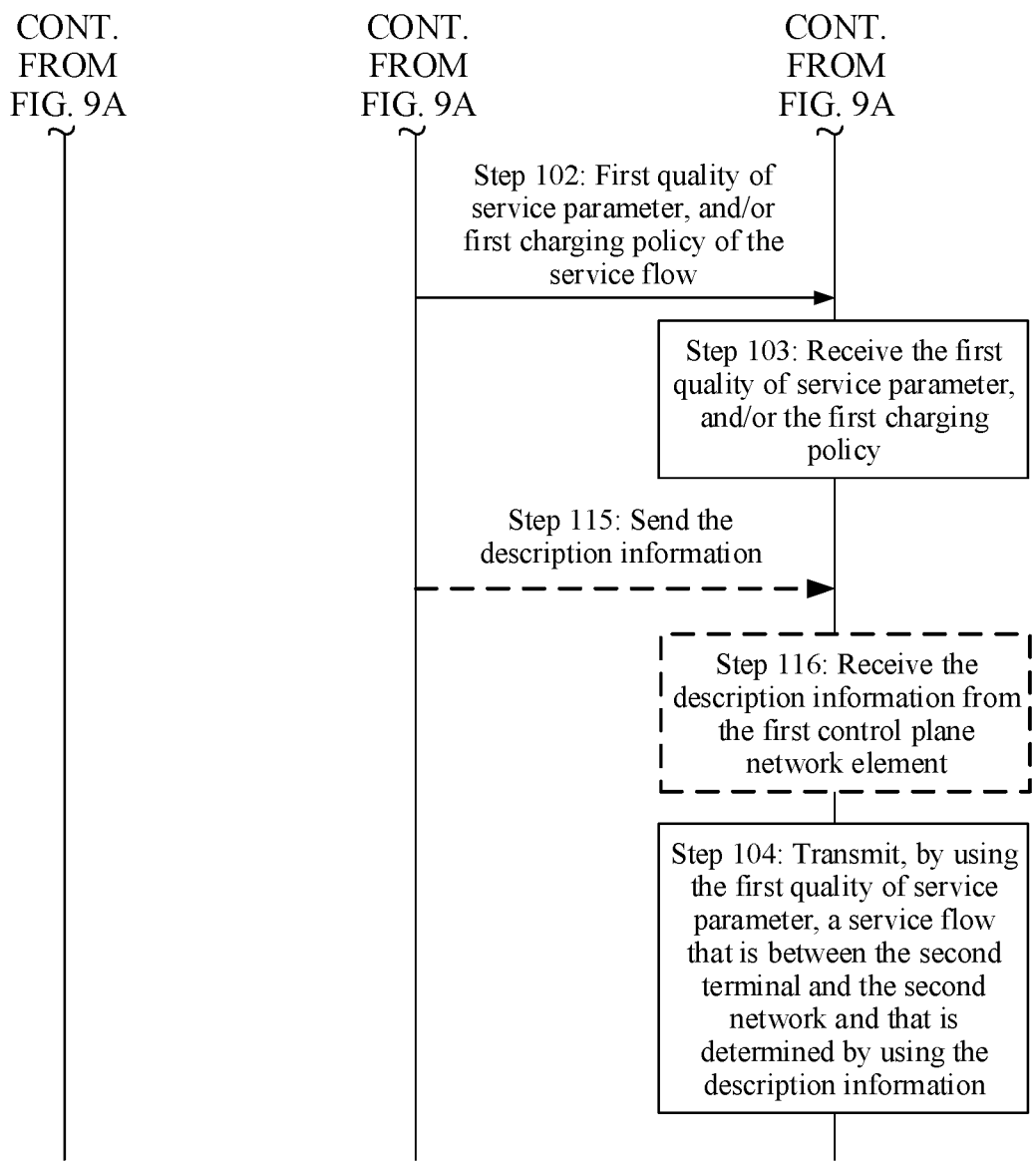

The foregoing embodiment mainly describes a process in which the first control plane network element obtains first information by interacting with the second control plane network element, and determines the first quality of service parameter and/or the first charging policy based on the first information. It should be understood that after the first control plane network element obtains the first quality of service parameter and/or the first charging policy, the first quality of service parameter and/or the first charging policy should be delivered to the first user plane network element/ the first terminal in the first network. As shown in FIG. 9A and FIG. 9B, the method provided in this embodiment of this application further includes:

Operation 115: The first control plane network element sends the description information to the first user plane network element and/or the first terminal.

For example, when the first control plane network element is the first policy control network element, the first control plane network element sends the description information to the user plane network element and/or the first terminal in the first network by using the first session management network element.

When the first control plane network element is the first session management network element, the first control plane network element may directly send the description information to the first user plane network element and/or the first terminal in the first network.

Operation 116: The first user plane network element and/or the first terminal receive/receives the description information from the first control plane network element.

Correspondingly, as shown in FIG. 9A and FIG. 9B, as a possible implementation of operation 104, the first user plane network element and/or the first terminal transmit/ transmits, by using the first quality of service parameter, a service flow that is between the second terminal and the second network and that is determined by using the description information.

For example, when the description information includes the address information of the first terminal, the port number information of the second terminal, and the quintuple information of the service flow, the first terminal and the first user plane network element match the outer IP packet header information of the service flow based on any one or more of the address information of the first terminal and the port number information of the second terminal, or, match inner IP packet header information of the service flow based on the quintuple information. In other words, an address in the outer IP packet header information of the service flow should be the same as the address of the first terminal, or have a mapping relationship with the address of the first terminal. A port number in the outer IP packet header information of the service flow is the same as the port number of the second terminal, or have a mapping relationship with the port number of the second terminal. The inner IP packet header information of the service flow is the same as a parameter indicated by the quintuple information.

For example, the second terminal has the service flow 1 and the service flow 2. A port number in outer IP packet header information of the service flow 1 is a port number 1, a port number in outer IP packet header information of the service flow 2 is a port number 2, a first address in the outer IP packet header information of the service flow 1 is an address 1, and a first address in the outer IP packet header information of the service flow 2 is an address 2. A source address in inner IP packet header information of the service flow 1 is an IP 1. A source IP address in inner IP packet header information of the service flow 2 is an IP 2. A first port number determined by the description information is the port number 2, a first address is the address 2, and a source address is the IP 2. In this case, the first terminal and the first user plane network element may determine that the service flow 2 is transmitted by using the first quality of service parameter, and/or is charged by using the first charging policy.

For example, when the description information includes the address information of the first terminal, the port number information of the second terminal, and the DSCP, the first terminal and the first user plane network element match the outer IP packet header information of the service flow based on any one or more of the address information of the first terminal and the port number information of the second terminal. The first terminal and the first user plane network element match a DSCP label in the inner IP packet header information of the service flow based on the DSCP. In other words, for a service flow that is in the service flows of the second terminal and in which an address in outer IP packet header information is consistent with or has a mapping relationship with the address of the first terminal, a port number in outer IP packet header information is consistent with or has a mapping relationship with the port number of the second terminal, and DSCP information in inner IP packet header information is consistent with or has a mapping relationship with the DSCP indicated by the description information, the first terminal or the first user plane network element uses the first quality of service parameter for transmission and/or the first charging policy for charging. Alternatively, the DSCP information may also match a DSCP label in the outer IP packet header information of the service flow.

It should be noted that when the first session management network element sends mapping relationships between the QFI, the SPI, and the DSCP and the target quality of service parameter and the target charging policy to the first terminal/the first user plane network element, in operation 116, the first terminal/the first user plane network element determines the service flow based on at least one of the address information of the first terminal, the port number information of the second terminal, the QFI, the SPI, and the DSCP.

In one embodiment, the method in this embodiment of this application may further include: The first control plane network element sends first indication information to the first user plane network element. The first indication information is used to indicate the first user plane network element to set a QFI in an outer data header (for example, an outer GPRS tunnel protocol user plane (GTP-U packet header) header) of the service flow based on a QFI, an SPI, or a DSCP carried in an inner data header (for example, an inner generic routing encapsulation (GRE) header) of the service flow. In this case, the first control plane network element may be the first session management network element.

For example, the first indication information may be a QFI mapping indication. The QFI mapping indication is used to indicate that the QFI in the outer GTP-U packet header of the service flow is set based on a QFI, an SPI or a DSCP in the inner GRE packet header of the service flow. The QFI mapping indication may indicate that the QFI in the inner GRE packet header of the service flow is the same as the QFI in the outer GTP-U packet header of the service flow. Alternatively, the first control plane network element uses the first indication information to indicate a correspondence between the QFI, the SPI, or the DSCP in the inner GRE packet header of the service flow and the QFI in the outer GTP-U packet header of the service flow. The first user plane network element identifies the target service flow by using the QFI, the SPI, or the DSCP carried in the inner GRE packet header. The first user plane network element sets a QFI in an outer GTP-U packet header of the target service flow based on the correspondence between the QFI, the SPI, or the DSCP in the inner GRE packet header of the service flow and the QFI in the outer GTP-U packet header of the service flow.

It should be understood that after receiving the first indication information, the first user plane network element processes the QFI in the outer data header of the service flow based on the first indication information, and transmits the processed service flow by using the first quality of service parameter.

In addition, the first terminal controls air interface quality of service between the second terminal and the first terminal based on the quality of service parameter. In other words, the air interface quality of service parameter is set based on the service of quality parameter. The foregoing air interface quality of service parameter includes at least one of a bandwidth value, preemption waiting duration, resource occupation duration, a service priority, and a terminal priority. For example, an air interface bandwidth value is consistent with a quality of service bandwidth value. Alternatively, longer resource occupation duration or/and shorter preemption waiting duration is allocated to a high-priority service or a high-priority terminal. Alternatively, when air interface resources are insufficient, a low-priority service or a low-priority terminal is rejected to be accessed.

In one embodiment, the method provided in this embodiment of this application further includes: The first control plane network element obtains second indication information from the second control plane network element. In this way, the first control plane network element may determine that the second terminal accesses the first network by using the first terminal.

Figure 10A:
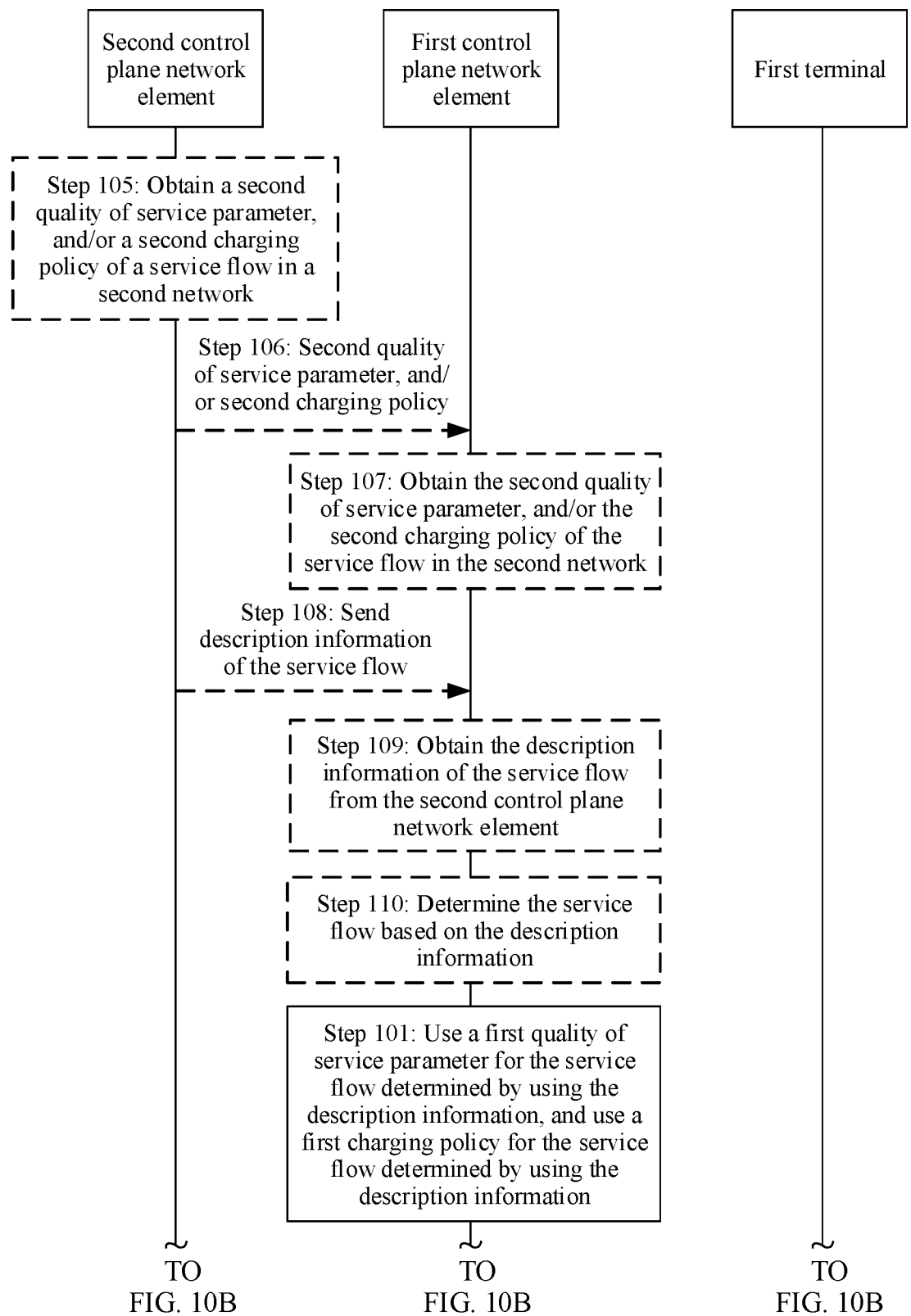
Figure 10B:
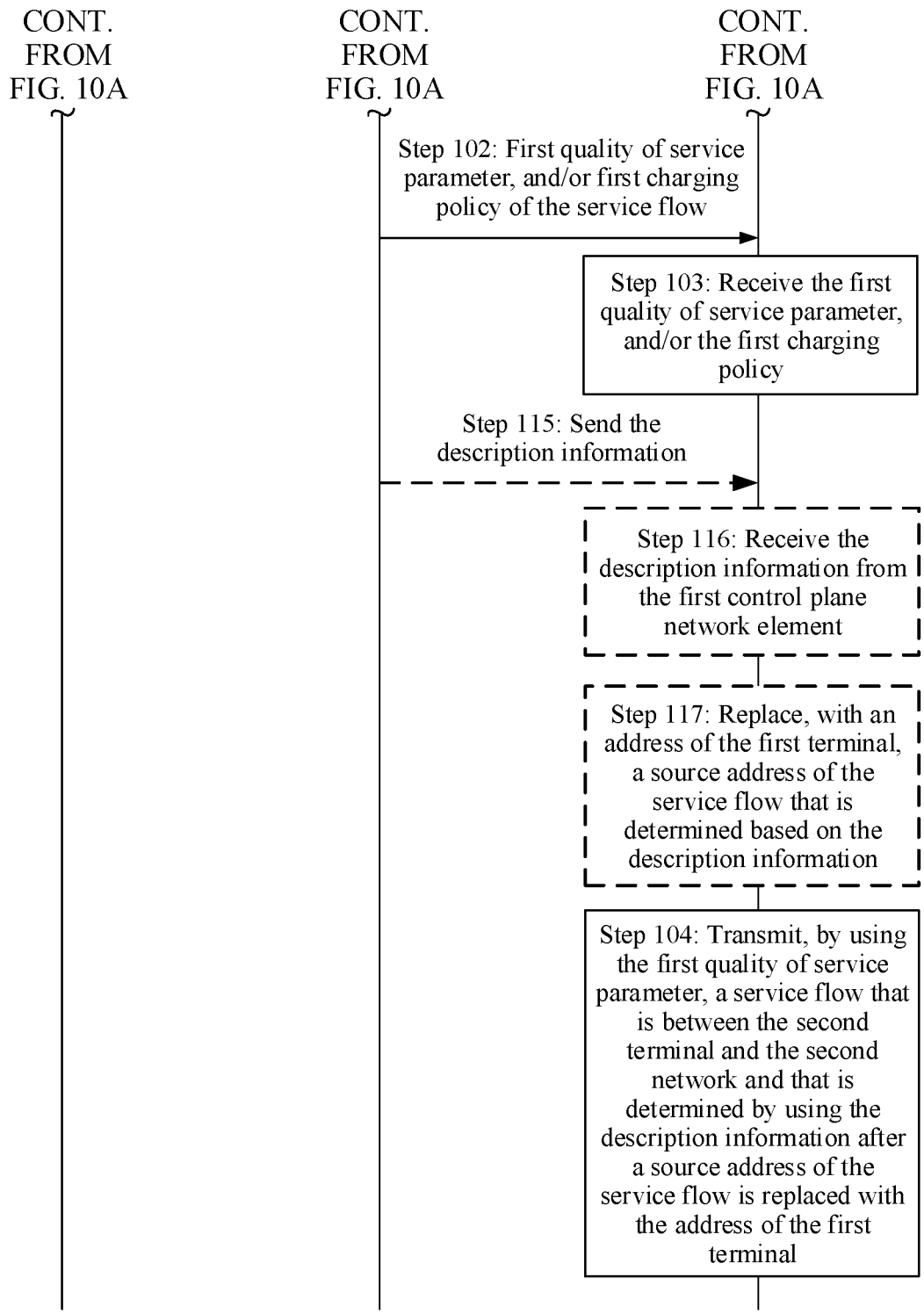

In a possible embodiment, as shown in FIG. 10A and FIG. 10B, the method provided in this embodiment of this application further includes:

Operation 117: The first terminal replaces, with the address of the first terminal, a source address of the service flow that is determined based on the description information, and the service flow is a service flow whose source address is replaced.

In a possible embodiment, in the method provided in this embodiment of this application, the service flow whose source address is replaced with the address of the first terminal may further include the port number information of the second terminal. The port number of the second terminal is allocated by the first terminal to the second terminal when the second terminal accesses the first terminal. In other words, a source address of the service flow sent by the first terminal to the first user plane network element in operation 104 is the address of the first terminal. In other words, for uplink transmission, operation 104 may be implemented in the following manner: The first terminal transmits, to the second network by using the first quality of service parameter, the service flow that is between the second terminal and the second network and that is determined by using the description information after the source address of the service flow is replaced with the address of the first terminal. It should be understood that, for downlink transmission, the first user plane network element receives the downlink service flow sent by the second network to the second terminal. The first user plane network element replaces a source address of the downlink service flow with the address of the first terminal, and obtains a source downlink service flow. The first user plane network element sends the downlink service flow to the first terminal. Then, for a target address of the source downlink service flow, the first terminal replaces the address of the first terminal with the address information allocated to the second terminal, and then sends, to the second terminal, the source downlink service flow on which address replacement is performed.

In a possible embodiment, the method provided in this embodiment of this application further includes: The first terminal allocates the address information to the second terminal. The first terminal sends the address information to the second terminal, and a source address is an address allocated by the first terminal to the second terminal.

It should be understood that, after receiving the address information, the second terminal may use the address information as the source address of the service flow. An address of the access gateway is used as a destination address of the service flow. Then the service flow is sent to the first terminal. After receiving the service flow from the second terminal, the first terminal may perform operation 117.

For example, if the address allocated by the first terminal to the second terminal is the IP 1, the second terminal may determine that a source address of the service flow 1 is the IP 1, and a destination address of the service flow is the address of the access gateway. Then the service flow 1 is sent to the first terminal. After receiving the service flow 1, the first terminal may replace the source address of the service flow 1 from the IP 1 to the IP 2. Then, the first terminal sends, to the first user plane network element, the service flow 1 whose source address is the IP 2 and destination address is the address of the access gateway. The IP 2 is the address of the first terminal.

In a possible embodiment, the method provided in this embodiment of this application further includes: The first terminal receives a route selection policy (UE Route Selection Policy, URSP) from the control plane network element. The route selection policy includes fourth indication information. The fourth indication information is used to indicate service identifier information corresponding to the route selection policy. In addition, the foregoing route selection policy further includes a session type or a DNN. For example, the DNN may be an internet or the access gateway.

It should be understood that the service identifier information may be distinguished by the terminal granularity and a service granularity. Specifically, the route selection policy is used to indicate a session type or a data network name selected by a service flow that matches the service identifier information.

For example, service flows are distinguished by the service granularity. If service flows of a terminal include a voice service flow and a video service flow, and session types include a session type 1 and a session type 2, where session type 1 corresponds to the voice service flow, and the session type 2 corresponds to the video service flow, the first terminal may determine to transmit the voice service flow by using the session type 1, and transmit the video service flow by using the session type 2. In other words, different service flows of a same terminal may be transmitted by using different session types.

For example, service flows are distinguished by the terminal granularity. In this case, if a terminal 1 corresponds to the session type 1, all service flows of the terminal 1 may be transmitted by using the session type 1.

For example, the fourth indication information includes any one or more pieces of the following information: a 5G terminal service indication, a non-5G terminal service indication, an interactive internet protocol television (IPTV) service indication, a service indication of a service set identifier, or a VLAN tag.

It should be understood that the 5G terminal service indication is used to indicate that a service type is a service flow from a 5G terminal. The non-5G terminal service indication is used to indicate that the service type is a service flow from a non-5G terminal. The IPTV service indication is used to indicate that the service type is all service flows from set-top box device. The service set identifier is used to indicate that the service type is all service flows accessed from an access point determined by using the service set identifier, and the foregoing service set identifier are, for example, an SSID and an HESSID.

The session type may be any one or more of an IP type session and an Ethernet type session.

Figure 11A:
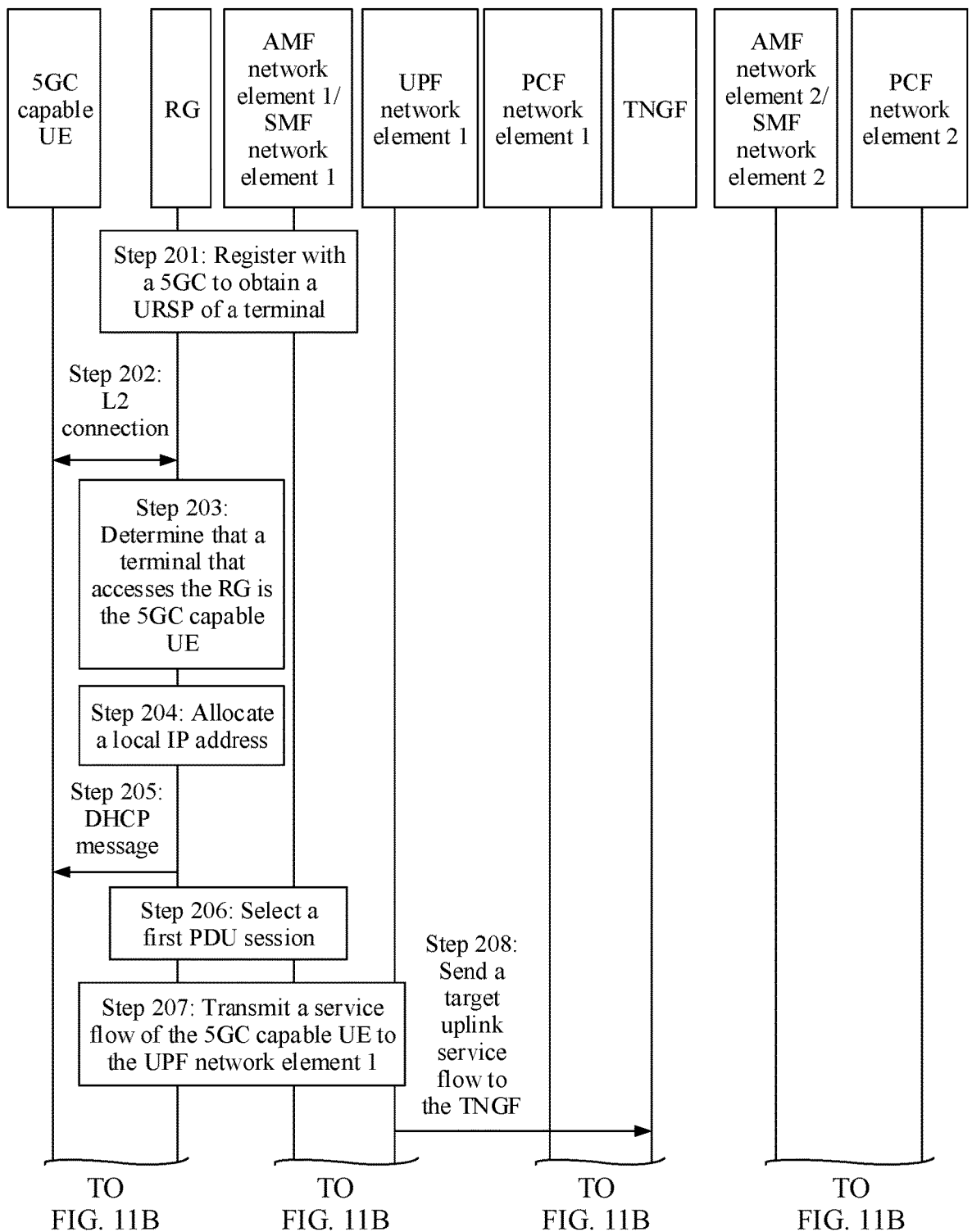
Figure 11B:
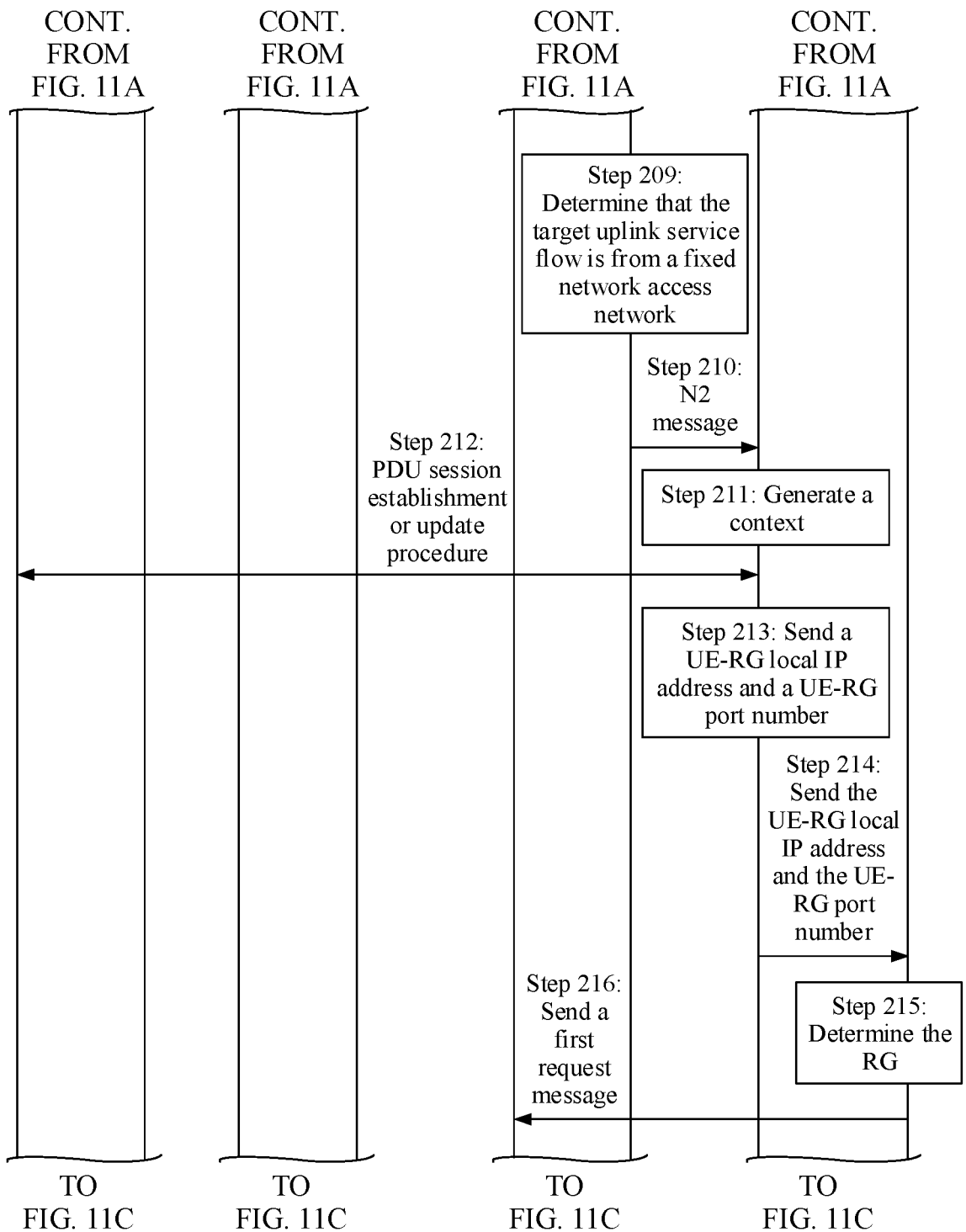
Figure 11C:
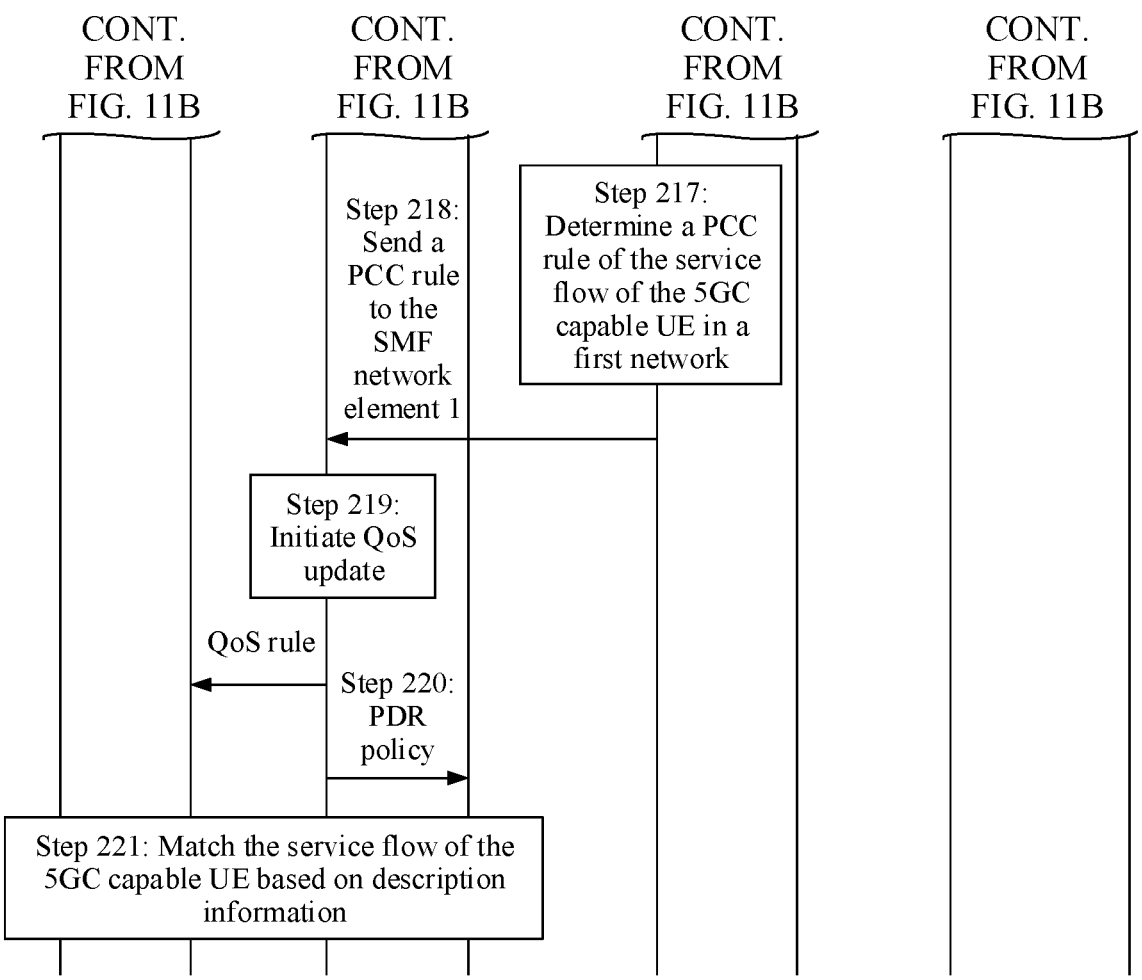

FIG. 11A to FIG. 11C shows a schematic flowchart of a communication method according to an embodiment of this application. In FIG. 11A to FIG. 11C, a first terminal is an RG. A second terminal is 5GC capable UE (5GC capable UE). Both the RG and the 5GC capable UE register with a 5GC, and that a session type is an IP PDU session type is used as an example. A first network includes a network element that provides a service for the RG in the 5GC. A second network includes a network element that provides a service for the 5GC capable UE in the 5GC. The first network includes a PCF network element 1, an SMF network element 1, an AMF network element 1, and a UPF network element 1. The second network includes a PCF network element 2, an SMF network element 2, an AMF network element 2, and a UPF network element 2. As shown in FIG. 11A to FIG. 11C, the method includes:

Operation 201: The RG registers with the 5GC, to obtain a URSP of a terminal.

Specifically, the RG initiates a registration procedure (Registration procedure for 5G-RG) to the AMF network element 1 in the 5GC, to register with the AMF network element 1. For a specific process in which the RG initiates the registration procedure to the AMF network element 1 in the 5GC, refer to descriptions in the conventional technology. Details are not described herein.

The URSP is used to indicate PDU session types (session type) or DNNs selected by different services, and PDU session types or DNNs selected by service flows of different terminals.

For example, the PDU session type includes any one or more of the following types: an IP PDU session type (IP PDU session type), an Ethernet PDU session type (Ethernet PDU session type), or an IP PDU session type and an Ethernet PDU session type. The DNN indicates a DNN that can be reached by the PDU session.

For example, a service flow identification parameter includes any one or more pieces of the following information: a 5GC capable UE service indication, a non (non)-5GC capable UE service indication, an IPTV service indication, and a WLAN SSID. The 5GC capable UE service indication is used to indicate all service flows from the 5GC capable UE. The non-5GC capable UE service indication indicates all service flows from non-5GC capable UE. The IPTV service indication indicates all service flows generated by a set-top box (Set-Top Box, STB) device. The WLAN SSID indicates all service flows obtained from the foregoing SSID access point.

It should be understood that, in this embodiment of this application, one service may correspond to one PDU session, and one PDU session may correspond to a plurality of services. For example, a PDU session 1 corresponds to a voice service and a video service.

In this embodiment of this application, a PDU session type or a DNN selected by a service flow of a terminal may be referred to as a terminal granularity for short. Service flows of a same terminal (or terminals of a same type) may be transmitted by using a same PDU session, or may be transmitted by using different PDU sessions.

In this embodiment of this application, a PDU session type or a DNN selected by a service may be referred to as a service granularity for short. In other words, a same service may be transmitted by using a same PDU session. In other words, a same service of different terminals or terminals of different types may be transmitted by using a same PDU session.

Operation 202: The 5GC capable UE establishes an L2 connection (Connection) with the RG.

Operation 203: The RG determines that a terminal accesses the RG is the 5GC capable UE.

For example, operation 203 may be specifically implemented in the following manner: (1) The RG has an SSID specially used for access of the 5GC capable UE. The RG determines the terminal that accesses the RG by using the SSID as the 5GC capable UE. (2) Alternatively, if the RG determines that a terminal that accesses the RG supports an extensible authentication protocol (Extensible Authentication Protocol, EAP)-5G message, it is determined that the terminal is the 5GC capable UE. (3) Alternatively, the RG determines that a terminal that accesses the RG is the 5GC capable UE based on a physical port of the terminal. (4) Alternatively, the RG determines that a terminal that accesses the RG is the 5GC capable UE based on its implementation.

In this embodiment of this application, for a manner in which the RG determines that a terminal that accesses the RG is the non-5GC capable UE or the set-top box device, refer to the manner in which the RG identifies that the accessed terminal is the 5GC capable UE. Details are not described herein again.

Operation 204: The RG allocates a local IP address to the 5GC capable UE.

It should be understood that the local IP address in operation 204 is the address information in the foregoing embodiment.

Operation 205: The RG sends a dynamic host configuration protocol (Dynamic Host Configuration Protocol, DHCP) message to the 5GC capable UE.

The DHCP message carries the local IP address.

In one embodiment, the DHCP message may further carry an IP address of a trusted access gateway and an IP address of an untrusted access gateway. The IP address of the trusted access gateway and the IP address of the untrusted access gateway may be pre-stored in the RG locally. The RG sends the IP address of the trusted access gateway or the IP address of the untrusted access gateway to the 5GC capable UE, so that a service flow from the 5GC capable UE can reach the trusted access gateway or the untrusted access gateway.

Operation 206: The RG selects a first PDU session for the service flow of the 5GC capable UE based on the URSP.

For example, operation 206 may be specifically implemented in the following manner: The RG determines that the terminal that accesses the RG is the 5GC capable UE, so that a PDU session type with a 5GC capable UE indication is used. Alternatively, if the RG determines that the service flow is from an access point of a WLAN SSID A, a PDU session type including the WLAN SSID A is used.

For example, the URSP includes an IP PDU session type corresponding to 5GC capable UE 1, so that a PDU session selected by the RG for the 5GC capable UE 1 is the IP PDU session type. In this way, a service flow of the 5GC capable UE 1 may be transmitted in the IP PDU session type.

It should be understood that, if the RG determines that there is no PDU session that serves the 5GC capable UE, the RG may initiate a PDU session establishment procedure, to establish, in the first network, a PDU session that serves the 5GC capable UE.

Operation 207: The RG transmits the service flow of the 5GC capable UE to the UPF network element 1 by using the first PDU session.

The service flow of the 5GC capable UE includes a source IP address and a destination IP address. The source IP address is the local IP address, and the destination IP address is the IP address of the trusted access gateway or the IP address of the untrusted access gateway.

Specifically, operation 207 may be implemented in the following manner: The RG receives an uplink service flow from the 5GC capable UE. A source IP address of the uplink service flow is the local IP address, and a destination IP address is the IP address of the trusted access gateway or the IP address of the untrusted access gateway. The RG processes the uplink service flow to obtain a target uplink service flow. A source IP address of the target uplink service flow is a UE-RG local IP address. The UE-RG local IP address is an IP address obtained by the RG from the first PDU session. For ease of subsequent description, in this embodiment of this application, an RG IP address that replaces the local IP is defined as the UE-RG local IP address. Therefore, after the service flow of the 5GC capable UE passes through the RG, the source IP address of the service flow is replaced with the UE-RG local IP address by the RG, and the destination IP address is still the IP address of the trusted access gateway or the IP address of the untrusted access gateway. The UE-RG local IP address herein may correspond to the address of the first terminal in the foregoing embodiments.

In addition, In one embodiment, to distinguish different 5GC capable UE accessing a same RG, the RG may allocate different port numbers to the different 5GC capable UE. In this embodiment of this application, a port number allocated by the RG to the 5GC capable UE may be referred to as a UE-RG port number.

It should be understood that the UE-RG port number may correspond to the port number of the second terminal in the foregoing embodiments.

For example, if both the 5GC capable UE 1 and 5GC capable UE 2 access the RG, the RG may allocate a port number 11 to the 5GC capable UE 1, and allocate a port number 12 to the 5GC capable UE 2.

Operation 208: The UPF network element 1 sends the target uplink service flow to the trusted access gateway or the untrusted access gateway based on the destination IP address.

For example, in operation 209 and operation 210, a trusted access gateway (trusted non-3GPP access Gateway function (TNGF)) is used as an example.

Operation 209: The TNGF determines that the target uplink service flow is from a fixed network access network.

For example, operation 209 may be specifically implemented in the following manner: The TNGF determines, based on a virtual local area network (VLAN) identifier carried in the target uplink service flow, that the target uplink service flow is from the fixed network access network. The TNGF has a mapping relationship between the VLAN identifier and the fixed network access network.

Operation 210: The TNGF sends an N2 message to the AMF network element 2.

The N2 message carries a non-access stratum (NAS) message from the 5GC capable UE. In addition, the TNGF obtains any one or more of the UE-RG local IP address and a source port number (for example, the UE-RG port number) from an IP packet header of the received target uplink service flow. In one embodiment, the N2 message in operation 210 includes the UE-RG local IP address and the UE-RG port number.

It should be understood that the TNGF sends any one or more of the UE-RG local IP address and the source port number to the AMF network element 2, so that a network element in the second network can determine the RG that is in the first network and that serves the 5GC capable UE. Then, the network element in the second network determines a PDU session that is in a plurality of PDU sessions corresponding to the RG and that serves the 5GC capable UE.

In one embodiment, the N2 message further includes at least one of an access line identifier (line ID) of the fixed network access network, the WLAN SSID, or an RG ID. In this way, the RG can be determined.

The RG ID may correspond to the identifier of the first terminal in the foregoing embodiments.

Operation 211: The AMF network element 2 generates a context of the 5GC capable UE. The context of the 5GC capable UE has the UE-RG local IP address and the UE-RG port number.

In a possible embodiment, the AMF network element 2 may store at least one of the access line identifier of the fixed network access network, the WLAN SSID, or the RG ID in the context of the 5GC capable UE.

It should be understood that the AMF network element 2 in operation 210 and operation 211 may alternatively be replaced with the SMF network element 2.

Operation 212: The 5GC capable UE initiates a PDU session establishment or update procedure to the second network.

Specifically, the 5GC capable UE may initiate the PDU session establishment or update procedure for the PDU session 1 that serves the 5GC capable UE and that is in the second network. For the PDU session establishment or update procedure, refer to descriptions in the conventional technology. Details are not described herein in this embodiment of this application.

For example, the 5GC capable UE sends a PDU session establishment or update message to the TNGF. The TNGF sends the N2 message to the SMF network element 2 or the AMF network element 2. The N2 message carries the PDU session establishment or update message. In addition, in a possible embodiment, the N2 message sent by the TNGF to the AMF network element 2 or the SMF network element 2 may further include at least one of the UE-RG local IP address, the UE-RG port number, the access line identifier of the fixed network access network, the WLAN SSID, or the RG ID.

It should be understood that, if the AMF network element 2 or the SMF network element 2 stores at least one of the UE-RG local IP address, the UE-RG port number, the access line identifier of the network access network, the WLAN SSID, or the RG ID in operation 211, one N2 message needs to include the PDU session establishment or update message. Otherwise, all N2 messages contain parameters such as the UE-RG local IP address and the UE-RG port number.

Operation 213: The AMF network element 2 sends the UE-RG local IP address and the UE-RG port number to the SMF network element 2, so that the SMF network element 2 receives the UE-RG local IP address and the UE-RG port number from the AMF network element 2.

In a possible embodiment, the AMF network element 2 may further send an indirect access indication to the SMF network element 2.

The indirect access indication is used to indicate that the 5GC capable UE accesses the 5GC by using the RG, or is used to indicate that a UE-RG local IP is a local IP address and an IP address of a PDU session of the RG.

The indirect access indication may be an indication, the RG ID, a line ID, or the WLAN SSID.

Operation 214: The SMF network element 2 sends the UE-RG local IP address and the UE-RG port number to the PCF network element 2.

In a possible embodiment, if the SMF network element 2 receives the indirect access indication, the SMF network element 2 directly sends the indirect access indication to the PCF network element 2.

Operation 215: The PCF network element 2 determines the RG.

For example, the PCF network element 2 determines the RG based on at least one of the UE-RG local IP address, the UE-RG port number, or the indirect access indication.

Specifically, the PCF network element 2 determines, based on at least one of the UE-RG local IP address, the UE-RG port number, or the indirect access indication, that the 5GC capable UE accesses the second network by using the RG, so that the PCF network element 2 sends the UE-RG local IP to a BSF or a DRA, to query, by using the BSF or the DRA, the PCF network element 1 corresponding to the UE-RG local IP address. The BSF or the DRA determines the PCF network element 1 based on a mapping relationship between the UE-RG local IP address and the PCF network element. The PCF network element 1 sends an identifier of the PCF network element 1 to the PCF network element 2.

It should be understood that the BSF or the DRA stores the mapping relationship between UE-RG local IP address and the PCF network element.

Operation 216: The PCF network element 2 sends a first request message to the PCF network element 1, so that the PCF network element 1 receives the first request message from the PCF network element 2.

The first request message includes at least one of the UE-RG local IP, the UE-RG port number, an identifier of the 5GC capable UE, the indirect access indication, inner description information, a DSCP identifier, a second QoS parameter, or a second charging policy.

It should be understood that the second QoS parameter is a QoS parameter of the service flow of the 5GC capable UE in the second network. The second charging policy is a charging policy of the service flow of the 5GC capable UE in the second network.

For example, for specific content of the inner description information, refer to the description in the foregoing embodiments.

Alternatively, operation 216 may be replaced in the following manner: The PCF network element 2 sends the first request message including the UE-RG local IP to the DRA or the BSF, and the DRA or the BSF searches for the PCF network element 1 based on the UE-RG local IP, and forwards the first request message to the PCF network element 1.

Operation 217: The PCF network element 1 determines a PCC rule of the service flow of the 5GC capable UE in the first network based on the first request message.

For example, operation 217 may be specifically implemented in the following manner: The PCF network element 1 sets a first QoS parameter in the PCC rule based on the second QoS parameter sent by the PCF network element 2. For example, the PCF network element 1 sets the first QoS parameter to be the same as the second QoS parameter. Similarly, a first charging policy is generated based on the second charging policy.

Operation 218: The PCF network element 1 sends the PCC rule to the SMF network element 1.

Possibly, in addition to the first charging policy and/or the first QoS parameter, the PCC rule in operation 218 and operation 217 may further include at least one of description information, the identifier of the 5GC capable UE, or the indirect access indication.

The identifier of the 5GC capable UE may correspond to the identifier of the second terminal in the foregoing embodiments.

For example, the description information is used to determine the service flow of the 5GC capable UE. For example, the description information includes at least one of the UE-RG local IP, the UE-RG port number, the inner description information, or a DSCP.

Operation 219: The SMF network element 1 obtains the PCC rule or an updated PCC rule, and initiates QoS update.

Operation 220: The SMF network element 1 generates, according to the PCC rule, a QoS rule sent to the RG and a group detection rule (Packet Detection Rules, PDR) policy sent to the UPF network element 1.

The QoS rule or the PDR policy includes: the description information of the service flow and the first QoS parameter corresponding to the description information.

Operation 221: The RG and the UPF network element 1 match the service flow of the 5GC capable UE based on the description information.

When the UE-RG local IP, the UE-RG port number, and the inner description information all exist, the RG and the UPF network element 1 match outer IP packet header information of the service flow based on the UE-RG local IP and the UE-RG port number, and match inner IP packet header information based on the inner description information.

When the UE-RG local IP, the UE-RG port number, and the DSCP identifier all exist, the RG and the UPF network element 1 match the outer IP packet header information of the service flow based on the UE-RG local IP and the UE-RG port number, and match a DSCP information label in an outer IP packet header based on DSCP information.

In one embodiment, the method provided in this embodiment of this application further includes: The SMF network element 1 or the SMF network element 2 sends the first charging policy to a charging system.

For example, the SMF network element 1 or the SMF network element 2 further sends the identifier of the RG and the identifier of the 5GC capable UE to the charging system, to indicate that the service flow of the 5GC capable UE transmitted by using the RG uses the first charging policy.

Embodiments of this application provide a policy control method, so that the RG and the first network can implement QoS and charging control of the service flow of the 5GC capable UE. Specifically, the QoS and charging control can be implemented at a service flow granularity.

Figure 12A:
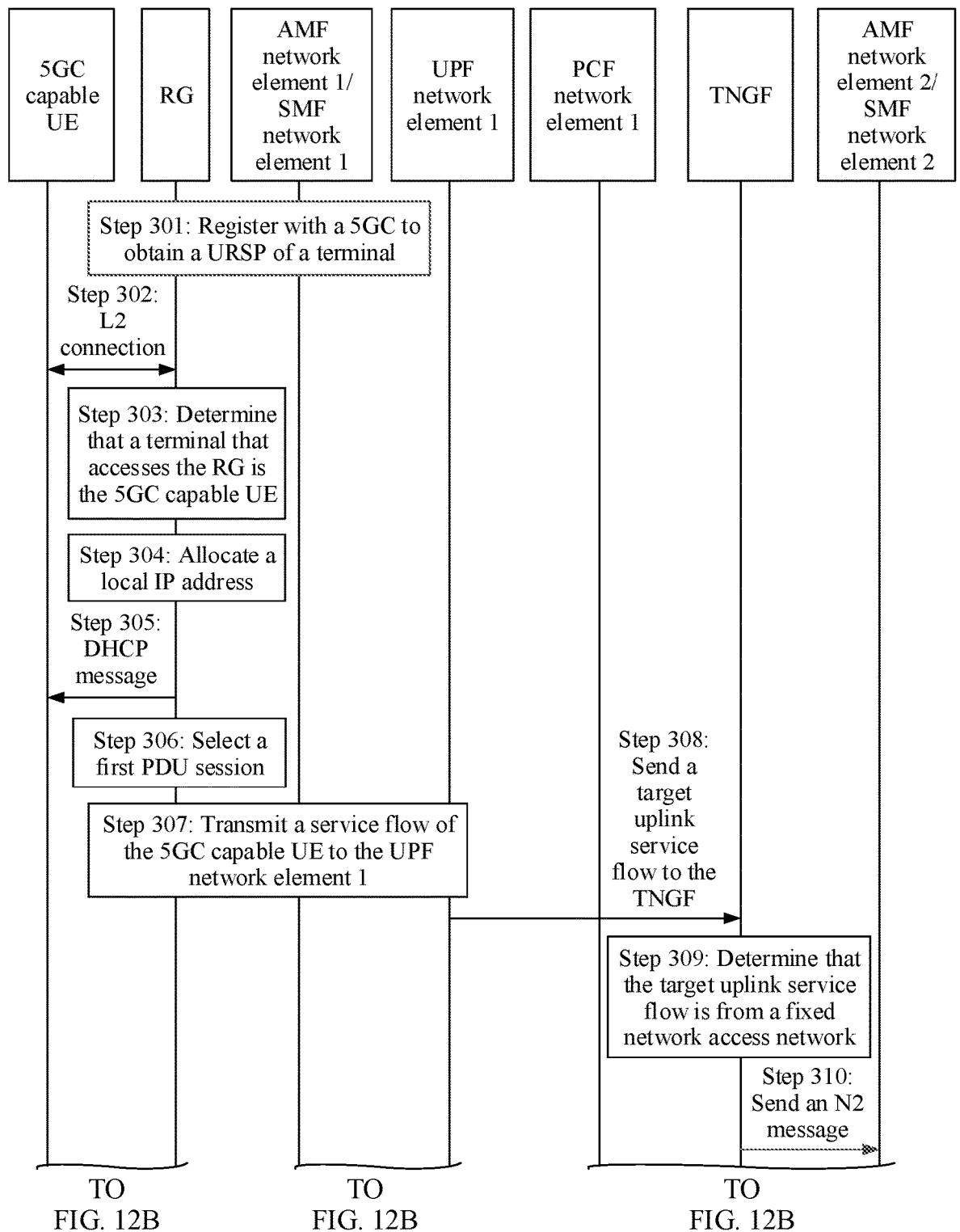
Figure 12B:
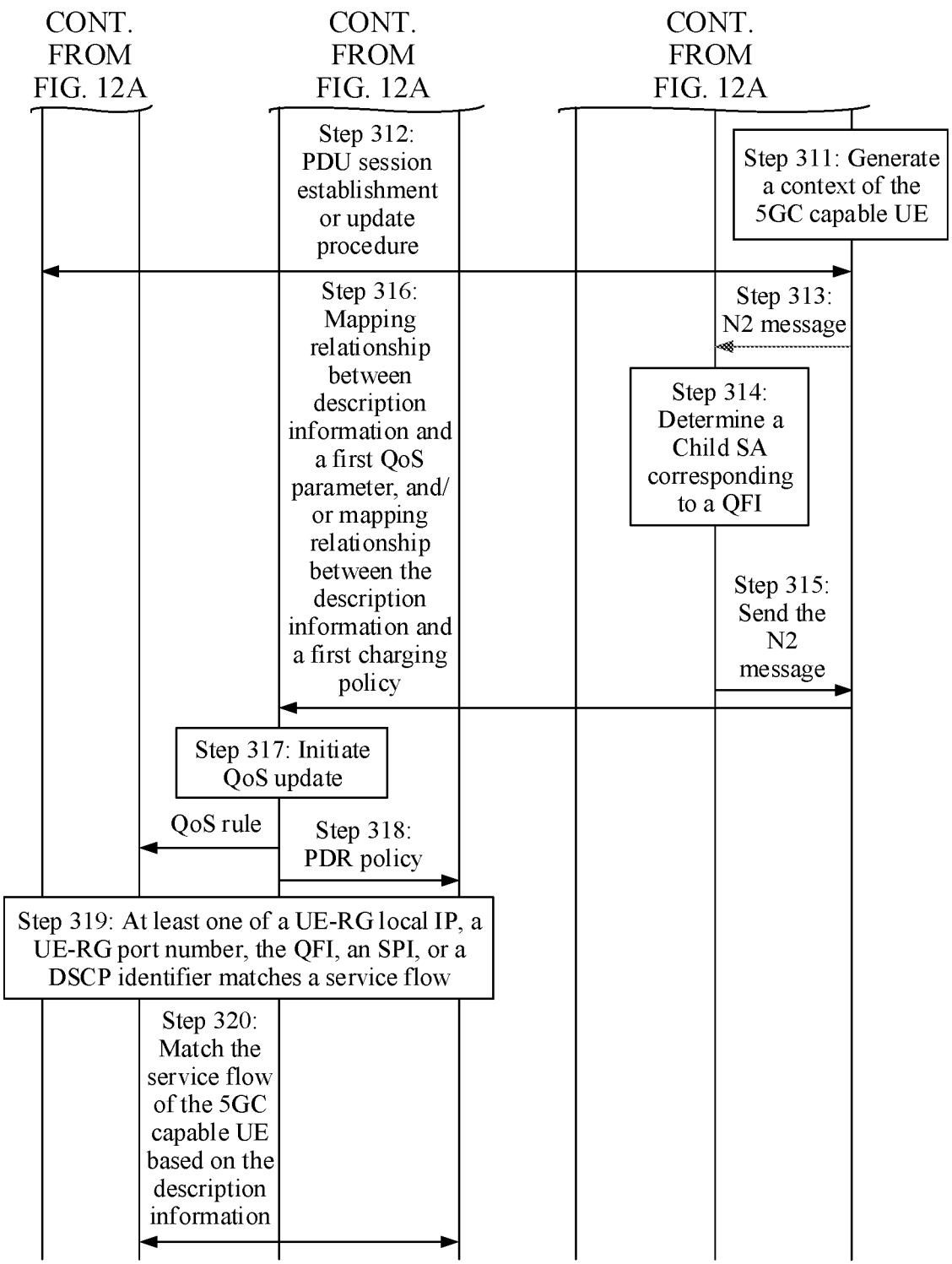

FIG. 12A and FIG. 12B shows a schematic flowchart of another communication method according to an embodiment of this application. A difference between this solution and the solution shown in FIG. 11A to FIG. 11C lies in that the solution in FIG. 12A and FIG. 12B is used to implement QoS and charging control of an SPI granularity, a QFI granularity, or a DSCP information granularity.

Operation 301 to operation 312 are the same as operation 201 to operation 212 in FIG. 11A and FIG. 11B. For detailed content, refer to descriptions in 201 to operation 212. Details are not described herein again.

Operation 313: An SMF network element 2 sends an N2 message to a trusted access gateway or an untrusted access gateway. The N2 message carries QoS profile.

Operation 314: The trusted access gateway or the untrusted access gateway determines a Child SA corresponding to a QFI based on the QoS profile. Each Child SA has a unique identifier SPI.

Operation 315: The trusted access gateway or the untrusted access gateway sends the N2 message to the SMF network element 2. The N2 message carries a mapping relationship between the QFI and the SPI.

For example, the trusted access gateway or the untrusted access gateway sends the N2 message to an AMF network element 2, to that the AMF network element 2 sends the N2 message to the SMF network element 2.

Operation 316: The SMF network element 2 sends a mapping relationship between description information and a first QoS parameter and/or a mapping relationship between the description information and a first charging policy to an SMF network element 1.

The description information may be any one or more of the SPI, the QFI, or DSCP information. Possibly, operation 316 may be replaced in the following manner: The SMF network element 2 sends the mapping relationship between the QFI and the SPI to the SMF network element 1.

In example 1, operation 316 may be implemented in the following manner:

In one embodiment, the SMF network element 2 sends the mapping relationship between the description information and the first QoS parameter and/or the mapping relationship between the description information and the first charging policy to a PCF network element 2. The PCF network element 2 sends a second request message including the mapping relationship between the description information and the first QoS parameter and/or the mapping relationship between the description information and the first charging policy to a PCF network element 1. The PCF network element 1 sends the mapping relationship between the description information and the first QoS parameter and/or the mapping relationship between the description information and the first charging policy to the SMF network element 1. Alternatively, the PCF network element 2 determines the PCF network element 1 by using a DRA or a BSF, and then sends the second request message to the PCF network element 1.

Specifically, the PCF network element 1 may further send a UE-RG local IP and a UE-RG port number to the SMF network element 1. In addition, the PCF network element 1 sends at least one of an identifier of 5GC capable UE and an indirect access indication to the SMF network element 1.

In addition, similar to the solution shown in FIG. 11A to FIG. 11C, the second request message further includes at least one of the UE-RG local IP, the UE-RG port number, the identifier of the 5GC capable UE, and the indirect access indication.

In another embo, the SMF network element 2 stores, in a container, a mapping relationship between the QFI and the first QoS parameter and/or a mapping relationship between the QFI and the first charging policy. Then the SMF network element 2 sends the container to the PCF network element 2. The PCF network element 2 does not parse parameters in the container, and directly transfers the parameters to the PCF network element 1.

In example 2, operation 316 may be implemented in the following manner:

The SMF network element 2 sends the mapping relationship between the description information and the first QoS parameter and/or the mapping relationship between the description information and the first charging policy to the PCF network element 1. The PCF network element 1 sends the mapping relationship between the description information and the first QoS parameter and/or the mapping relationship between the description information and the first charging policy to the SMF network element 1.

Possibly, the SMF network element 2 may further send at least one of the UE-RG local IP, the UE-RG port number, an 5GC capable UE SUPI, and the indirect access indication to the PCF network element 1.

A solution in which the SMF network element 2 determines the PCF network element 1 is not limited in this embodiment of this application. For example, the SMF network element 2 determines the PCF network element 1 based on the local IP address of the UE-RG by using the DRA or the BSF.

In example 3, operation 316 may be implemented in the following manner:

The SMF network element 2 sends the mapping relationship between the description information and the first QoS parameter and/or the mapping relationship between the description information and the first charging policy to the SMF network element 1.

Possibly, the SMF network element 2 further sends at least one of the UE-RG local IP, the UE-RG port number, the 5GC capable UE SUPI, and the indirect access indication to the SMF network element 1. A solution in which the SMF network element 2 determines the SMF network element 1 is not limited in this embodiment of this application.

Operation 317: The SMF network element 1 obtains a PCC rule or an updated PCC rule, and initiates QoS update.

Operation 318: The SMF network element 1 generates, according to the PCC rule, a QoS rule sent to an RG and PDR policy sent to a UPF network element 1.

The QoS rule or the PDR policy includes: the description information and the first QoS parameter corresponding to the description information. The UE-RG local IP and the UE-RG port number are an IP address and a port number in outer IP packet header information. The QFI is a QFI label carried in an inner GRE packet header. The SPI is a Child SA identifier, and the DSCP information is a DSCP information label in an outer IP packet header.

Operation 319: The RG and the UPF network element 1 match a service flow based on at least one of the UE-RG local IP, UE-RG port number, the QFI, the SPI, or the DSCP identifier.

In addition, the SMF network element 1 sends a mapping QFI indication to the UPF network element 1. The mapping QFI indication is used to indicate to set a QFI in an outer GTP-U packet header based on a QFI carried in an inner GRE packet header, an SPI, or a DSCP information value. A mapping relationship may be that two QFIs are the same, or the SMF network element 1 provides a mapping relationship between an inner QFI, the SPI, or the DSCP information value and an outer QFI. After identifying the service flow by using the inner QFI, the SPI, or the DSCP information value based on the foregoing mapping relationship, the UPF network element 1 sets a QFI in an outer data packet header of the foregoing service flow based on the mapping relationship.

Operation 320 is the same as operation 221. For detailed content, refer to descriptions in operation 221. Details are not described herein again.

In embodiments of this application, the RG and the first network can implement QoS and charging control of a service flow of the 5GC capable UE. Specifically, QoS and charging control can be implemented at an SPI granularity, a QFI granularity, or a DSCP granularity.

Figure 13A:
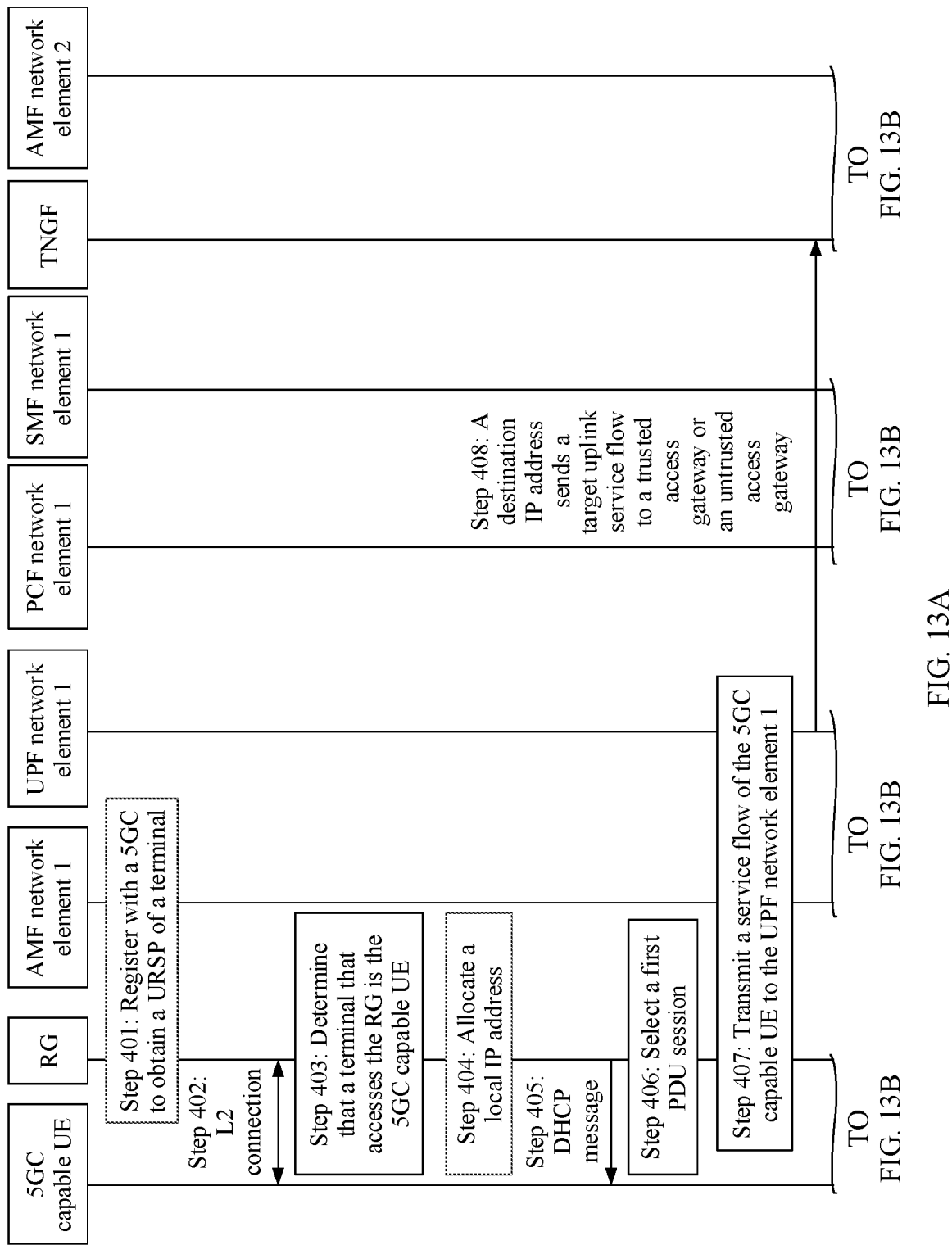
Figure 13B:
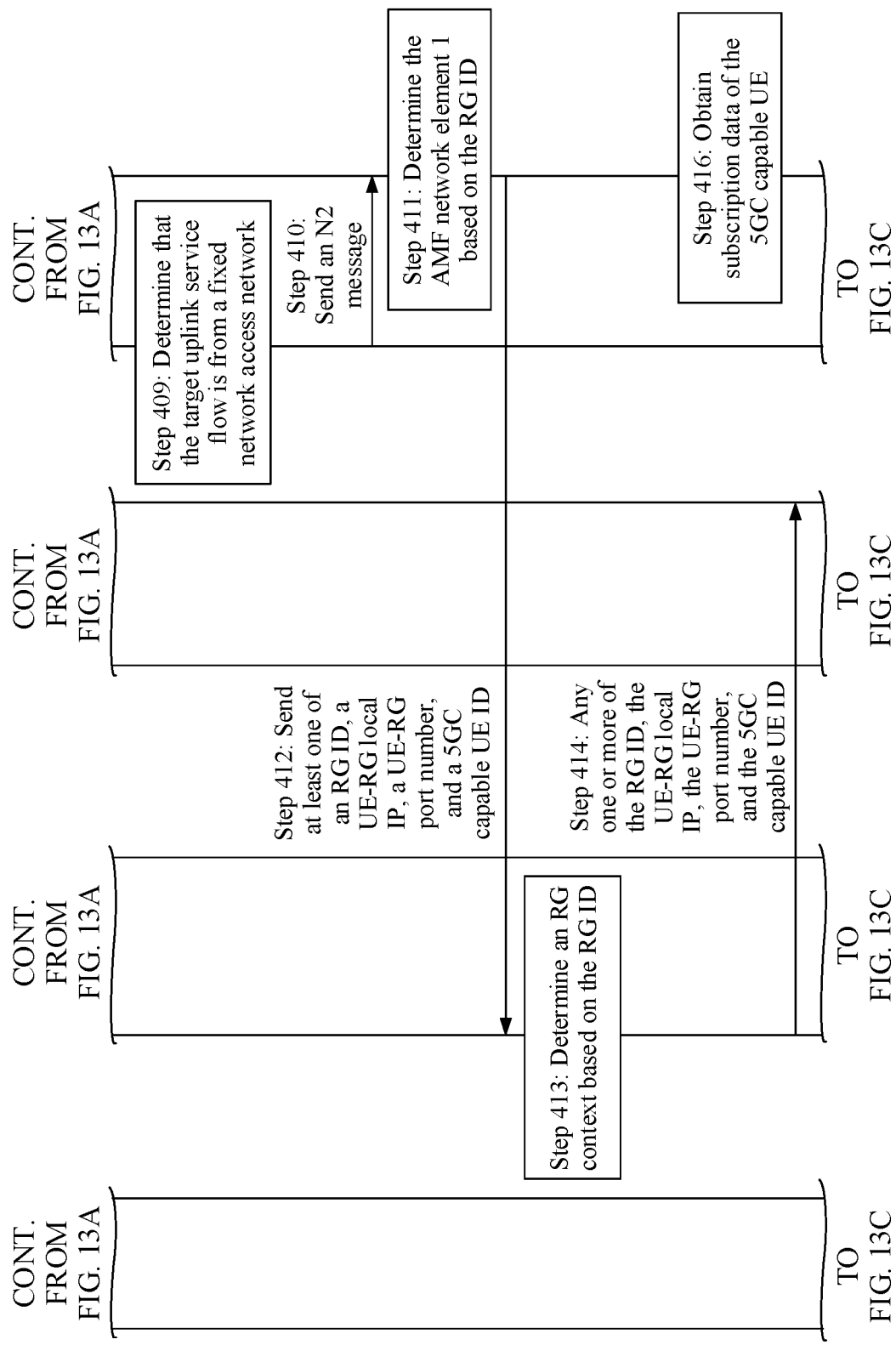
Figure 13C:
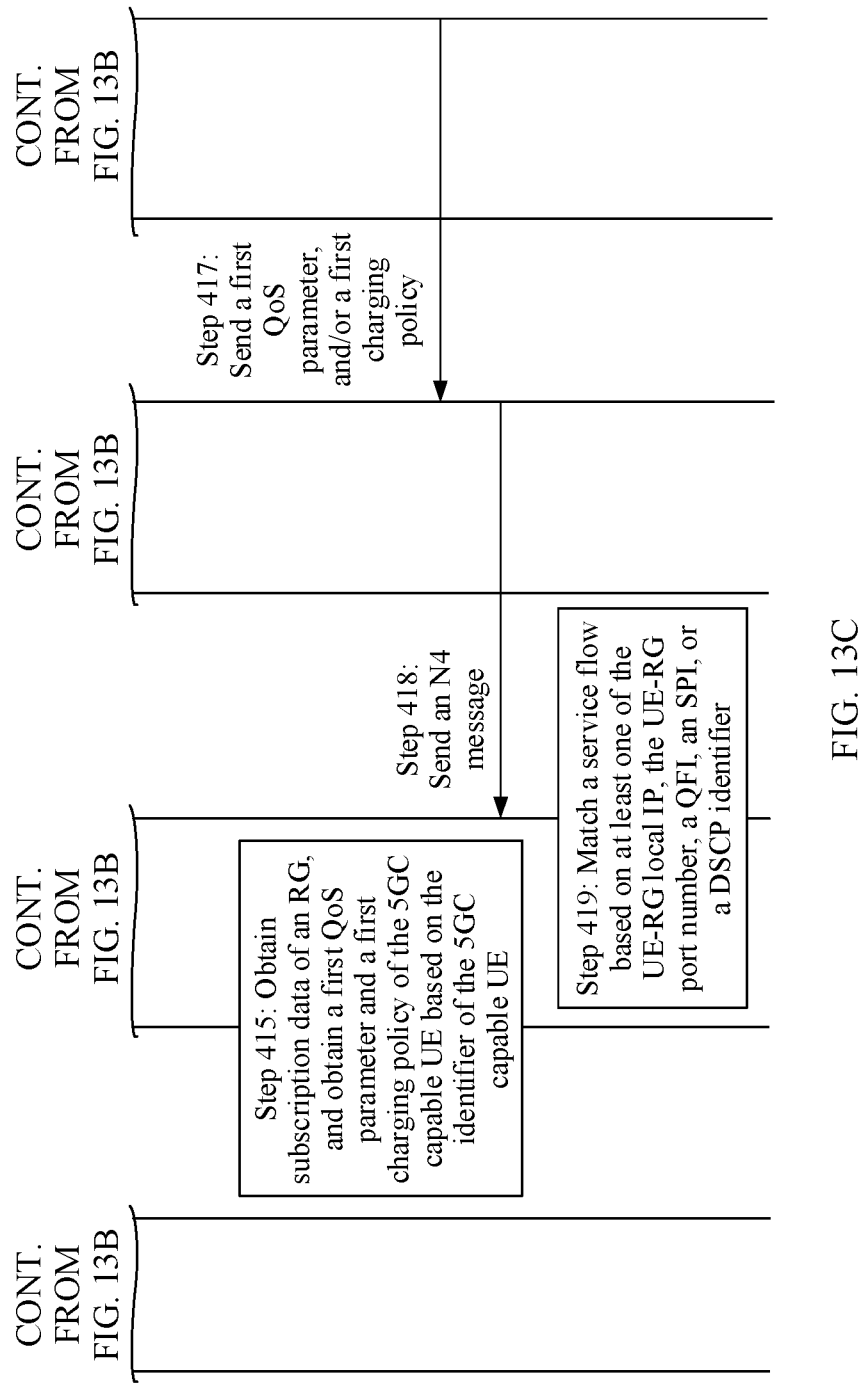

FIG. 13A to FIG. 13C shows a schematic flowchart of another communication method according to an embodiment of this application. The method includes:

Operation 401 to operation 410 are the same as operation 201 to operation 210. Details are not described herein again.

Operation 411: An AMF network element 2 determines an AMF network element 1 based on an RG ID.

Operation 412: The AMF network element 2 sends at least one of the RG ID, a UE-RG local IP, a UE-RG port number, and a 5GC capable UE ID to the AMF network element 1.

Operation 413: The AMF network element 1 determines an RG context based on the RG ID.

Operation 414: The AMF network element 1 sends any one or more of the UE-RG local IP, the UE-RG port number, and the identifier of 5GC capable UE to an SMF network element 1.

Operation 415: The AMF network element 1 or the SMF network element 1 obtains subscription data of an RG from a UDM network element 1, and obtains a first QoS parameter and a first charging policy of the 5GC capable UE based on the identifier of the 5GC capable UE.

Specifically, the UDM network element 1 stores the subscription data of the RG. The subscription data of the RG includes the first QoS parameter and the first charging policy that are associated with the identifier of the 5GC capable UE.

In a possible example, the foregoing operation 411 to operation 415 may be replaced with the following operation 416 to operation 417.

Operation 416: The AMF network element 2 or an SMF network element 2 obtains subscription data of the 5GC capable UE from the UDM network element 2. The subscription data of the 5GC capable UE includes the first QoS parameter and the first charging policy that are associated with the identifier of the 5GC capable UE.

Operation 417: The AMF network element 2 or the SMF network element 2 sends the first QoS parameter and first charging policy to the SMF network element 1.

Specifically, the AMF network element 2 or the SMF network element 2 determines the AMF network element 1 based on the RG ID. The AMF network element 2 or the SMF network element 2 sends the RG ID, the UE-RG local IP, UE-RG port number, the identifier of the 5GC capable UE, the first QoS parameter, and the first charging policy to the AMF network element 1. The AMF network element 1 determines the RG context based on the RG ID. The AMF network element 1 forwards the UE-RG local IP, UE-RG port number, the identifier of the 5GC capable UE, the first QoS parameter, and the first charging policy to the SMF network element 1.

Operation 418: The SMF network element 1 sends an N4 message to a UPF network element 1. The N4 message includes the UE-RG local IP, UE-RG port number as description information, the first QoS parameter, and the first charging policy.

Operation 419 is the same as operation 319. For details, refer to descriptions in operation 319. Details are not described herein again.

Figure 14:
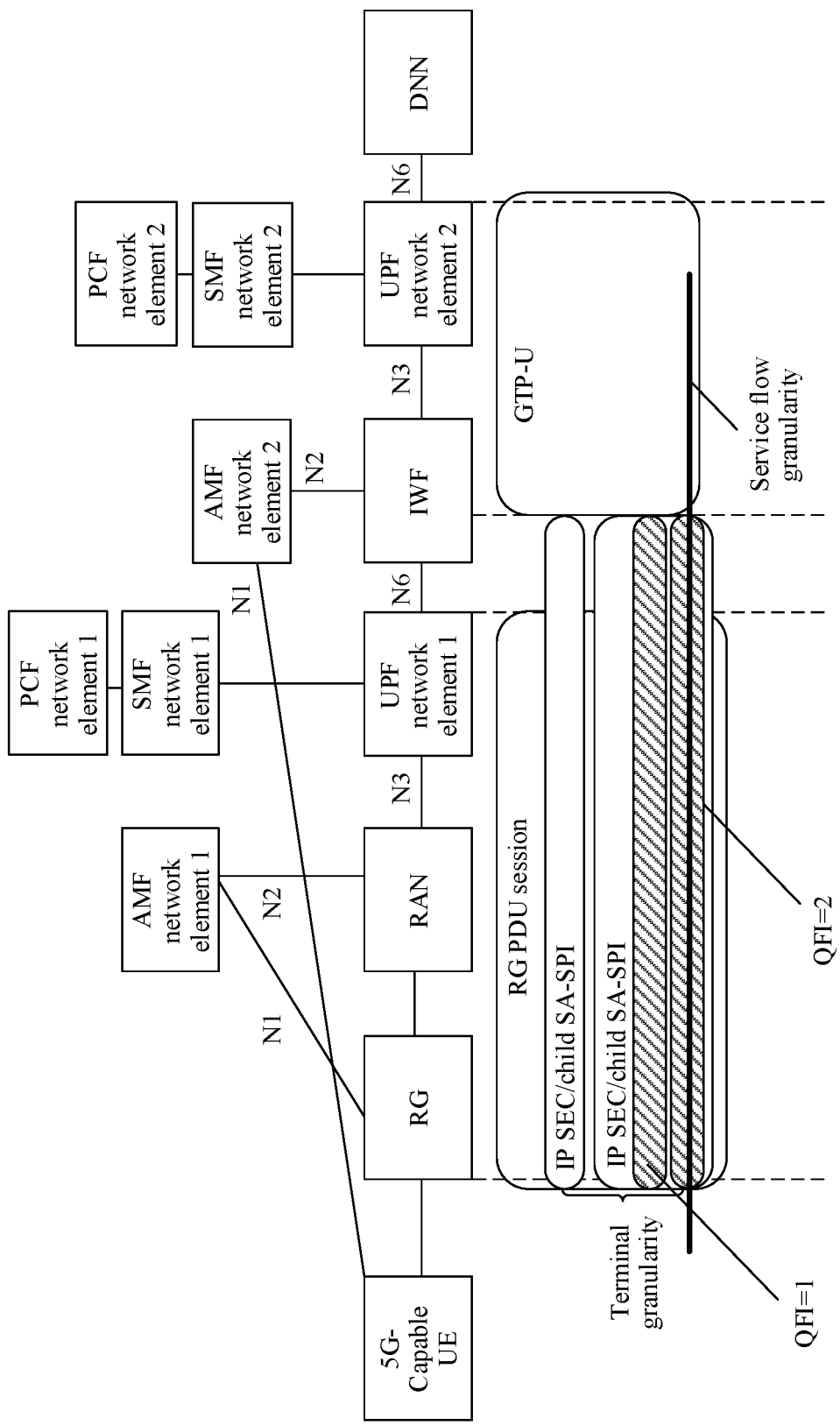
FIG. 14 is a schematic diagram of a granularity of QoS control according to an embodiment of this application.

For example, as shown in FIG. 14, when quality of service parameter and charging policy control is performed at a granularity of a service flow shown in FIG. 11A to FIG. 11C, for a service flow determined by using the description information, the first QoS parameter and the first charging policy may be used for control. When the quality of service parameter and charging policy control is performed at a granularity of a QFI shown in FIG. 12A and FIG. 12B, for a service flow whose QFI=1 and a service flow whose QFI=2, the first QoS parameter and the first charging policy are used for control. When the quality of service parameter and charging policy control is performed at a granularity of a terminal shown in FIG. 13A to FIG. 13C, for all service flows of the 5GC capable UE, the first QoS parameter and the first charging policy are used for control.

The foregoing mainly describes the solutions in the embodiments of this application from a perspective of interaction between network elements. It may be understood that to implement the foregoing functions, the network elements such as the first control plane network element, the second control plane network element, and the first terminal include corresponding hardware structures and/or software modules for executing the functions. A person skilled in the art should easily be aware that, in combination with units and algorithm operations of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first control plane network element, the second control plane network element, and the first terminal each may be divided into function units based on the foregoing method examples. For example, function units may be obtained through division based on corresponding functions, or two or more functions may be integrated into one processing unit. The integrated unit may be implemented in a form of hardware, or may be implemented in a form of a software functional unit. It should be noted that, in this embodiment of this application, unit division is an example, and is merely a logical function division. In actual implementation, another division manner may be used.

The foregoing describes the methods in the embodiments of this application with reference to FIG. 4 to FIG. 13. The following describes a communications apparatus that are provided in embodiments of this application and that perform the foregoing methods. A person skilled in the art may understand that the method and the apparatus may be mutually combined and referenced. The communications apparatus provided in this embodiment of this application may perform the method performed by a transmit end in the foregoing communication method, that is, the operations performed by the second control plane network element. Another communications apparatus may perform the method performed by the receive end in the communication method in the foregoing embodiment, that is, the operations performed by the first control plane network element. Still another communications apparatus may perform the method performed by the receive end in the communication method in the foregoing embodiment, that is, the operations performed by the first terminal.

An example in which each function module is obtained through division based on each corresponding function is used below for description.

Figure 15:
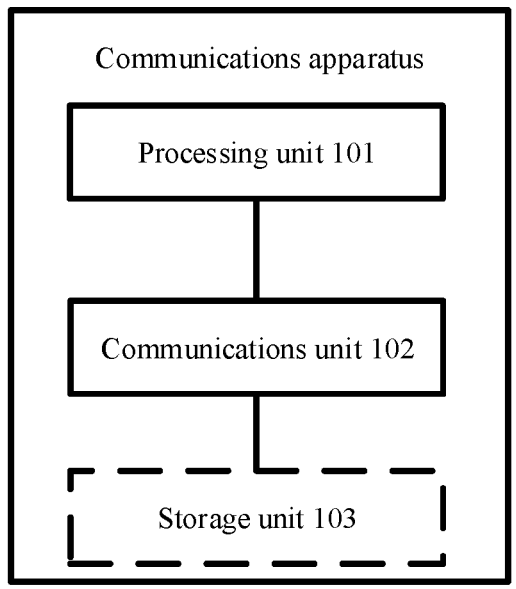
FIG. 15 is a schematic structural diagram of a communications apparatus according to an embodiment of this application.

FIG. 15 shows a schematic structural diagram of a communications apparatus according to an embodiment of this application. The communications apparatus may be a first control plane network element, a second control plane network element, or a first terminal in the embodiments of this application, or may be a chip applied to the first control plane network element, the second control plane network element, or the first terminal. The communications apparatus includes: a processing unit 101 and a communications unit 102. The communications unit 102 is configured to support an operation of sending or receiving information performed by the communications apparatus. The processing unit 101 is configured to support the communications apparatus in performing an operation of processing information.

In an example, the communications apparatus is the first control plane network element or the chip or a chip system applied to the first control plane network element. The communications unit 102 is configured to support the communications apparatus in performing operation 101 in the foregoing embodiment. The processing unit 101 is configured to support the communications apparatus in performing operation 102 in the foregoing embodiment.

In a possible embodiment, the communications unit 102 is further configured to support the communications apparatus in performing operation 107, operation 109, operation 110, operation 112, and operation 115 in the foregoing embodiment.

The processing unit 101 is further configured to support the communications apparatus in performing operation 110 in the foregoing embodiment.

In another example, the communications apparatus is the second control plane network element or the chip or a chip system applied to the second control plane network element. The processing unit 101 is configured to support the communications apparatus in performing operation 105 in the foregoing embodiment. The communications unit 102 is configured to support the communications apparatus in performing operation 106 in the foregoing embodiment.

In a possible embodiment, the communications unit 102 is further configured to support the communications apparatus in performing operation 108 and operation 111 in the foregoing embodiment. The processing unit 101 is configured to support the communications apparatus in performing operation 113 and operation 114 in the foregoing embodiment.

In still another example, the communications apparatus is the first terminal or the chip or a chip system applied to the first terminal. The communications unit 102 is configured to support the communications apparatus in performing operation 103 in the foregoing embodiment. The processing unit 101 is configured to support the communications apparatus in performing operation 104 in the foregoing embodiment.

In a possible embodiment, the communications unit 102 is further configured to support the communications apparatus in performing operation 116 in the foregoing embodiment. The processing unit 101 is further configured to support the communications apparatus in performing operation 117 in the foregoing embodiment.

In a possible embodiment, the communications apparatus may further include a storage unit 103. The processing unit 101, the communications unit 102, and the storage unit 103 are connected by using a communications bus.

The storage unit 103 may include one or more memories. The memory may be a component configured to store a program or data in one or more devices or circuits.

The storage unit 103 may exist independently, and is connected to the processing unit 101 of the communications apparatus through the communications bus. The storage unit 103 may alternatively be integrated into the processing unit.

The communications apparatus may be used in a communications device, a circuit, a hardware component, or a chip.

For example, the communications apparatus may be the chip or the chip system of the first control plane network element, the second control plane network element, or the first terminal in the embodiments of this application. In this case, the communications unit 102 may be an input or output interface, a pin, a circuit, or the like. For example, the storage unit 103 may store computer-executable instructions of methods on the first control plane network element side, the second control plane network element side, and the first terminal side, so that the processing unit 101 performs the method on the first control plane network element side, the second control plane network element side, and the first terminal side in the foregoing embodiments. The storage unit 103 may be a register, a cache, a RAM, or the like. The storage unit 103 may be integrated together with the processing unit 101. The storage unit 103 may be a ROM or another type of static storage device that can store static information and an instruction, and the storage unit 103 may be independent of the processing unit 101.

An embodiment of this application provides a communications apparatus. The communications apparatus includes one or more modules, configured to implement the method in operation 101 to operation 117. The one or more modules may correspond to the operations of the method in operation 101 to operation 117. Specifically, in this embodiment of this application, for each operation in the method performed by the first control plane network element, there is a unit or module for performing each operation in the method in the first control plane network element. For each operation in the method performed by the second control plane network element, there is a unit or module for performing each operation in the method in the second control plane network element. For each operation in the method performed by the first terminal, there is a unit or module for performing each operation in the method in the first terminal. For example, a module that controls or processes an action of the communications apparatus may be referred to as a processing module. A module that performs a operation of processing a message or data on a communications apparatus side may be referred to as a communications module.

Figure 16:
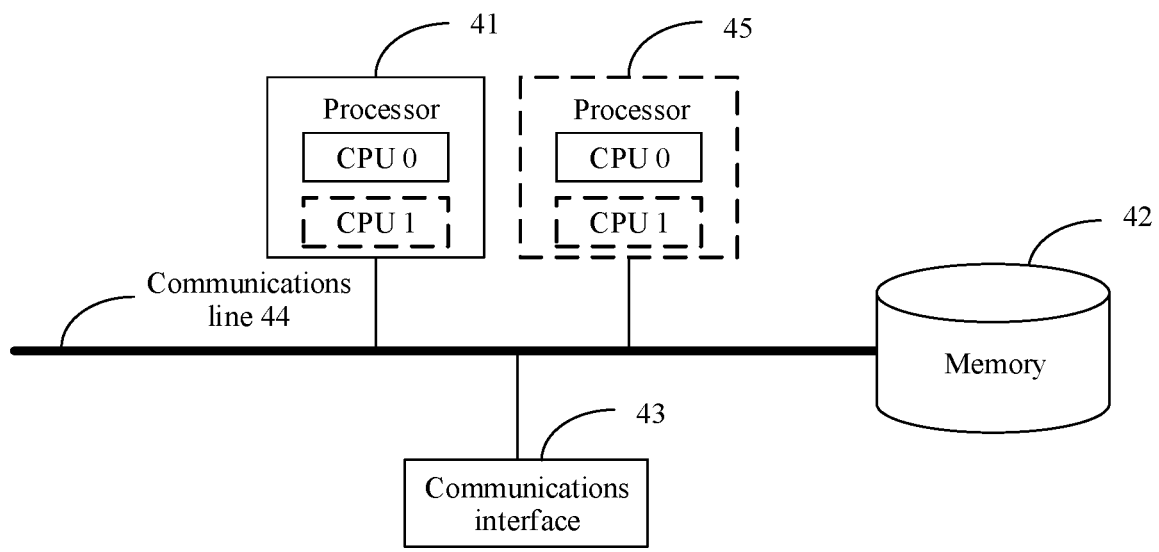
FIG. 16 is a schematic structural diagram of a communications device according to an embodiment of this application.

FIG. 16 is a schematic structural diagram of a communications device according to an embodiment of this application. For hardware structures of a first control plane network element and a second control plane network element in this embodiment of this application, refer to the schematic diagram of a hardware structure of the communications device shown in FIG. 16. The communications device includes a processor 41, a communications line 44, and at least one communications interface (a communications interface 43 is used as an example in FIG. 16).

The processor 41 may be a general-purpose central processing unit (CPU), a microprocessor, an application-specific integrated circuit (ASIC), or one or more integrated circuits configured to control program execution of the solutions of this application.

The communications line 44 may include a path for transferring information between the foregoing components.

The communications interface 43 is configured to communicate with another device or a communications network such as the Ethernet, a radio access network (RAN), or a wireless local area network (WLAN) by using any apparatus such as a transceiver.

Possibly, the communications device may further include a memory 42.

The memory 42 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 42 is not limited thereto. The memory may exist independently, and is connected to the processor through the communications line 44. Alternatively, the memory may be integrated with the processor.

The memory 42 is configured to store computer execution instructions for performing the solutions of this application, and the processor 41 controls execution of the computer execution instructions. The processor 41 is configured to execute the computer execution instructions stored in the memory 42, to implement a communication method provided in the following embodiment of this application.

Possibly, the computer execution instructions in this embodiment of this application may also be referred to as application program code. This is not specifically limited in this embodiment of this application.

In an embodiment, the processor 41 may include one or more CPUs, for example, a CPU 0 and a CPU 1 in FIG. 16.

In an embodiment, the communications device may include a plurality of processors, for example, the processor 41 and a processor 45 in FIG. 16. Each of the processors may be a single-core processor, or may be a multi-core processor. The processor herein may refer to one or more devices, circuits, and/or processing cores configured to process data (for example, computer program instructions).

For example, the communications apparatus is the first control plane network element or a chip or a chip system applied to the first control plane network element. The communications interface is configured to support the communications apparatus in performing operation 101 in the foregoing embodiment. The processor 41 or the processor 45 is configured to support the communications apparatus in performing operation 102 in the foregoing embodiment.

In a possible embodiment, the communications interface is further configured to support the communications apparatus in performing operation 107, operation 109, operation 110, operation 112, and operation 115 in the foregoing embodiment.

In another example, the communications apparatus may be the second control plane network element or a chip or a chip system applied to the second control plane network element. The communications interface is configured to support the communications apparatus in performing operation 106 in the foregoing embodiment. The processor 41 or the processor 45 is configured to support the communications apparatus in performing operation 105 in the foregoing embodiment.

In a possible embodiment, the communications interface is further configured to support the communications apparatus in performing operation 108 and operation 111 in the foregoing embodiment. The processor 41 or the processor 45 is configured to support the communications apparatus in performing operation 113 and operation 114 in the foregoing embodiment.

Figure 17:
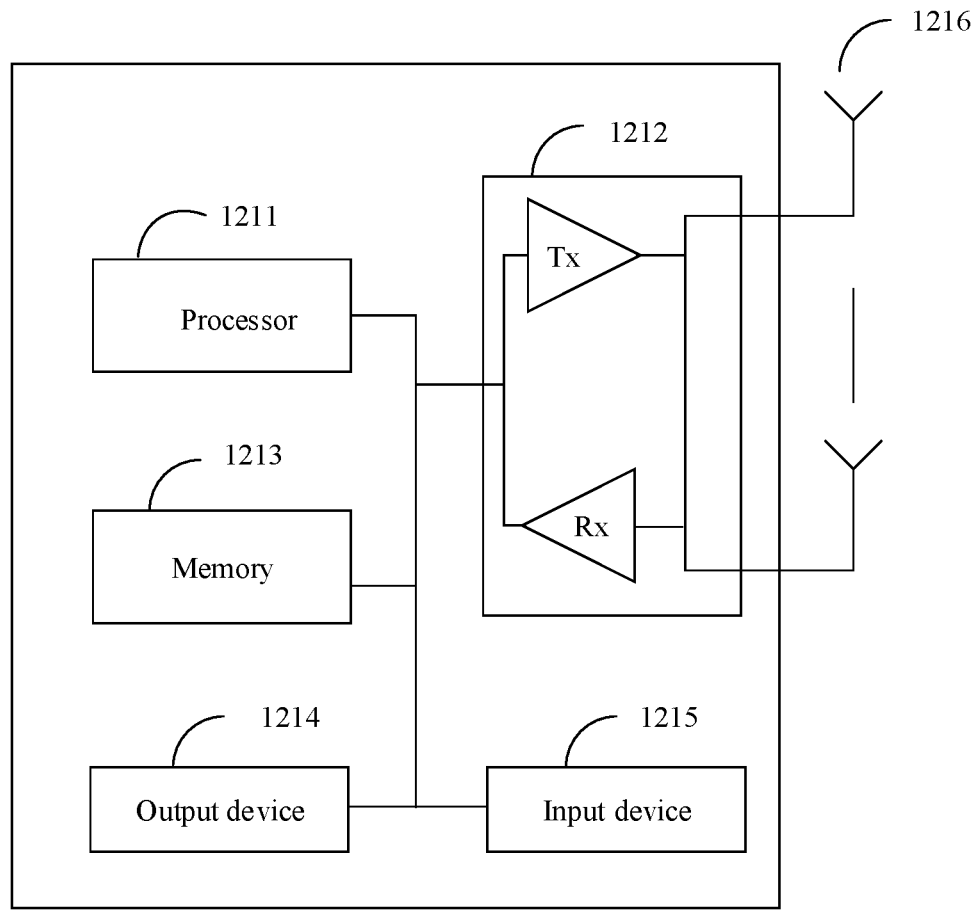
FIG. 17 is a schematic structural diagram of a terminal according to an embodiment of this application.

FIG. 17 shows a schematic structural diagram of a terminal according to an embodiment of this application. A structure of a first terminal or a second terminal may refer to a structure shown in FIG. 17.

A terminal includes at least one processor 1211 and at least one transceiver 1212. In a possible example, the terminal may further include at least one memory 1213, an output device 1214, an input device 1215, and one or more antennas 1216. The processor 1211, the memory 1213, and the transceiver 1212 are connected. The antenna 1216 is connected to the transceiver 1212, and the output device 1214 and the input device 1215 are connected to the processor 1211.

A memory in this embodiment of this application, such as the memory 1213 may include at least one of the following types: a read-only memory (read-only memory, ROM) or another type of static storage device that can store static information and instructions, a random access memory (RAM) or another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited thereto.

The memory 1213 may exist independently, and is connected to the processor 1211. In another example, the memory 1213 may be integrated with the processor 1211, for example, be integrated into a chip. The memory 1213 can store program code for executing the technical solution in this embodiment of this application, and the processor 1211 controls execution of the program code. Various types of executed computer program code may also be considered as drivers of the processor 1211. For example, the processor 1211 is configured to execute the computer program code stored in the memory 1213, to implement the technical solution in this embodiment of this application.

The transceiver 1212 may be configured to support receiving or sending of a radio frequency signal between terminals or between a terminal and an access device, and the transceiver 1212 may be connected to the antenna 1216. The transceiver 1212 includes a transmitter Tx and a receiver Rx. Specifically, the one or more antennas 1216 may receive a radio frequency signal. The receiver Rx of the transceiver 1212 is configured to: receive the radio frequency signal from the antenna, convert the radio frequency signal into a digital baseband signal or a digital intermediate frequency signal, and provide the digital baseband signal or the digital intermediate frequency signal for the processor 1211, so that the processor 1211 further processes the digital baseband signal or the digital intermediate frequency signal, for example, performs demodulation processing and decoding processing. In addition, the transmitter Tx of the transceiver 1212 is further configured to: receive a modulated digital baseband signal or a modulated digital intermediate frequency signal from the processor 1211, convert the modulated digital baseband signal or the digital intermediate frequency signal into a radio frequency signal, and send the radio frequency signal through the one or more antennas 1216. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or the modulated digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

The processor 1211 may be a baseband processor, or may be a CPU. The baseband processor and the CPU may be integrated or separated.

The processor 1211 may be configured to implement various functions for the terminal, for example, configured to process a communication protocol and communication data, or configured to: control the entire terminal device, execute a software program, and process data of the software program, or configured to assist in completing a computing processing task, for example, graphics and image processing or audio processing. Alternatively, the processor 1211 is configured to implement one or more of the foregoing functions.

The output device 1214 communicates with the processor 1211, and may display information in a plurality of manners. For example, the output device 1214 may be a liquid crystal display (LCD), a light emitting diode (LED) display device, a cathode ray tube (CRT) display device, or a projector. The input device 1215 communicates with the processor 1211, and may receive an input of a user in a plurality of manners. For example, the input device 1215 may be a mouse, a keyboard, a touchscreen device, or a sensing device.

Specifically, the at least one processor 1211 is configured to perform operation 104. The at least one transceiver 1212 is configured to perform operation 103. In a possible example, the transceiver 1212 is further configured to perform operation 116 and operation 117.

Figure 18:
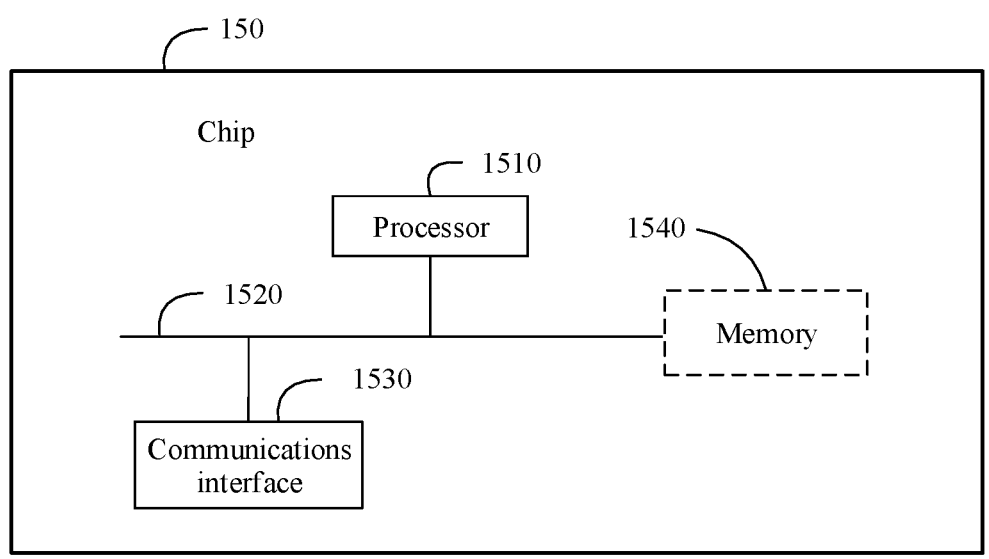
FIG. 18 is a schematic structural diagram of a chip according to an embodiment of this application.

FIG. 18 is a schematic structural diagram of a chip 150 according to an embodiment of this application. The chip 150 includes one or more (including two) processors 1510 and a communications interface 1530.

In a possible embodiment, the chip 150 shown in FIG. 18 further includes a memory 1540. The memory 1540 may include a read-only memory and a random access memory, and provide operation instructions and data to the processor 1510. A part of the memory 1540 may further include a non-volatile random access memory (NVRAM).

In some implementations, the memory 1540 stores the following elements, an executable module or a data structure, or a subset thereof, or an extended set thereof:

In this embodiment of the present disclosure, a corresponding operation is performed by invoking the operation instructions stored in the memory 1540 (where the operation instructions may be stored in an operating system).

In one embodiment, structures of a first control plane network element, a second control plane network element, and a chip used by a first terminal are similar, and different apparatuses may implement respective functions by using different chips.

The processor 1510 controls operations of the first control plane network element, the second control plane network element, and the first terminal, and the processor 1510 may also be referred to as a central processing unit (CPU). The memory 1540 may include a read-only memory and a random access memory, and provide an instruction and data to the processor 1510. A part of the memory 1540 may further include a non-volatile random access memory (NVRAM). For example, in application, the memory 1540, the communications interface 1530, and the memory 1540 are coupled together by using a bus system 1520. The bus system 1520 may include a power bus, a control bus, a status signal bus, and the like in addition to a data bus. However, for clear description, various types of buses in FIG. 18 are marked as the bus system 1520.

The foregoing communications unit may be an interface circuit or a communications interface of the apparatus, and is configured to receive a signal from another apparatus. For example, when the apparatus is implemented as a chip, the communications unit is an interface circuit or a communications interface that is of the chip and that is configured to receive a signal from another chip or apparatus or send a signal.

The method disclosed in the foregoing embodiments of the present disclosure may be applied to the processor 1510, or implemented by the processor 1510. The processor 1510 may be an integrated circuit chip and has a signal processing capability. In an implementation process, operations in the foregoing methods can be implemented by using a hardware integrated logical circuit in the processor 1510, or by using instructions in a form of software. The processor 1510 may be a general purpose processor, a digital signal processor (DSP), an application-specific integrated circuit (ASIC), a field-programmable gate array (FPGA) or another programmable logic device, a discrete gate or transistor logic device, or a discrete hardware component. It may implement or perform the methods, the operations, and logical block diagrams that are disclosed in the embodiments of the present disclosure. The general purpose processor may be a microprocessor, or the processor may be any conventional processor or the like. Operations of the methods disclosed with reference to the embodiments of the present disclosure may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the operations in the foregoing methods in combination with hardware of the processor.

In one embodiment, the communications interface 1530 is configured to perform receiving and sending operations of the first control plane network element, the second control plane network element, and the first terminal in the embodiments shown in FIG. 4 to FIG. 13. The processor 1510 is configured to perform processing operations of the first control plane network element, the second control plane network element, and the first terminal in the embodiments shown in FIG. 4 to FIG. 13.

In the foregoing embodiments, the instructions that are stored in the memory and that are to be performed by the processor may be implemented in a form of a computer program product. The computer program product may be written into the memory in advance, or may be downloaded in a form of software and installed in the memory.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state drive solid state disk, SSD), or the like.

An embodiment of this application further provides a computer-readable storage medium. The methods described in the foregoing embodiments may be all or partially implemented by using software, hardware, firmware, or any combination thereof. If the methods are implemented in software, functions used as one or more instructions or code may be stored in or transmitted on the computer-readable medium. The computer-readable medium may include a computer storage medium and a communications medium, and may further include any medium that can transfer a computer program from one place to another. The storage medium may be any target medium that can be accessed by a computer.

In one embodiment, the computer-readable medium may include a RAM, a ROM, an EEPROM, a CD-ROM, or another optical disc storage, a magnetic disk storage or another magnetic storage device, or the computer-readable medium is used to carry required program code that is stored in a form of an instruction or a data structure, and the computer-readable medium may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and a microwave) are used to transmit software from a website, a server, or another remote source, the coaxial cable, the optical fiber cable, the twisted pair, the DSL or the wireless technologies such as infrared, radio, and a microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. The methods described in the foregoing embodiments may be all or partially implemented by using software, hardware, firmware, or any combination thereof. When the methods are implemented in software, the method may be all or partially implemented in a form of a computer program product. The computer program product includes one or more computer instructions. When the foregoing computer program instruction is loaded and executed on a computer, the procedures or functions described in the foregoing method embodiments are all or partially generated. The computer may be a general-purpose computer, a dedicated computer, a computer network, a base station, a terminal, or another programmable apparatus.

The objectives, technical solutions, and benefits of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A communication method, comprising:
    obtaining, by a first control plane network element in a first network, a quality of service parameter of a service flow in a second network, wherein the service flow is a service flow in which a second terminal communicates with the second network by using a first terminal and a user plane network element in the first network; and
    determining, by the first control plane network element, a quality of service parameter of the service flow in the first network based on the quality of service parameter of the service flow in the second network;
    sending, by the first control plane network element, the quality of service parameter of the service flow in the first network to at least one of the user plane network element or the first terminal.

2. The method according to claim 1, further comprising:
    obtaining, by the first control plane network element, description information of the service flow from a second control plane network element; and
    determining, by the first control plane network element, the service flow based on the description information.

3. The method according to claim 2, wherein the description information comprises one or more of address information of the first terminal, port number information of the second terminal, information about the second terminal, quintuple information of the service flow, or differentiated services code point DSCP information of the service flow.

4. The method according to claim 2, wherein the description information comprises: at least one of a quality of service flow identifier QFI or a security parameter index SPI.

5. The method according to claim 4, further comprising:
    sending, by the first control plane network element, first indication information to the user plane network element, wherein the first indication information is used to indicate the user plane network element to set a QFI in an outer data header of the service flow based on a QFI, an SPI or a DSCP carried in an inner data header of the service flow.

6. The method according to claim 2, further comprising:
    sending, by the first control plane network element, the description information to at least one of the user plane network element or the first terminal in the first network, wherein the description information is used to determine the service flow.

7. The method according to claim 1, wherein the obtaining, by a first control plane network element, at least one of a quality of service parameter or a charging policy of a service flow in the first network comprises:
    obtaining, by the first control plane network element, from a user data management network element in the first network, at least one of a quality of service parameter or a charging policy of the second terminal in the first network, and/or at least one of a quality of service or a charging policy of the first terminal in the first network.

8. The method according to claim 7, further comprising:
    obtaining, by the first control plane network element, at least one of information about the first terminal or information about the second terminal from a second control plane network element.

9. The method according to claim 8, wherein the obtaining, by the first control plane network element, from a user data management network element in the first network, at least one of a quality of service parameter or a charging policy of the second terminal in the first network comprises:
    querying, by the first control plane network element, subscription information of the first terminal from the user data management network element based on the information about the first terminal; and
    obtaining, by the first control plane network element, the at least one of the quality of service parameter or the charging policy of the second terminal in the first network from the subscription information based on the information about the second terminal.

10. The method according to claim 1, further comprising:
    obtaining, by the first control plane network element, second indication information from a second control plane network element, wherein the second indication information is used to indicate the second terminal to access the second network by using the first terminal.

11. The method according to claim 1, wherein the first control plane network element is a policy control network element, a mobile management network element, or a session management network element.

12. A communications apparatus, comprising at least one processor coupled to at least one memory storing instructions and configured to execute the instructions to cause the apparatus to:
    obtain a quality of service parameter of a service flow in a second network, wherein the service flow is a service flow in which a second terminal communicates with the second network by using a first terminal and a user plane network element in a first network; and determine a quality of service parameter of the service flow in the first network based on the quality of service parameter of the service flow in the second network;

send the quality of service parameter of the service flow to at least one of the user plane network element or the first terminal.

13. The apparatus according to claim 12, wherein the instructions further cause the apparatus to be configured to:
    obtain description information of the service flow from a second control plane network element; and
    determine the service flow based on the description information.

14. The apparatus according to claim 13, wherein the description information comprises one or more of address information of the first terminal, port number information of the second terminal, information about the second terminal, quintuple information of the service flow, or differentiated services code point DSCP information of the service flow.

15. The apparatus according to claim 13, wherein the description information comprises at least one of a quality of service flow identifier QFI or a security parameter index SPI.

16. The apparatus according to claim 15, wherein the instructions further cause the apparatus to be configured to:
    send first indication information to the user plane network element, wherein the first indication information is used to indicate the user plane network element to set a QFI in an outer data header of the service flow based on a QFI, an SPI or a DSCP carried in an inner data header of the service flow.

17. The apparatus according to claim 15 wherein the instructions further cause the apparatus to be configured to:
    send the description information to at least one of the user plane network element or the first terminal in the first network, wherein the description information is used to determine the service flow.

18. The apparatus according to claim 12, wherein a first control plane network element is a policy control network element, a mobile management network element, or a session management network element.

19. A non-transitory computer-readable storage medium, wherein the computer-readable storage medium stores instructions, which when executed by a processor, cause the processor to perform operations, the operations comprising:
    obtaining a quality of service parameter of a service flow in a second network, wherein the service flow is a service flow in which a second terminal communicates with the second network by using a first terminal and a user plane network element in a first network; and
    determine a quality of service parameter of the service flow in the first network based on the quality of service parameter of the service flow in the second network;
    sending the quality of service parameter of the service flow in the first network to at least one of the user plane network element or the first terminal.

20. The non-transitory computer-readable storage medium according to claim 19, the operations further comprising:
    obtaining description information of the service flow from the second control plane network element; and
    determining the service flow based on the description information.

* * * * *